US012341707B2

(12) United States Patent
Eldering et al.

(10) Patent No.: US 12,341,707 B2
(45) Date of Patent: Jun. 24, 2025

(54) SYSTEMS AND METHODS FOR CREATING SITUATIONAL NETWORKS

(71) Applicant: SitNet LLC, New York, NY (US)

(72) Inventors: Charles A. Eldering, Brooklyn, NY (US); Michael W. Alston, Norfolk, VA (US); Khaliq D. Chou-Kudu, Brookline, MA (US)

(73) Assignee: SitNet LLC, New York, NY (US)

( * ) Notice: Subject to any disclaimer, the term of this patent is extended or adjusted under 35 U.S.C. 154(b) by 0 days.

(21) Appl. No.: 18/658,793

(22) Filed: May 8, 2024

(65) Prior Publication Data

US 2024/0356865 A1    Oct. 24, 2024

Related U.S. Application Data

(63) Continuation of application No. 18/410,580, filed on Jan. 11, 2024, now Pat. No. 12,113,720.

(60) Provisional application No. 63/438,395, filed on Jan. 11, 2023, provisional application No. 63/438,392, filed on Jan. 11, 2023.

(51) Int. Cl.
*G06F 15/16* (2006.01)
*H04L 47/70* (2022.01)
*H04L 51/10* (2022.01)
*H04L 51/216* (2022.01)

(52) U.S. Cl.
CPC ............ *H04L 47/828* (2013.01); *H04L 51/10* (2013.01); *H04L 51/216* (2022.05)

(58) Field of Classification Search
CPC ...... H04L 47/828; H04L 51/10; H04L 51/216

USPC ......................................................... 709/224
See application file for complete search history.

(56) References Cited

U.S. PATENT DOCUMENTS

| | | | |
|---|---|---|---|
| 6,028,514 A | 2/2000 | Lemelson et al. | |
| 6,594,355 B1 | 7/2003 | Deo et al. | |
| 6,826,472 B1 | 11/2004 | Kamei et al. | |
| 7,026,925 B2 | 4/2006 | Roche et al. | |
| 7,085,818 B2 | 8/2006 | Brown et al. | |
| 7,139,722 B2 | 11/2006 | Perrella et al. | |
| 7,200,207 B2 | 4/2007 | Meer et al. | |
| 7,592,912 B2* | 9/2009 | Hasek ................... | H04L 65/765 340/539.16 |
| 7,644,144 B1 | 1/2010 | Horvitz et al. | |
| 7,768,395 B2 | 8/2010 | Gold | |

(Continued)

FOREIGN PATENT DOCUMENTS

| | | |
|---|---|---|
| CN | 106937260 A | 7/2017 |
| WO | 2017/113925 A1 | 7/2017 |

*Primary Examiner* — Moustafa M Meky
(74) *Attorney, Agent, or Firm* — Haley Guiliano LLP

(57) ABSTRACT

Systems and methods are provided for establishing a plurality of group communication channels for a plurality of sub-sets of a plurality of devices. A situation system identifies a geographical area affected by a situation, and a plurality of devices associated with a plurality of users in the identified geographical area. The situation system causes the plurality of devices to enter a situation mode. The situation system obtains protected data from each of the plurality of devices. The situation system generates a data structure that identifies connections between users of the plurality of users and available modes of communication for each connection. The situation system establishes a plurality of group communication channels for a plurality of sub-sets of the plurality of devices.

20 Claims, 50 Drawing Sheets

(56) References Cited

U.S. PATENT DOCUMENTS

| | | |
|---|---|---|
| 7,903,801 B1 | 3/2011 | Ruckart |
| 8,229,458 B2 | 7/2012 | Busch |
| 8,248,986 B2 | 8/2012 | Crolley et al. |
| 8,254,338 B2 | 8/2012 | Anschutz et al. |
| 8,275,352 B2 | 9/2012 | Forstall et al. |
| 8,275,397 B2 | 9/2012 | Huston |
| 8,346,864 B1 | 1/2013 | Amidon et al. |
| 8,572,059 B2 | 10/2013 | Britton et al. |
| 8,826,139 B1 | 9/2014 | Wendkos et al. |
| 9,019,870 B2 | 4/2015 | Khan et al. |
| 9,071,957 B2 | 6/2015 | Stadtlander et al. |
| 9,338,629 B2 | 5/2016 | Stadtlander et al. |
| 9,349,366 B2 * | 5/2016 | Giancarlo .............. G10L 15/26 |
| 9,472,091 B2 * | 10/2016 | Stern ................ H04N 21/43615 |
| 9,608,944 B2 * | 3/2017 | Wu ........................ H04L 51/04 |
| 9,867,023 B2 | 1/2018 | Rauner |
| 9,877,171 B2 * | 1/2018 | Clawson ................. H04W 4/90 |
| 9,936,010 B1 | 4/2018 | Robbins et al. |
| 9,986,404 B2 * | 5/2018 | Mehta ................... H04W 76/50 |
| 10,003,944 B2 * | 6/2018 | Choi ...................... G16H 40/67 |
| 10,117,290 B1 | 10/2018 | Cona et al. |
| 10,178,537 B2 | 1/2019 | Rauner |
| 10,269,229 B2 * | 4/2019 | Stern ..................... G08B 27/008 |
| 10,368,224 B2 * | 7/2019 | Hussaini ................. H04H 20/16 |
| 10,375,759 B1 | 8/2019 | Cona et al. |
| 10,419,915 B2 * | 9/2019 | Mehta ..................... H04W 4/02 |
| 10,524,103 B2 | 12/2019 | Krishnan et al. |
| 10,531,266 B2 | 1/2020 | Rauner |
| 10,564,824 B1 | 2/2020 | Freeman et al. |
| 10,841,778 B2 | 11/2020 | Krishnan et al. |
| 10,944,726 B2 * | 3/2021 | Bender ................. H04L 51/214 |
| 10,963,588 B1 * | 3/2021 | Cheruku ................. H04L 51/10 |
| 11,070,670 B1 * | 7/2021 | Chalton ................ H04M 3/5116 |
| 11,310,865 B1 | 4/2022 | Cona et al. |
| 11,317,268 B2 * | 4/2022 | Bostick ................... H04L 51/52 |
| 11,538,332 B2 * | 12/2022 | Raucher ............... G08B 25/016 |
| 11,611,656 B2 * | 3/2023 | Chalton ............... G06Q 10/107 |
| 12,046,123 B2 * | 7/2024 | Raucher ............... G08B 26/008 |
| 12,120,591 B2 * | 10/2024 | Ekl ....................... H04W 4/021 |
| 2001/0009857 A1 | 7/2001 | Vanttinen |
| 2001/0032100 A1 | 10/2001 | Mahmud et al. |
| 2002/0004705 A1 | 1/2002 | Baron et al. |
| 2002/0160745 A1 | 10/2002 | Wang |
| 2003/0197615 A1 | 10/2003 | Roche et al. |
| 2004/0070515 A1 | 4/2004 | Burkley et al. |
| 2004/0193617 A1 | 9/2004 | Adler |
| 2004/0225733 A1 | 11/2004 | Tesink et al. |
| 2006/0031582 A1 | 2/2006 | Pugel et al. |
| 2006/0109113 A1 | 5/2006 | Reyes et al. |
| 2006/0126556 A1 | 6/2006 | Jiang et al. |
| 2006/0211404 A1 | 9/2006 | Cromp et al. |
| 2006/0273893 A1 | 12/2006 | Warner |
| 2007/0035388 A1 | 2/2007 | Mock et al. |
| 2007/0035612 A1 | 2/2007 | Korneluk et al. |
| 2007/0202927 A1 | 8/2007 | Pfleging et al. |
| 2007/0206773 A1 | 9/2007 | Branam |
| 2007/0216535 A1 | 9/2007 | Carrino |
| 2007/0226034 A1 | 9/2007 | Khan |
| 2007/0282621 A1 | 12/2007 | Altman et al. |
| 2008/0037576 A1 | 2/2008 | Hwang et al. |
| 2008/0048851 A1 | 2/2008 | Reyes et al. |
| 2008/0208605 A1 | 8/2008 | Sinha et al. |
| 2009/0325535 A1 | 12/2009 | Felt et al. |
| 2017/0019791 A1 | 1/2017 | Shishido et al. |
| 2018/0288581 A1 * | 10/2018 | Bostick ................... H04W 4/90 |
| 2018/0367667 A1 * | 12/2018 | Tran ..................... H04L 61/4557 |
| 2019/0044904 A1 * | 2/2019 | Antopolsky ...... H04M 3/42382 |
| 2019/0281434 A1 * | 9/2019 | Bostick ................... H04W 4/90 |
| 2020/0028815 A1 | 1/2020 | He et al. |
| 2020/0344624 A1 | 10/2020 | Paterour et al. |
| 2021/0227073 A1 * | 7/2021 | Chalton ............... G06Q 10/107 |
| 2022/0191671 A1 * | 6/2022 | Ekl ....................... H04W 4/021 |
| 2022/0319303 A1 * | 10/2022 | Raucher ................. H04H 20/59 |
| 2023/0049959 A1 * | 2/2023 | Schroeder ........... G06F 3/04817 |
| 2023/0267823 A1 | 8/2023 | Vickers |

\* cited by examiner

Active Shooter First Responders

| User | ID |
|---|---|
| Police Chief | 73951 |
| SWAT Leader | 82751 | first responder ID 5800

Active Shooter Impacted Parties

| User | Phone Number |
|---|---|
| Principal | (215) 379-1201 |
| Teacher 1 | (215) 325-1750 |
| ... | ... |
| Student n | (215) 931-1507 | impacted parties ID 5810

Active Shooter Related Parties

| User | Phone Number |
|---|---|
| Parent 1 | (215) 257-1259 |
| Parent 2 | (215) 351-1210 |
| ... | ... |
| Parent n | (215) 312-1520 | related parties ID 5820

FIG. 8

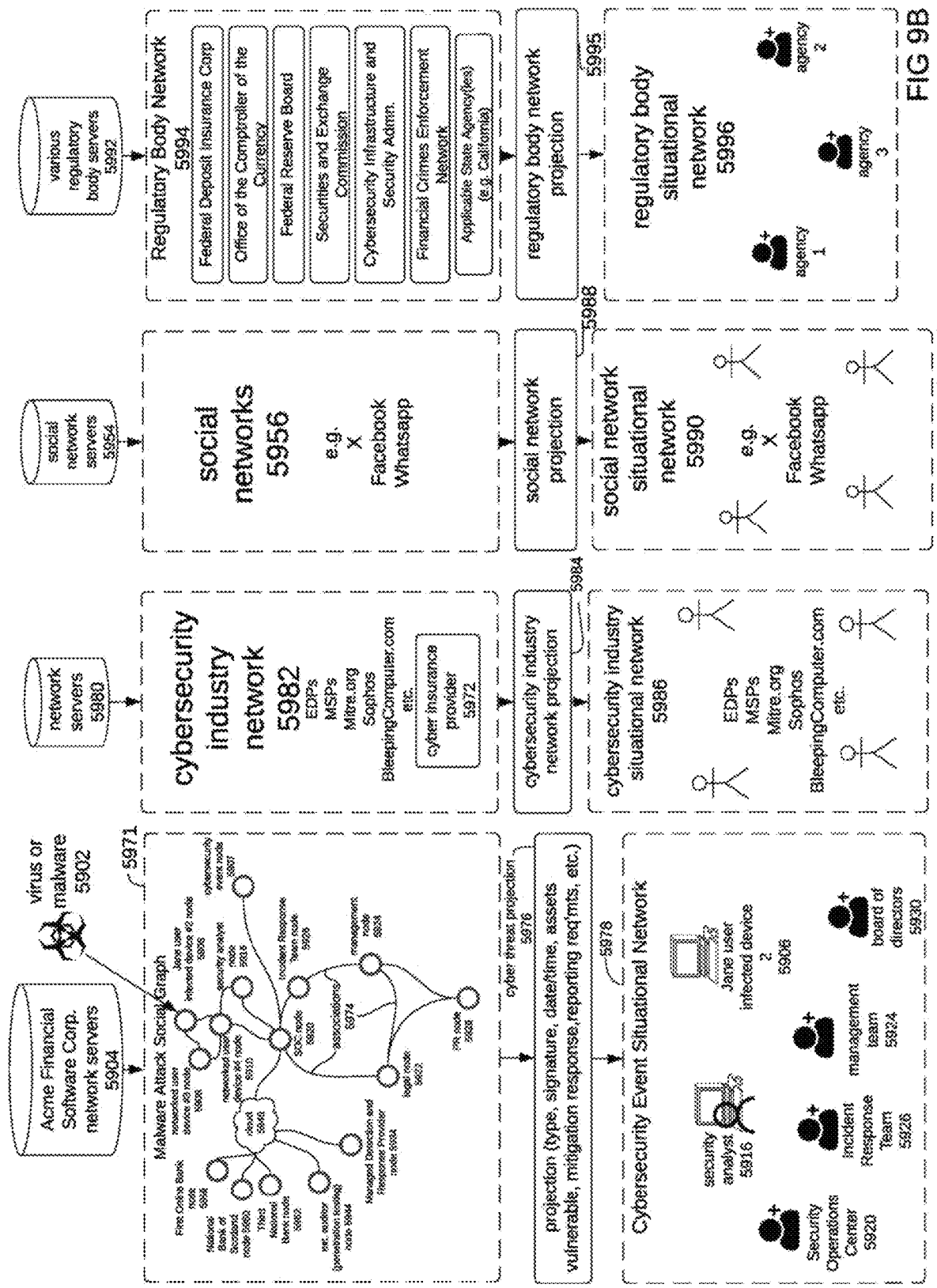

| Party | Incident Report | Ticket Updates | Risk Assessment | IR Plan | Required Regulatory Notifications |
|---|---|---|---|---|---|
| User | YES | YES | NO | NO | NO |
| IT Analyst | YES | YES | NO | NO | NO |
| SOC team | YES | YES | NO | YES | YES |
| Management Team | YES | YES | YES | YES | YES |
| Legal | YES | YES | YES | YES | YES |
| Incident Response (IR) team | YES | YES | NO | YES | NO |
| Public Relations | NO | NO | NO | NO | YES |
| Regulatory Agency | NO | NO | NO | NO | YES |
| Customers | NO | NO | NO | NO | YES |
| Cybersecurity Providers | YES | YES | YES | YES | YES |

FIG. 9D

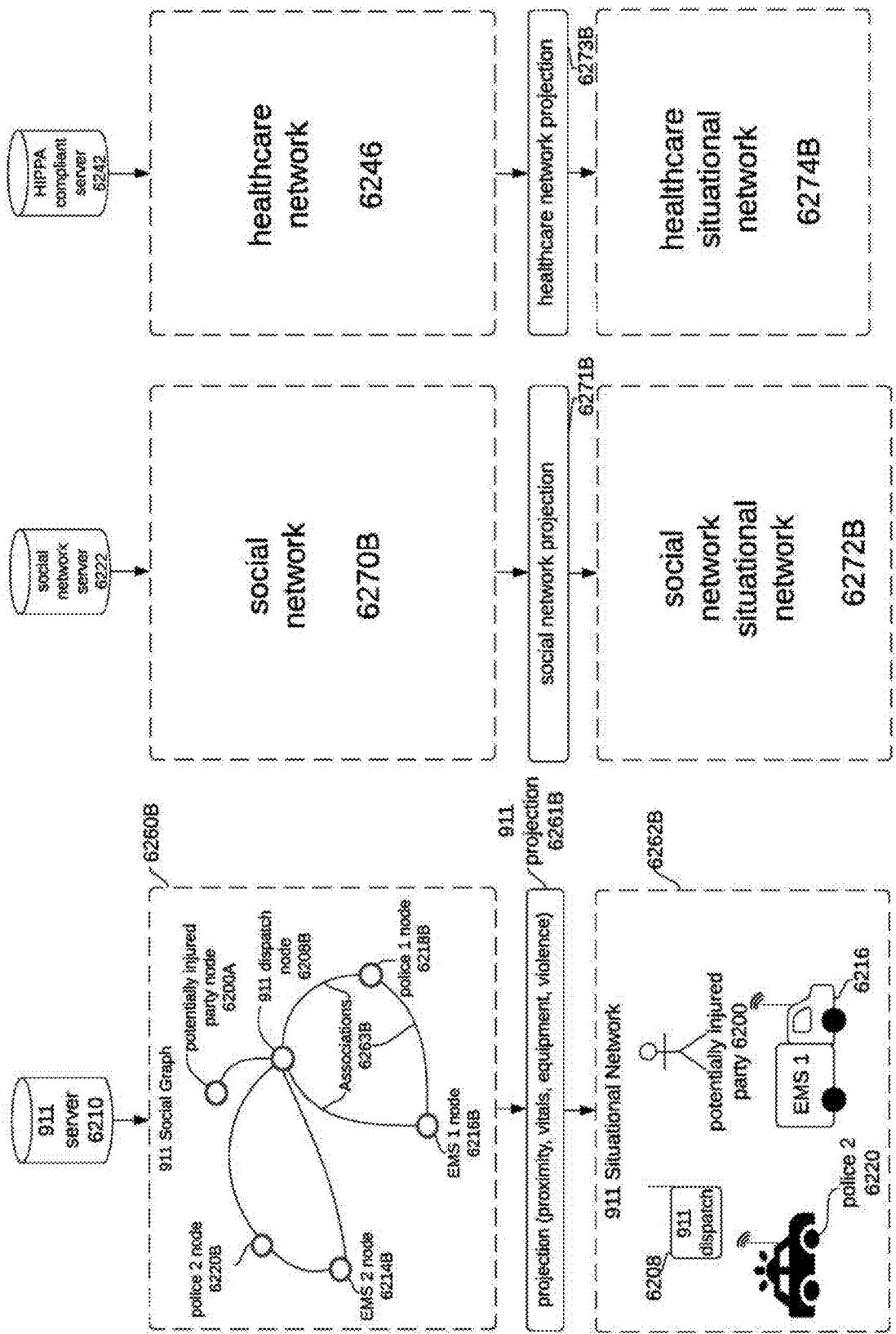

| Party | 911 Info | HIPPA | Message Board | Status Updates |
|---|---|---|---|---|
| 911 Dispatch | YES | YES | YES | YES |
| Police 2 | YES | YES | YES | YES |
| EMS 1 | YES | YES | YES | YES |
| Physician 1 | YES | YES | YES | YES |
| Nurse 2 | YES | YES | YES | YES |
| Social Worker 2 | NO | NO | NO | YES |
| Family Member 1 | NO | YES | YES | YES |
| Family Member 2 | NO | NO | NO | YES |
| Friend 2 | NO | NO | NO | YES |

FIG. 12D

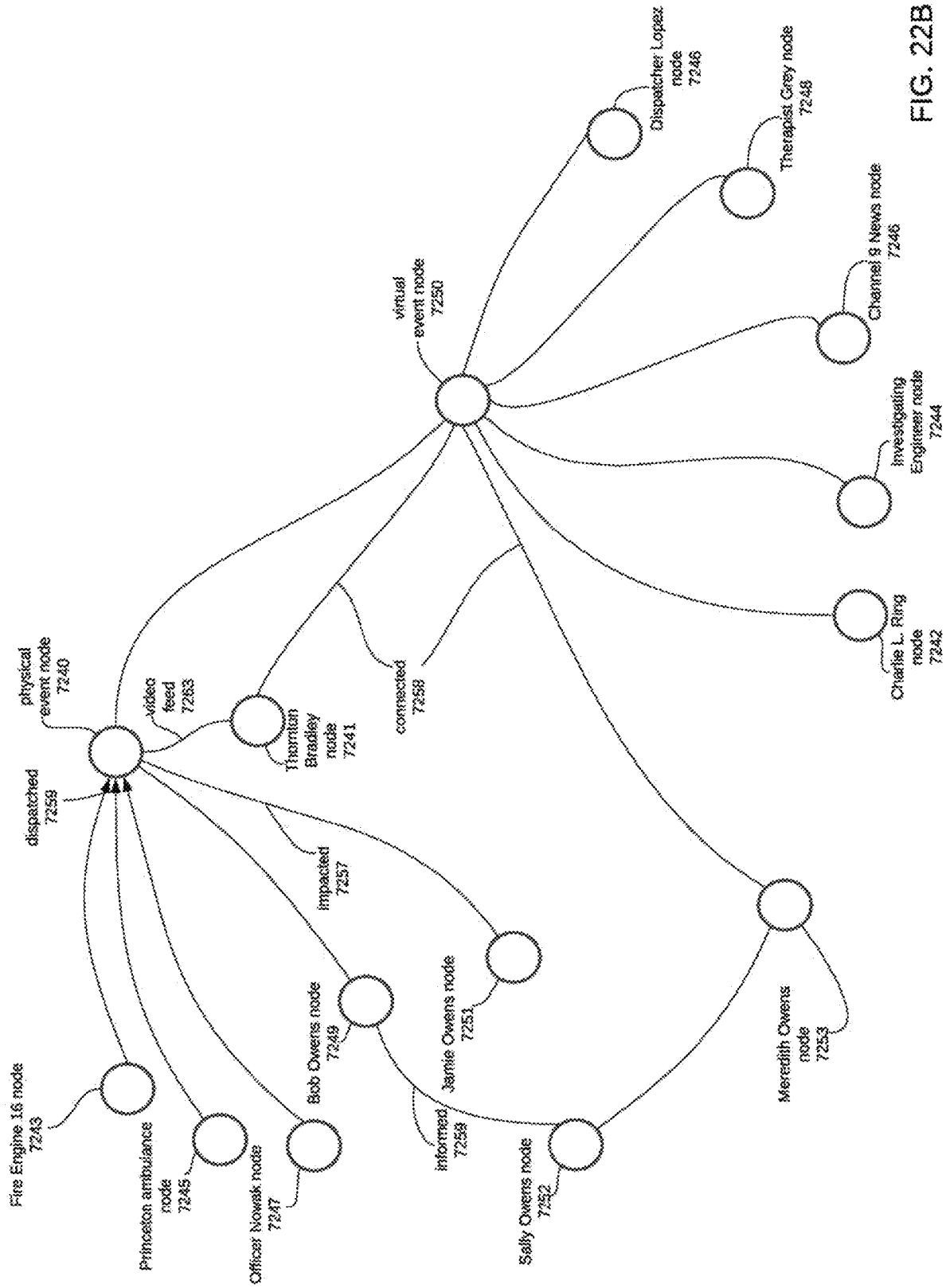

| Party | First Responder Info | Video Feed Control | Message Board | Broadcast Video and General Status |
|---|---|---|---|---|
| Officer Nowak | YES | YES | YES | YES |
| Princeton ambulance service | YES | YES | YES | YES |
| Thornton Bradley (pre-promotion) | NO | NO | NO | YES |
| Thornton Bradley (post-promotion) | YES | YES | YES | YES |
| Channel 9 News correspondent | YES | YES | YES | YES |
| Sally Owens | NO | NO | YES | YES |
| Charlie L. Ring | NO | YES | YES | YES |
| Merideth Owens | NO | NO | NO | YES |
| Paul G Guttenberg | NO | NO | NO | YES |

FIG. 22D

| Exemplary 911 Triplestore Database | | |
|---|---|---|
| Subject | Predicate | Object |
| VICTIM | IS | NOT MOVING |
| EMS 1 | IS | WITHIN 0.1 MILES |
| POLICE 1 | IS | DISPATCHED |
| POLICE 2 | IS | WITHIN DISPATCH AREA |
| EMS 2 | IS | WITHIN DISPATCH AREA |
| EVENT | IS | VIOLENT |
| POLICE 1 | WORKS WELL WITH | VIOLENT CALLS |
| HOSPITAL | HAS | CAPACITY |
| VICTIM | RELEASED | HIPPA |
| FRIEND 1 | IS | WITHIN 0.1 MILES |
| HOPISTAL | HAS | 20% CAPACITY |
| EMS 2 | HAS | RESCUE EQUIPMENT |
| EVENT | IS | ONGOING |
| VICTIM 2 | IS | WITHIN 0.1 MILES |
| NURSE 1 | IS | WORKING |
| NURSE 2 | IS | HOME |
| PHYSICIAN 1 | IS | ON CALL |

FIG. 23A

| Exemplary 911 Projection Operators ||
| --- | --- |
| First Responder Node Operators | First Responder Assocation Operators |
| EMS VEHICLE | IS PROXIMATE |
| FIRE ENGINE | HAS EQUIPMENT |
| EVENT | IS VIOLENT |
| EVENT | HAS RISK OF DISEASE |
| VICTIM | IS INJURED |
| POLICE | IS PROXIMATE |
| Hospital Node Operators | Hospital Association Operators |
| HOSPITAL | HAS CAPACITY |
| PARAMEDICS | REPORTED VITALS |
| TRAUMA SPECIALIST | IS WITHIN 0.1 MILES |
| USER | IS IMMEDIATE FAMILY |
| EVENT | IS ONGOING |

FIG. 23B

Exemplary 911 Resource Allocation

| First Responder Nodes | First Responder Resource Allocation |
|---|---|
| EVENT | CREATE NODE |
| EMS VEHICLE | SECURE RADIO AND INTERNET CHANNELS |
| FIRE ENGINE | SECURE RADIO AND INTERNET CHANNELS |
| VICTIM | SECURE RADIO AND INTERNET CHANNELS |
| POLICE | SECURE RADIO AND INTERNET CHANNELS |
| Hospital Node | Hospital Node Resource Allocation |
| HOSPITAL | STATUS CHANNEL<br>ACCESS TO HIPPA MEDICAL RECORDS |
| PARAMEDICS | STATUS CHANNEL<br>ACCESS TO HIPPA MEDICAL RECORDS |
| TRAUMA SPECIALIST | STATUS CHANNEL<br>ACCESS TO HIPPA MEDICAL RECORDS |

FIG. 23C

| Exemplary 911/VR Triplestore Database |||
|---|---|---|
| Subject | Predicate | Object |
| THORNTON BRADLEY | HAS | NOTIFIED 911 |
| EVENT | IS | FIRE |
| JAMIE OWENS | IS | PROXIMATE |
| BOB OWENS | IS | PROXIMATE |
| FIRE ENGINE 16 | IS | DISPATCHED |
| PRINCETON AMBULANCE | IS | WITHIN DISPATCH AREA |
| OFFICER NOWAK | IS | WITHIN DISPATCH AREA |
| OFFICER NOWAK | IS | CPR CURRENT |
| HOSPITAL | HAS | CAPACITY |
| FIRE ENGINE 16 | HAS | RESCUE EQUIPMENT |
| FIRE ENGINE 16 | IS | AT 50% CAPACITY |
| EVENT | IS | ONGOING |
| SALLY OWENS | IS | NOT PROXIMATE |
| SALLY OWENS | IS | IMMEDIATE FAMILY |
| MEREDITH OWENS | IS | NOT IMMEDIATE FAMILY |
| PAUL GUTTENBERG | IS | STRUCTRUAL ENGINEER |
| SUSANNA GREY | IS | THERAPIST |
| CHANNEL 9 NEWS | IS | PROXIMATE |

FIG. 23D

Exemplary 911/VR Projection Operators

| First Responder Node Operators | First Responder Assocation Operators |
|---|---|
| FIRST RESPONDER | IS PROXIMATE |
| HOSPITAL | HAS CAPACITY |
| EVENT | IS ONGOING |
| VICTIM | IS IDENTIFIED |
| USER | IS IMMEDIATE FAMILY TO VICTIM |
| USER | HAS NOTIFIED 911 |
| Interested and Impacted Parties Node Operators | Interested and Impacted Parties Association Operators |
| USER | IS FRIEND OR NON-IMMEDIATE FAMILY TO VICTIM |
| USER | HAS LIVE VIDEO FEED |
| USER | IS WITHIN 0.1 MILES |
| PRESS | HAS LIVE VIDEO FEED |
| Broadcast Node Operators | Broadcast Association Operators |
| PRESS | HAS LIVE VIDEO FEED |
| USER | HAS LIVE VIDEO FEED |
| USER | REQUESTED ACCESS TO VR EVENT NODE |

FIG. 23E

| Exemplary 911/VR Resource Allocation ||
|---|---|
| First Responder Nodes | First Responder Resource Allocation |
| FIRST RESPONDER | SECURE RADIO AND INTERNET CHANNEL |
| DISPATCH | SECURE RADIO AND INTERNET CHANNEL |
| HOSPITAL | SECURE RADIO AND INTERNET CHANNEL |
| PROMOTED USER | RECEIVE VIDEO FEED COMMANDS |
| IMMEDIATE FAMILY | GENERAL STATUS MESSAGE BOARD |
| Impacted & Interested Parties Nodes | Impacted & Interested Parties Resource Allocation |
| ALL | GENERAL STATUS MESSAGE BOARD |
| ALL | ACCESS TO STREAMING |
| Broadcast/Receiver Nodes | Broadcast/Receiver Resource Allocation |
| BROADCAST VIDEO NODE | CREATE MULTICAST |
| REQUESTING USER | JOIN MULTICAST |
| REQUESTING USER | ACCESS TO NON-CONFIDENTIAL STATUS BOARD |

FIG. 23F

| Exemplary Cybersecurity Triplestore Database | | |
|---|---|---|
| Subject | Predicate | Object |
| JANE USER | HAS ACCESS TO | DATABASE CONTAINING PII |
| PII DATABASE | DOES NOT | HAVE PATCH COVERING CVE |
| JANE USER DEVICE | HAS | VIRUS |
| JANE USER | SUBMITTED | TROUBLE TICKET |
| JANE USER VIRUS | MATCHES | CVE DATABASE ENTRY |
| CVE | MATCHES | ENTRY IN DATABASE OF PATCHES BY CVE |
| OTHER ACME USERS | DO NOT HAVE | SPECIFIC CVE |
| PII DATABASE | HAS BEEN ACCESSED BY | JANE USER ACCOUNT |
| CVE PATCH | HAS BEEN APPLIED TO | PII DATABASE |
| RANSOM REQUEST | HAS BEEN RECIEVED BY | ACME MANAGEMENT |
| JANE USER | HAS ACCESS TO | PII DATABASE |
| JANE USER | SPECIFICALLY DOES NOT RECALL | ALL PII DATABASE ACCESS ATTEMPTS |
| JANE USER ACCOUNT | ACCESSED | PII DATABASE OUTSIDE US LOCATION |
| UNAUTHORIZED ACCESS | GREATER THAN | THRESHOLD FOR REPORTING TO GOVERNING BODY |
| UNAUTHORIZED ACCESS | GREATER THAN | THRESHOLD FOR REPORTING TO LEGAL |
| GOVERNING BODIES | RECEIVED | BREACH REPORT |

FIG. 23G

Exemplary Cybersecurity Projection Operators

| Cybersecurity Event Node Operators | Cybersecurity Event Assocation Operators |
|---|---|
| USER DEVICE | HAS VIRUS |
| USER | SUBMITTED TROUBLE TICKET |
| USER | HAS ACCESS TO DATABASE CONTINAING PII |
| IT PERSONNEL | |
| Cybersecurity Industry Node Operators | Cybersecurity Industry Assocation Operators |
| CVE DATABASE | HAS MATCHING ENTRY |
| CVE DATABASE | HAS PATCH |
| ACME MANAGEMENT | HAS RECEIVED RANSOM REQUEST |
| CYBER INSURANCE PROVIDER | |
| Social Network Node Operators | Social Network Association Operators |
| COMPANY | |
| USER | EMPLOYED BY ACME |
| USER | CUSTOMER OF ACME |
| Regulatory Body Node Operators | Regulatory Body Node Operators |
| FDIC | |
| FINANCIAL CRIMES ENFORCEMENT NETWORK | |

FIG. 23H

| Exemplary Cybersecurity Resource Allocation ||
|---|---|
| Cybersecurity Event Node(s) | Cybersecurity Event Resource Allocation |
| CYBERSECURITY EVENT NODE | CREATE |
| USERS WITH VIRUS OR USERS WITH SUBMITTED TROUBLE TICKET IT AND C-SUITE | EMAIL NOTIFICATION AND EVENT MAILBOX |
| USERS WITH VIRUS OR USERS WITH SUBMITTED TROUBLE TICKET IT AND C-SUITE | INTERNAL COMMUNICATIONS CHANNEL |
| USERS WITH VIRUS | REMOVE ACCESS TO DATABASE(S) CONTAINING PII |
| SECURITY ANALYST, GENERAL COUNSEL, CIO | SECURE INTERNAL MANAGEMENT COMMUNICATIONS CHANNEL |
| Cybersecurity Industry Node | Cybersecurity Industry Resource Allocation |
| CYBERSECURITY INDUSTRY NODES | EMAIL NOTIFICATION AND EVENT MAILBOX |
| Social Network Nodes | Social Network Resource Allocation |
| COMPANY | CREATE POST |
| COMPANY | CREATE BREACH EVENT NODE |
| COMPANY AND EMPLOYEES AND CUSTOMERS | MESSAGE BOARD OR CHANNEL |
| Regulatory Body Nodes | Regulatory Body Node Resource Allocation |
| FDIC | EMAIL NOTIFICATION AND EVENT MAILBOX |
| FINANCIAL CRIMES ENFORCEMENT NETWORK | EMAIL NOTIFICATION AND EVENT MAILBOX |

FIG. 23I

| Exemplary Business Enterprise Triplestore Database |||
|---|---|---|
| Subject | Predicate | Object |
| ENGINEER_JORDY | COMPLETED | LEADERSHIP TRAINING |
| ENGINEER_JORDY | PREFERS MORNING | MEETINGS |
| SAFETY_SALLY | PREFERS MORNING | MEETINGS |
| ENGINEER_LOLA | PREFERS AFTERNOON | MEETINGS |
| CHEMIST_ANDREW | IS | PHARMA SME |
| REGULATORY_AMY | IS | FDA SME |
| SAFETY_SALLY | CLOSED PROJECT WITH | ENGINEER_JORDY |
| ENGINEER_MATHIAS | HAS | PHARMA EXPERIENCE |
| ENGINEER_JORDY | HAS | PHARMA EXPERIENCE |
| ENGINEER_LOLA | SPENDS EXCESSIVE TIME IN | TRAINING NEW HIRES |
| ENGINEER_MATHIAS | WORKS PRIMARILY FROM | OFFICE |
| ENGINEER_JORDY | WORKS PRIMARILY FROM | OFFICE |
| REGULATORY_AMY | WORKS PRIMARILY FROM | OFFICE |
| ENGINEER_JORDY | HOURS IN OFFICE | 9AM TO 5PM |
| ENGINEER_MATHIAS | HOURS IN OFFICE | 7AM TO 3PM |
| CHEMIST_ANDREW | IS | UNDER NDA |
| ENGINEER_JORDY | HAS | SUCCESS WITH CLIENT |
| ENGINEER_JORDY | IS | UNDER NDA |
| CHEMIST_ANDREW | ATE LUNCH WITH | SAFETY_SALLY |

FIG. 23J

Exemplary Business Enterprise Projection Operators

| Business Enterprise Node Operators | Business Enterprise Association Operators |
|---|---|
| ENGINEER_JORDY | PHARMACEUTICAL EXPERIENCE |
| REGULATORY_AMY | FDA EXPERIENCE |
| SAFETY_SALLY | SAFETY TRAINING |
| ENGINEER_JORDY | HIGH AVAILABILITY |
| CHEMIST_ANDREW | HIGH AVAILABILITY |
| ENGINEER_MATHIAS | NO AVAILABILITY |
| REGULATORY_AMY | REGULAR WORK HOURS |
| ENGINEER_JORDY | REGULAR WORK HOURS |
| ENGINEER_MATHIAS | IRREGULAR WORK HOURS |
| SAFEY_SALLY | SAFETY TRAINING |
| CHEMIST_ANDREW | SUBJECT MATTER EXPERT |
| ENGINEER_JORDY | PREVIOUS SUCCESS |
| ENGINEER_LOLA | LOW AVAILABILITY |
| SAFETY_SALLY | GOOD RAPPORT WITH CHEMIST_ANDREW |
| CHEMIST_ANDREW | GOOD RAPPORT WITH SAFETY_SALLY |
| ENGINEER_JORDY | SUCCESS WITH SAFETY_SALLY |
| ENGINEER_LOLA | NO RELEVANT EXPERIENCE |

FIG. 23K

Exemplary Business Enterprise Resource Allocation

| COMMUNICATIONS | COMMUNICATIONS RESOURCE ALLOCATION |
|---|---|
| SLACK CHANNEL | DEDICATED SCIENCE CHANNEL |
| MEETING SCHEDULE | MONTHLY IN PERSON |
| ALL | WEEKLY ZOOM MEETING |
| PLATFORM FOR QUICK MEETINGS | MICROSOFT TEAMS CHANNEL |
| PROJECT MANAGER AVAILABILITY | BIWEEKLY ONE-ON-ONE MEETINGS |
| COLLABORATION | COLLABORATION RESOURCE ALLOCATION |
| FILE SHARING | SHARED CLOUD STORAGE |
| HYBRID/VIRTUAL TEAMS | NO-AGENDA MEETINGS FOR SOCIAL |
| PROJECT DESIGN | ONLINE DESIGN DOCUMENT REPOSITORY |
| PROJECT MANAGEMENT TOOLS | DEDICATED TRELLO BOARD |
| ALL | VIRTUAL WHITEBOARD |
| ENGINEER+CHEMIST | CO-WORKING SPACE |
| REGULATORY | Regulatory Body Node Resource Allocation |
| REGULATORY SME | SPECIFICATIONS |
| REGULATORY SME | QUALITY MANAGEMENT SYSTEM PERMISSIONS |

FIG. 23L

SYSTEMS AND METHODS FOR CREATING SITUATIONAL NETWORKS

CROSS-REFERENCE TO RELATED APPLICATIONS

This application is a continuation of U.S. patent application Ser. No. 18/410,580, filed Jan. 11, 2024, which claims the benefit of U.S. provisional patent application No. 63/438,395, filed Jan. 11, 2023, which is hereby incorporated by reference in its entirety. This application also claims the benefit of U.S. provisional patent application No. 63/438,392, filed Jan. 11, 2023, which is hereby incorporated by reference in its entirety.

BACKGROUND

This disclosure is related to systems and methods for causing a plurality of devices to enter a situation mode in which a plurality of group communication channels is established for a plurality of sub-sets of the plurality of devices.

SUMMARY

Many situations affect large groups of people simultaneously. Some examples of such situations include emergencies (e.g., natural disasters, terrorist attacks, active shooter events, etc.) and social gatherings (e.g., concerts, meetings, parties, etc.). In these situations, it is often beneficial for systems to provide information related to the situation to relevant people. For example, it is beneficial for people affected by an earthquake to receive updates regarding the earthquake, such as aid information and the safety status of loved ones. Systems often lack the ability to rapidly and efficiently identify devices of the necessary participants for situational networks for a particular situation and interconnect them via one or more platforms, (e.g., platforms that do not store relationships between the participants).

In one approach, emergency alert systems, such as those used by police and fire departments (e.g., the emergency 911 system, the 911 system as augmented by systems such as First Net and Emergency Call Works) provide channels for users to report, via phone call, emergency situations to local authorities and emergency services. In another approach, emergency alert systems (e.g., the Emergency Alert System, Wireless Emergency Alerts, etc.) provide the basis for emergency communications via SMS messages, television broadcast, public radio, wireless cable, and satellite services. In another approach, social networks may offer the ability to identify potential participants for a situational network based on the stored relationships between the parties, geographic location, their relationship to nodes representing a situation, qualifications, posts, behaviors, interests and other attributes related to their profile and history on the social network. However, social networks are not always the primary means of communication between individuals, many of whom will rely on linear networks such as, cellular calls, Short Messaging Service (SMS, also known as "text messaging"), WhatsApp, Slack, Microsoft Teams or even email to communicate with each other.

While such emergency communications systems may identify devices of users affected by emergency situations, many deficiencies are apparent. One deficiency is that existing emergency communications systems are one-way communication channels, therefore affected users lack the ability to communicate with other affected users via a particular communications channel. Another deficiency of existing emergency communications systems is that users not directly affected by the situation do not receive information about the situation. For example, the parent of a child that is attending school is another state or country would like to receive information about emergency situations of their child's region. Another deficiency is that the above systems are only used for emergency situations, and an on-the-fly communication channel with relevant users for non-emergency situations, such as social events, is still lacking. Although a situation may be readily identifiable (and relevant participants located) on a social network, it may be beneficial or even necessary to interconnect parties via other networks, thus forming a situational network on a platform that does not inherently store relationships, or stores only limited relationships such as associations between an individual and an employer (e.g., that a member is part of a company).

Another deficiency is that the systems can become overwhelmed by the number of calls or network messages coming in at one time, such as in the case of a large-scale emergency. When the same mode of communication is used by a large number of geographically proximate devices (e.g., when every phone is trying to send an SMS or WhatsApp messages) the system ability to handle all traffic may deteriorate resulting in slow service or even in some messages becoming dropped. For example, WhatsApp servers or WI-FI network may become locally overwhelmed. Such an outcome is particularly undesirable in an emergency situation when each messages can be critical.

What is required is a system that rapidly identifies the necessary participants arising from a particular situation and interconnect them on one or more platforms and/or networks, including platforms that may not store the relationships between the participants or nodes that identify them as participants. Once identified, the participants can be connected and resources (e.g., communications channels and associated bandwidth, access to memory and stored databases and documents), allocated such that they can communicate effectively regarding the situation. Additionally, parties should have the ability to opt-in or opt-out of a situational network to which they are invited into or joined-to.

To help address these problems, in some embodiments, a situation system identifies a geographical area affected by a situation. For example, the situation system identifies that an earthquake has occurred in the Bay Area of California. In some embodiments, the situation system identifies a plurality of devices associated with a plurality of users in the identified geographical area. For example, the situation system identifies smartphones, belonging to users, within the Bay Area. In some embodiments, the situation system identifies the geographical area by obtaining motion data indicative of an emergency situation from motion sensors of the plurality of devices. For example, during an earthquake in the Bay Area, the situation system receives motion data of shaking from smartphones in the Bay Area. In some embodiments, the situation system identifies the geographical area by identifying a plurality of calls to an emergency service from the plurality of devices. For example, the situation identifies that many smartphones in the Bay Area are calling 911, In some embodiments, the situation system causes the plurality of devices to enter a situation mode, wherein a device in the situation mode is configured to share protected data. In some embodiments, the situation system causes the particular device to make available for access, via a network, at least one of: (a) data stored on the particular device that is inaccessible via the network when the particular device is not in the situation mode, or (b) sensor data stream from at least one sensor of the particular device that is inaccessible via the network when the particular device is not in the situation mode. For example, while a smartphone is in situation mode, the situation system may have access to messaging application usage data.

In some embodiments, the situation system obtains protected data from each of the plurality of devices that comprises, for each respective device of the plurality of devices, contact list information from a respective plurality of modes of communication available on the respective device. For example, the smartphones in the Bay Area, after the situation system identified the occurrence of an earthquake, provide the situation system with user relationship data, contact information, and communication preference information. In some embodiments, the situation system generates, based on the contact list information of each of the plurality of devices, a data structure that identifies connections between users of the plurality of users, and identifies available modes of communication for each connection. For example, the situation system generates a graph of relationships between user device nodes and the various available forms of communication used between the user device nodes.

In some embodiments, the available modes of communication comprises one or more of: (a) messaging applications installed on the plurality of devices, (b) physical network interfaces present on the plurality of devices, or (c) a combination of the messaging applications and the physical network interfaces. For example, different group communication channels can use different combinations of messaging applications and physical network interfaces, such as one channel using WhatsApp over Wi-Fi and another channel using Microsoft Teams over AT&T cell service. In some embodiments, multiple cell services, e.g., AT&T and Verizon, are utilized by the situation system. In some embodiments, the situation system generates a graph where each user of the plurality of users is represented by a node and generates edges for the graph, wherein each edge connects two nodes of the graph and identifies a mode of communication available for communication between user devices associated with the two nodes. For example, the situation system generates a graph with two connected nodes, indicating that the represented users can communicate through WhatsApp.

In some embodiments, the situation system establishes, based on the data structure, a plurality of group communication channels for a plurality of sub-sets of the plurality of devices, wherein each group communication channel of the plurality of group communication channels allows for communication via one of the available modes of communication. For example, situational networks can be established, on an optimal communication mode (e.g., SMS, WhatsApp, etc.) to interconnect users impacted by a crisis or event and to allow them to check-in as safe as well as to communicate amongst themselves. In some embodiments, the situation system transmits information related to the situation to each of the plurality of devices via the established plurality of group communication channels. For example, the situation system sends relevant update messages to each smartphone in a group of smartphones designated to use WhatsApp during an earthquake.

In some embodiments, the situation system receives sensor data from the plurality of devices in the situation mode. The situation system constructs a 3D representation of the identified geographical area based on the sensor data and generates for display the 3D representation on an extended reality (XR) display. In some embodiments, the situation system transmits at least a portion of the 3D representation to each of the plurality of devices via the established plurality of group communication channels.

In some embodiments, for each device of the plurality of devices, the situation system determines a sub-set of the plurality of sub-sets that a respective device belongs. The situation system identifies a mode of communication for a respective group communication channel of the determined sub-set and disables or throttles, on the respective device, modes of communication other than the identified mode of communication. For example, group of devices using SMS messaging may have throttled Wi-Fi connection to preserve resources for other groups of devices using WhatsApp over Wi-Fi.

Such aspects allow for devices associated with users in emergency situations to efficiently and rapidly communicate with each other without lagging from an overwhelmed system. Since communications between a large number of geographically proximate devices are spread out over many modes of communication, such as WhatsApp, SMS, etc., systems do not become overwhelmed by the number of calls or network messages coming in at one time and messages do not get dropped, such as in the case of a large-scale emergency. Such aspects also allow for devices associated with users to receive news of the situation without having to have had a prior communication channel with the other affected users. For example, a user may not have had the phone number of a neighbor, but in the event that the situation system forms a WhatsApp group message during an earthquake, the user is able to communicate with the neighbor to exchange useful information. Such aspects also allow users to rapidly be placed into contact with each other without the need to manually form group chats or individual chats. This is especially beneficial in emergency situations, when rapid communication is often critical.

The advent of Virtual Reality (VR) systems now allows for users to join either virtual or physical events, and allows for participants all over the globe to observe or in some instances participate in an event. Because the number of participants can be exceedingly large, methods and systems for identifying the users that should be connected to the event, and for which resources (e.g., bandwidth) should be allocated. For some events, such as crises or medical emergencies, it becomes critical to interconnect the required personnel. When a virtual event is established corresponding to the physical crisis or medical emergency, users can participate virtually and potentially contribute information or skills, but the users have to be identified and appropriately connected.

Some networks store significant information regarding users and their associations. Social networks, such as Facebook and LinkedIn store vast amounts of information regarding users and their associations (e.g., location and interests, skills and qualifications, friends, employment). The number of monthly users (and hence nodes representing those users) is over 1 billion for some social networks, and as such, the number of associations stored is orders of magnitude greater. It would be desirable to be able to monitor relationships and the existence of particular nodes in a social network and be able to create a situational network that transcends the social network and interconnects parties on linear networks such as SMS and WhatsApp as well as on emerging virtual networks (e.g., the metaverse). Given the number of nodes and associations on the social network platforms, a method and system which can efficiently distill the relevant relationships and nodes from the social network and create the situational network, extending to linear networks such as SMS and WhatsApp are required. In addition to the amount of data stored in social networks, the advent of "big data" in which information regarding individuals and their status (e.g., location, physical parameters such as pulse, communications records, viewing habits) as well as detailed information about objects (e.g., vehicles including information such as location, speed and direction, acceleration, engine parameters) only makes the situation worse in terms of determining who and what should be interconnected in a particular situation. Although big data combined with Artificial Intelligence ("AI") data mining techniques provides the ability to gain tremendous insights about individuals, their habits and their desires, the crippling amount of data makes identifying the appropriate individuals in any given situation computationally difficult.

Systems and methods are needed in which impacted parties can be identified via both the social network as well as linear networks (e.g., SMS networks) in which a user only maintains contacts with and communicates with a defined number of individuals or domains with whom they have historical, recent or regular contact with. Additionally, it is desirable to establish cross-platform (e.g., social network to personal network) situational networks such that communications between participants are not limited to one platform. For applications incorporating the metaverse, the ability to locate and interconnect appropriate individuals from anywhere in the world is essential. As previously mentioned, resources such as bandwidth and access to memory, need to be allocated appropriately so as to support the interconnections and not allow system resources to be inappropriately used by parties not relevant to the situation.

The required system should be able to identify—within a very short period of time—relevant participants in a situational network based on their relationships, their relationships to other parties identified as relevant to the situation, their degree of separation with select users/nodes, their geographical locations when relevant (both with respect to other parties involved in the situation as well as the situation itself), their history within the social network, their qualifications, their behaviors, and other parameters that are indicative of their eligibility or need to be part of the situational network. The system should also be able to allocate resources for communications (e.g., establish links) between the required participants either on the social network in which the participants were identified, or an adjunct network. This must all occur in a brief period of time to ensure the utility of the situational network.

Methods and systems are presented in which a server projects situational networks out of a social network, graph or other database, and connections between parties are established on the social network, an associated or unassociated one-dimensional network, metaverse, or combination thereof. The networks can be operated by a single service provider or independent service providers and may operate using the same or different protocols. An example would be a social network (e.g., the first network) operating on a first set of servers and primarily relying on Internet protocols (e.g., TCP/IP (Transmission Control Protocol/Internet Protocol), UDP/IP (User Datagram Protocol/Internet Protocol), HTTP (HyperText Transfer Protocol) and FTP (File Transfer Protocol) for communications and a second network operating on SMS, radio frequency voice communication (e.g., 911 emergency networks) or other protocol distinct from that over which the social network operates.

A server creates projections from the social network or graph database based on a set of criteria specified to identify the required participants for the situational network and create, as required, an intermediate database which links the required participants in the situational network across platforms using combinations of user identifiers including but not limited to social network handles and names, phone numbers, device IDs, MAC addresses, IP addresses, and email addresses, or any combination of the above. A server creates the intermediate database, which can be resident on the creating server, another server, or in the cloud. The intermediate database is accessed by the second network, which may operate on the same or different protocols than the first network. An example of a second network would be a Short Messaging Service (SMS) network in which communications occur using the telecommunications network with addressing based on telephone numbers and communications via the telecommunications infrastructure including Signaling System 7 (SS7). The creation of the intermediate database by a server, and the accessing of that database by a server supporting the second network allows for the situational network to be operated on platforms beyond the one on which it was developed.

A server, network interface device, or other computational platform projects the participants for the situational network from the social network by applying an operator on the nodes, such as $\varphi[N(G)]$, applying an operator on the links or association, such as $\psi[L(G)]$, or by applying a combination of both (e.g. $a\varphi[N(G)]+b\psi[L(G)]$. The resulting network is the situational projection, $S(G)$. The users within the situational projection $S(G)$ can be interconnected via the social network, or through a one-dimensional network such as SMS or WhatsApp by finding the corresponding users and creating an appropriate group (e.g., text or chat group).

In some embodiments, the node may represent a situation (e.g., weather event, public safety threat, disaster) associated with a particular geographic location. In this instance the social network contains the user location information as part of the user node or in a separate node. The projection operator, as executed by a server or other computational device, finds users registered in the social network that are in the geographic proximity of the weather event, and marks them as impacted parties. To allow communication beyond the social network, the impacted parties (projected from the social network) can be interconnected via an SMS or other one-dimensional network by creating an appropriate group and adding or inviting the impacted parties to the group. In some embodiments an intermediate database $ID[S(G)]$ is used to store the identifying information (e.g., username, phone number, user ID) of required participants (identified as $S(G)$) to create the specific situational network for one or more platforms. As such, the intermediate database takes the identified required or desired participants in the social network and establishes the required connections for the situational network on a second platform.

In the aforementioned situations, the situational network is precipitated from or projected from a network (e.g., social graph or social network) containing the required associations and event node information. The projection is rapidly established, sorting through the relationships and events stored in the social network, to determine the critical participants based on the situation. The system, comprised of a first network operating on one or more servers and having social graph characteristics, and from which participants for the desired situational network are projected from, then allocates resources to establish the desired interconnections between the parties as well as for allocating the resources associated with those interconnections (e.g., bandwidth) as well as other system resources including, but not limited to, access to memory and information stored in memory. In some embodiments, resources can be deallocated to particular users/nodes either because the situation requires limiting their access, or because the resources are required for other participants in the situational network.

In some embodiments, the system prioritizes certain communication modes (e.g., SMS or WhatsApp) over other communication modes (e.g., Facebook, Instagram) because a user utilizes those modes preferentially. In some embodiments, certain apps or communication modes are deprioritized or turned off so that the user's attention is turned to the modes of communication over which messages related to the situation and the situational network are transmitted.

In order to efficiently locate the appropriate nodes to incorporate into the situational network one or more "seeding" techniques can be used to project out the candidate participants. For example, a degree of separation can be used such that a party known to be impacted by the situation serves as a seed and nodes connected by n degrees of separation are examined to determine if they should be included in the projection. This search can be based on projection criteria independent of the degree of separation, or projection criteria that changes based on the degree of separation. In some embodiments, geographic location is used to seed the projection, with the initial projection being based on nodes identified to be within a specified radius r of a location, with r being progressively increased to bring in additional nodes. This allows for rapid identification of the nodes most proximate to the situation to be identified and incorporated into the situational network.

In some embodiments, the seeding is based on a particular association stored as a link. An association including but not limited to employment, interest, attendance, behavior, activity, data pattern or other parameter associated with a user/node is used alone or in conjunction with a node parameter (e.g., identity, title, location) to initiate the projection. Other node or association parameters can then be added to the projection to increase the number of nodes identified in the projection. By limiting the number of nodes in the initial projection the system can identify a first set of participants for the situational network and then expand the projection to identify and include other participants.

In some embodiments, the system performs projection based on a synchronous search, in which the search, based on seeding or other criteria, is initiated on one or more nodes and their associated nodes, and proceeds to other nodes, projecting out nodes sequentially in the process. This has the advantage of providing an immediate response and identifying nodes to be immediately incorporated into the situational network based on a seeding parameter (e.g., degree of separation, location). In some embodiments, the system initiates asynchronous searches across the database, adding to the projection as nodes are identified in independent and non-blocking searches. In some embodiments, a combination of a synchronous and asynchronous searches is used One or more nodes can serve as active nodes in the projection process and be used as the nucleus for the projection. In some embodiments, a node is designated as the active node or situation node and projections are made based on that node. The node can serve as the basis for synchronous projections for the identification of relevant nodes to be incorporated into the situational network. Such a node may also serve as the situation authority, having the authority and basis to incorporate other nodes into the situational network or networks.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 8 shows an illustrative example of the use of multiple projections (e.g., $S_1(G)$, $S_2(G)$ and $S_3(G)$) to create three situational networks for different types of access based on the parties, in accordance with some embodiments of this disclosure.

FIG. 9B shows an illustrative example of the formation of physical situational networks corresponding to exemplary relevant networks for a cybersecurity use case, in accordance with some embodiments of this disclosure.

FIG. 9D shows an illustrative example of the permission table for a combined situational network for an exemplary cybersecurity use case, in accordance with some embodiments of this disclosure.

FIG. 12B shows an illustrative example of the formation of physical situational networks corresponding to the 911, social, and healthcare networks for an exemplary 911 use case, in accordance with some embodiments of this disclosure.

FIG. 12D shows an illustrative example of the permission table for a combined situational network for an exemplary 911 use case, in accordance with some embodiments of this disclosure.

FIG. 22B shows an illustrative example of a graph representing nodes and associations pertaining to an exemplary virtual reality use case, in accordance with some embodiments of this disclosure.

FIG. 22D shows an illustrative example of the permission table for a combined situational network for an exemplary virtual reality use case, in accordance with some embodiments of this disclosure.

FIG. 23A shows an illustrative example of a representative triplestore database for a 911 use case, in accordance with some embodiments of this disclosure.

FIG. 23B shows an illustrative example of a representative set of projection operators for a 911 use case, in accordance with some embodiments of this disclosure.

FIG. 23C shows an illustrative example of a representative set of resource allocation parameters for a 911 use case, in accordance with some embodiments of this disclosure.

FIG. 23D shows an illustrative example of a representative triplestore database for a 911/virtual reality use case, in accordance with some embodiments of this disclosure.

FIG. 23E shows an illustrative example of a representative set of projection operators for a 911/virtual reality use case, in accordance with some embodiments of this disclosure.

FIG. 23F shows an illustrative example of a representative set of resource allocation parameters for a 911/virtual reality use case, in accordance with some embodiments of this disclosure.

FIG. 23G shows an illustrative example of a representative triplestore database for a network security use case, in accordance with some embodiments of this disclosure.

FIG. 23H shows an illustrative example of a representative set of projection operators for a network security use case, in accordance with some embodiments of this disclosure.

FIG. 23I shows an illustrative example of a representative set of resource allocation parameters for a network security use case, in accordance with some embodiments of this disclosure.

FIG. 23J shows an illustrative example of a representative triplestore database for an enterprise communication use case, in accordance with some embodiments of this disclosure.

FIG. 23K shows an illustrative example of a representative set of projection operators for an enterprise communication use case, in accordance with some embodiments of this disclosure.

FIG. 23L shows an illustrative example of a representative set of resource allocation parameters for an enterprise communication use case, in accordance with some embodiments of this disclosure.

DETAILED DESCRIPTION

In some embodiments, a situation application runs a situation system e.g., on one or more devices, e.g., devices 5500, 5510, 6002, 6004. In some embodiments, the situation application runs on a server, a user equipment device such as a laptop, smartphone, tablet, television, or any other suitable device or any combination thereof.

Figure 1:
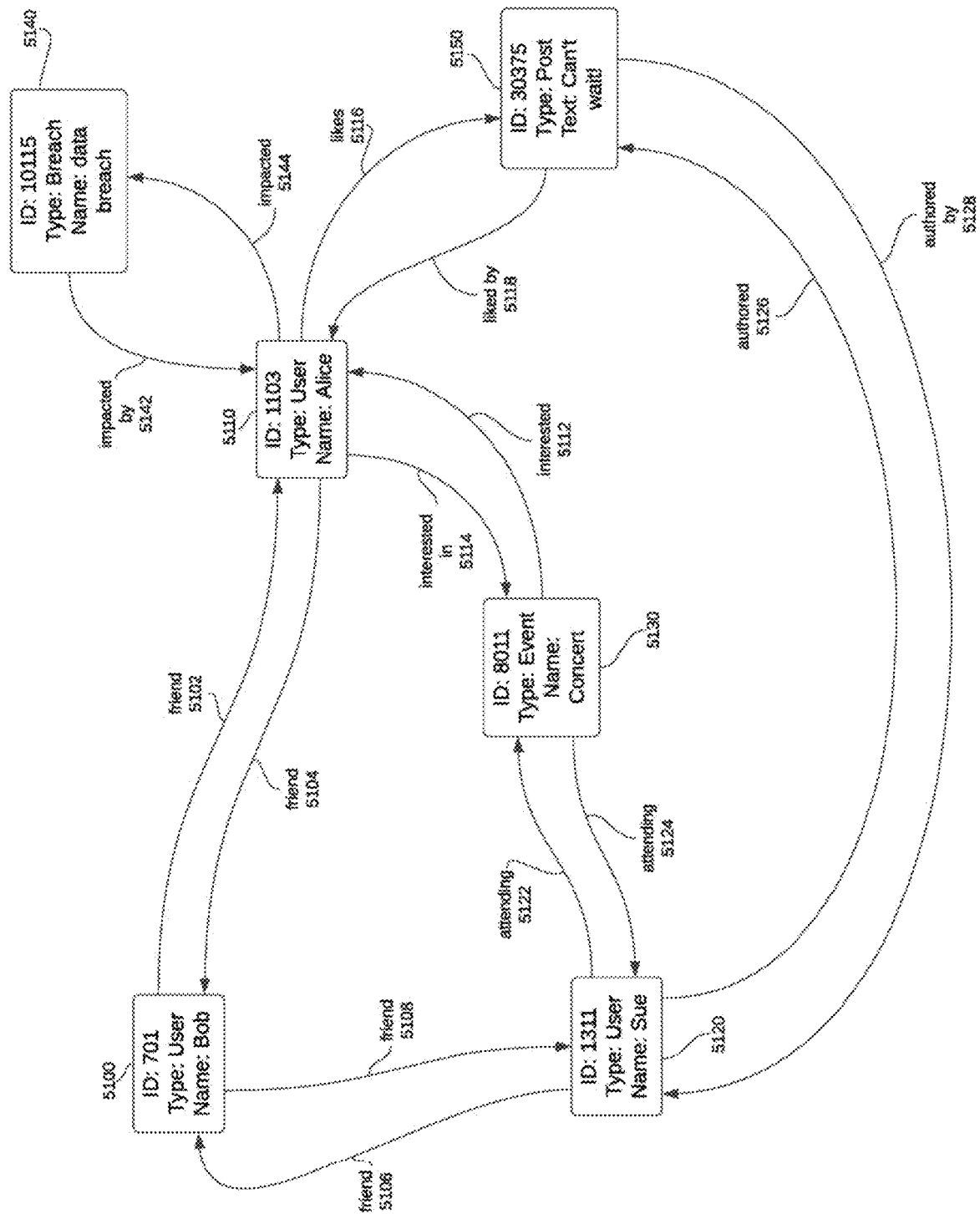
FIG. 1 shows an illustrative example of a representative social network depicted as a social graph, in accordance with some embodiments of this disclosure.

Social networks, such as the one illustrated in FIG. 1, can be modeled and built as graph networks on a server using one or more databases, with nodes representing entities such as users, posts, comments, or locations, and edges which represent the relationships between the nodes. In the case of a social network such as Facebook or LinkedIn, the edges can represent friendships/connections, attendance or interest in an event, or behavioral interests (e.g., car shopping). A variety of additional information, ranging from qualifications, proximity and location data, health information, and in the case of networks, network parameter information including usage, parties contacted and types of connections established can be stored as associations. In some embodiments, these are stored within a graph database. Nodes in the graph can represent users, events including crises as well as beneficial events such as concerts, network security events including breaches and attacks, organ donors, health care facilities and other objects, people, events, and locations. In other embodiments, the nodes and associations are stored within a triplestore database. Each entry, or 'semantic triple', stored within the database consists of a subject, predicate, and object. Together these triples describe meaningful relationships between subjects (nodes), as well as storing information pertaining to the subject (node).

Referring again to FIG. 1, a social network is represented as a directed graph with nodes representing both users and events, and edges representing associations and relationships. As can be seen, a first user (Bob) is represented by first user node 5100 and has indicated friendships with a second user (Alice) represented by second user node 5110 with the friend associations represented by Bob-Alice friend association 5102 and Alice-Bob friend association 5104. Similarly, a third user (Sue) represented by a third user node 5120 has a Sue-Bob friendship association 5106 and a Bob-Sue friendship association 5108. A concert event is represented by concert node 5130 with user Alice, represented by second user node 5110, having an interest in association 5112 and interested association 5114 with concert node 5130 indicating that they are interested in the event. Third user Sue, represented by third user node 5120 has a bidirectional attending relationship with concert node 5130 as shown by attending associations 5122 and 5124. The server associated with the social network creates a post node 5150 when third user Sue, represented by third user node 5120 creates a comment "can't wait!" The server stores the association between the author (Sue) and the post by authored association 5126 and authored by association 5128. Alice's response to the post ("liked") is captured by likes association 5116 and liked by association 5118.

Various systems and architectures can utilize a social network/graph for storage of information and subsequent development of a situational network for particular use cases. For example, a data breach event can be represented in a social network by a data breach node 5140. Although a data breach event can be detected in a number of ways, typical breach detection systems look for malicious software activity on the network. Malicious software activity can include, but is not limited to, attempts to access secure portions of the network or secure data, attempts to logon to accounts, installation of malicious software or ransomware that will render the system unusable. Particular users impacted by the data breach event can be represented, by situational system, by associations such as impacted by association 5142 and impacted association 5144. In fact, any event, whether it be beneficial (e.g., music or performance event), crisis, or otherwise can be modeled as a node in a social network/graph. As will be discussed, a corresponding virtual event can also be created to correspond to an actual physical world event.

Figure 2:
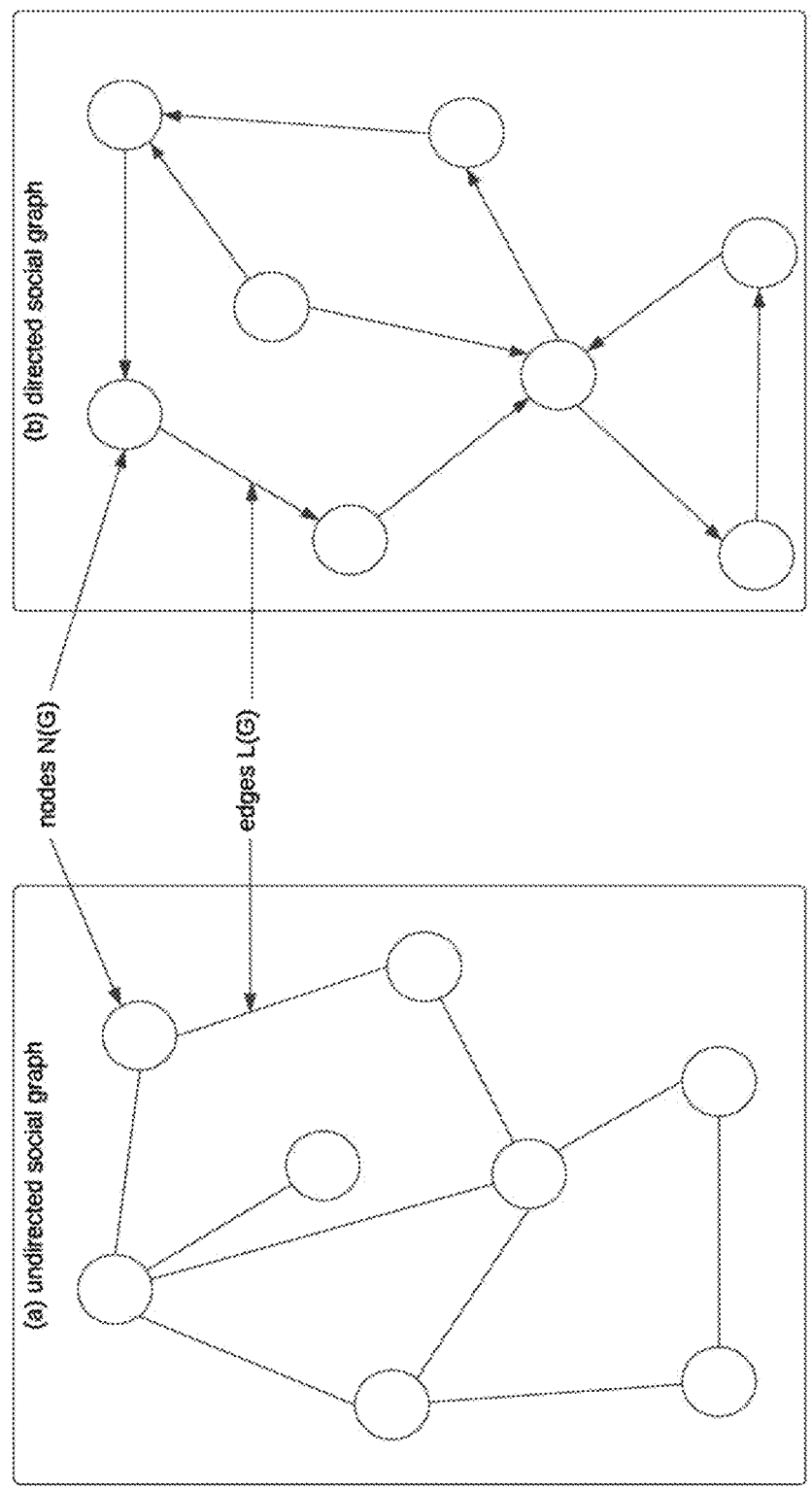
FIG. 2 shows an illustrative example of undirected and directed social graphs, in accordance with some embodiments of this disclosure.

Referring to FIG. 2, social networks implemented on servers (e.g., of the situational system) and other computing platforms can be modeled as undirected (FIG. 2(*a*)) and directed (FIG. 2(*b*)) graphs with nodes N(G) and links (edges or associations) L(G). A link or edge can be denoted as an ordered pair (i,j) representing a connection between node i (the initial node) to node j (the final node). If the direction of the link is not important, such that the existence of a link between node i to node j necessarily implies the existence of a link from j to i, the network can be considered to be an undirected graph. If the direction of the link is important, allowing a distinction between a link from i to j and j to i (as in FIG. 2(*b*)) the network is said to be a directed graph.

As one of skill in the art can appreciate, social networks can be represented by undirected or directed graphs, and the social network of FIG. 1 can be represented by an undirected graph. The types of event nodes shown in FIG. 1 are representative only and a wide variety of events, ranging from weather events, crisis situations, network attacks, and other emergency and non-emergency events can be represented by event nodes. When used herein the term association when used with respect to a social network or graph database indicates a stored link or edge.

Figure 3:
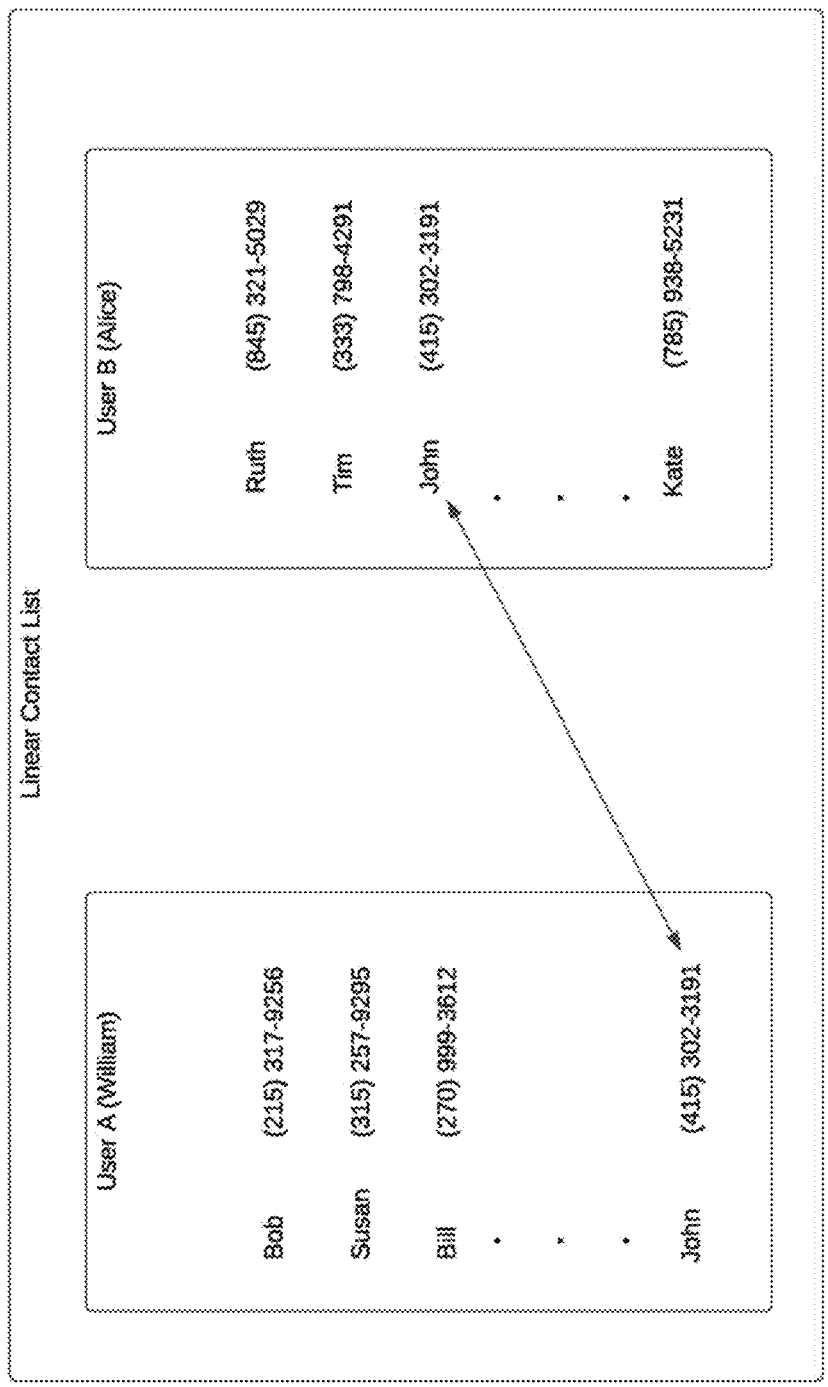
FIG. 3 shows an illustrative example of linear contact lists for two users, in accordance with some embodiments of this disclosure.

Although social networks are both popular and useful for social and business use, individuals frequently rely on linear networks including a contact database (stored on a phone, computer, cloud storage, or across all of those devices/platforms) which has contact information for their direct (single degree of separation) contacts. FIG. 3 illustrates contact lists for two users (William and Alice) and shows the existence of one overlapping contact. Because the contact databases are one-dimensional (linear) in the sense that they store a user as a contact with a variety of contact parameters without regard to connections between users or between users and other objects not in the contact fields (e.g., qualifications, location information, history) no information regarding the fact that William and Alice both know John (and are thus second degree of separation contacts) is stored, and neither William nor Alice, based on their contacts, are aware of each other. As such, a social network that William, Alice and John utilize may have stored information (e.g., stored associations) between the parties, including the fact that Alice and John are connected by two degrees of separation (e.g., via John) but the linear network may not store this association.

In some embodiments, situational networks are formed, by the situational system, from social networks by having a server or other computing device, either part of the social network or resident on a server having access to the social network, project the parties (nodes) impacted by or required for assistance (in the event of a crisis) or potentially interested in (in the case of an event) out of the social network or on an alternate social network platform. In the case of a crisis with a particular geographical location, the location of the individual with respect to the crisis can be used to identify impacted parties via a geolocation projection. In the case of an event, interest parameters can be used to project interested parties/nodes from the network and create the situational network. Interest or service parameters can be combined with geolocation to identify parties both potentially interested and proximate to an event to connect via the situational network. Additionally, relationships between users, such as degree of separation, affiliations with users with particular interests/likes, and history on the social platform can be used in the development of the projection.

Figure 6A:
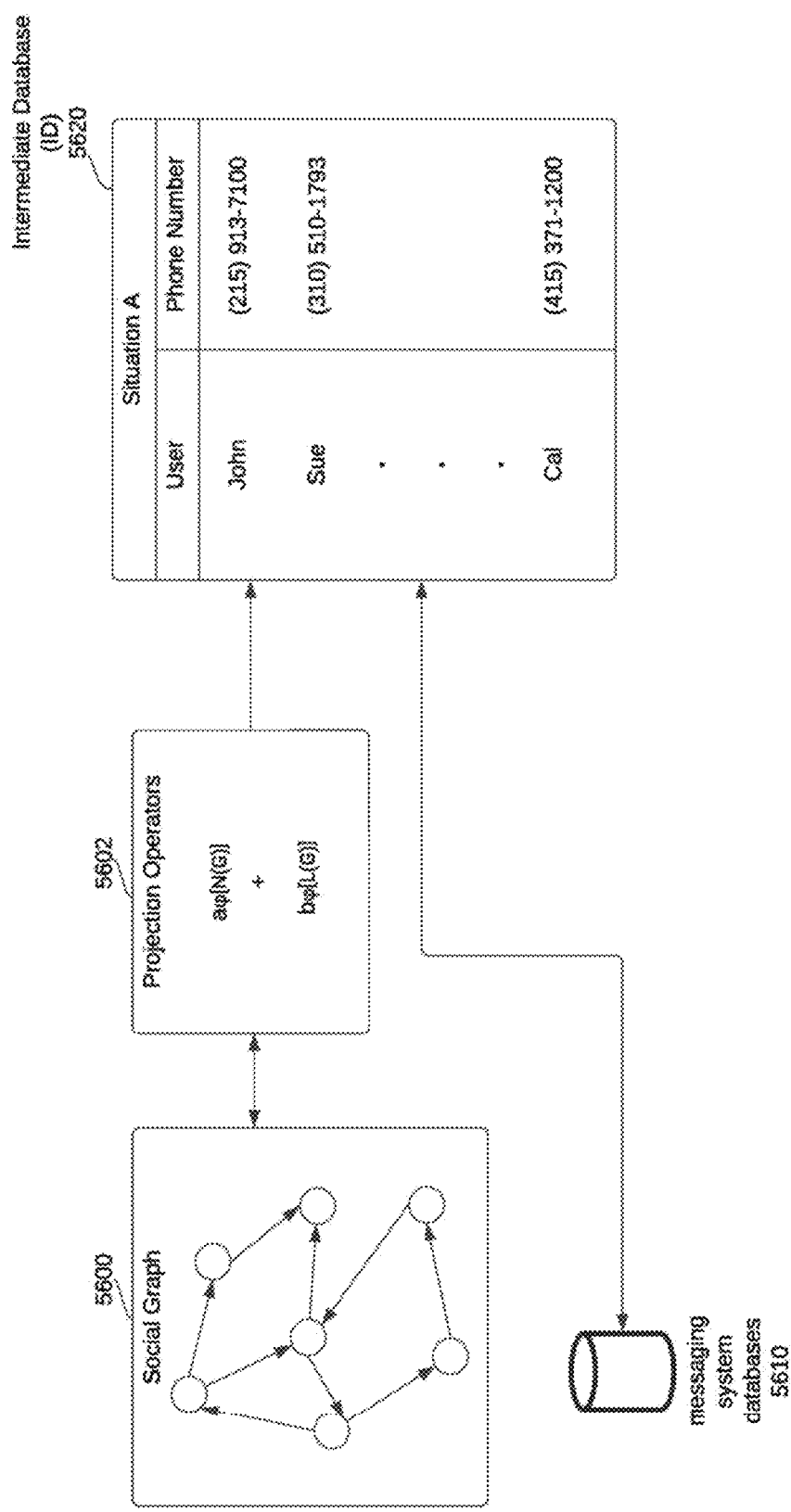
FIG. 6A shows an illustrative example of the use of link and node operators (e.g., $a\varphi[N(G)]+b\psi[L(G)]$) to create a situational projection $S(G)$, in accordance with some embodiments of this disclosure.

An illustration of the use of projections is illustrated in FIG. 6A, where a social graph 5600 represents the nodes and interconnections typical within a social network. A server or other computing device utilizes projection operators 5602 to project out the relevant participants in the situational network. In order to create appropriate groups or lists for the formation of the situational related networks on platforms that do not contain the nodes and associations of the social graph, Intermediate Database 5620 contains compiled user data for the recommended participants in the situational network operating on a platform other than the social network from which the situational network was precipitated. In some embodiments, messaging system database 5610 is accessed to find contact data for projected participants, and populates intermediate database 5620 with the required information for contacting users off the social network platform and for joining them to the situational network.

In some embodiments, an Intermediate Database (ID) can be used to store information corresponding to addresses (e.g., email, phone number, or other unique identifier) that can be used to connect to a user on a network other from the social network/graph which the projection operates on. As illustrated in FIG. 6A, Intermediate Database (ID) 5620 tabulates the relevant information to create a group corresponding to the situation and to allow for interconnection in the appropriate linear network. In some embodiments ID 5620 is created by one or more servers that form part of the social network from which the projection is made. In some embodiments ID 5620 is created by a server not directly associated with, but with access to, the social network. ID 5620 can be stored on the server which created it, or can reside on one or more other servers that are not part of the social network. In some embodiments, ID 5620 is stored locally on a user device.

The server creating ID 5620 populates the database with information sufficient to interconnect the impacted parties on either the social network from which the projection was made, or on a secondary network. For example, ID 5620 can contain the names and phone numbers of relevant parties identified in the projection. The user info can be used to establish, for example, SMS group messages or chat groups with the group members. In some embodiments the server hosting ID 5620 communicates with messaging system database 5610 to determine appropriate contact information or user IDs for that particular platform. For example, projection operators 5602 may create a list of relevant parties with user names and IDs for the social network which provided the basis for the creation of the group (via the projection). Messaging system database 5610 can be accessed to determine the appropriate user IDs for the respective platforms. If, for example, the projection is made from a social network platform such as Facebook, the server hosting ID 5620 may contact an SMS database (via SS7) to confirm phone numbers for the suggested participants as well as contacting a WhatsApp server to determine contact info for participants on that platform.

Figure 6B:
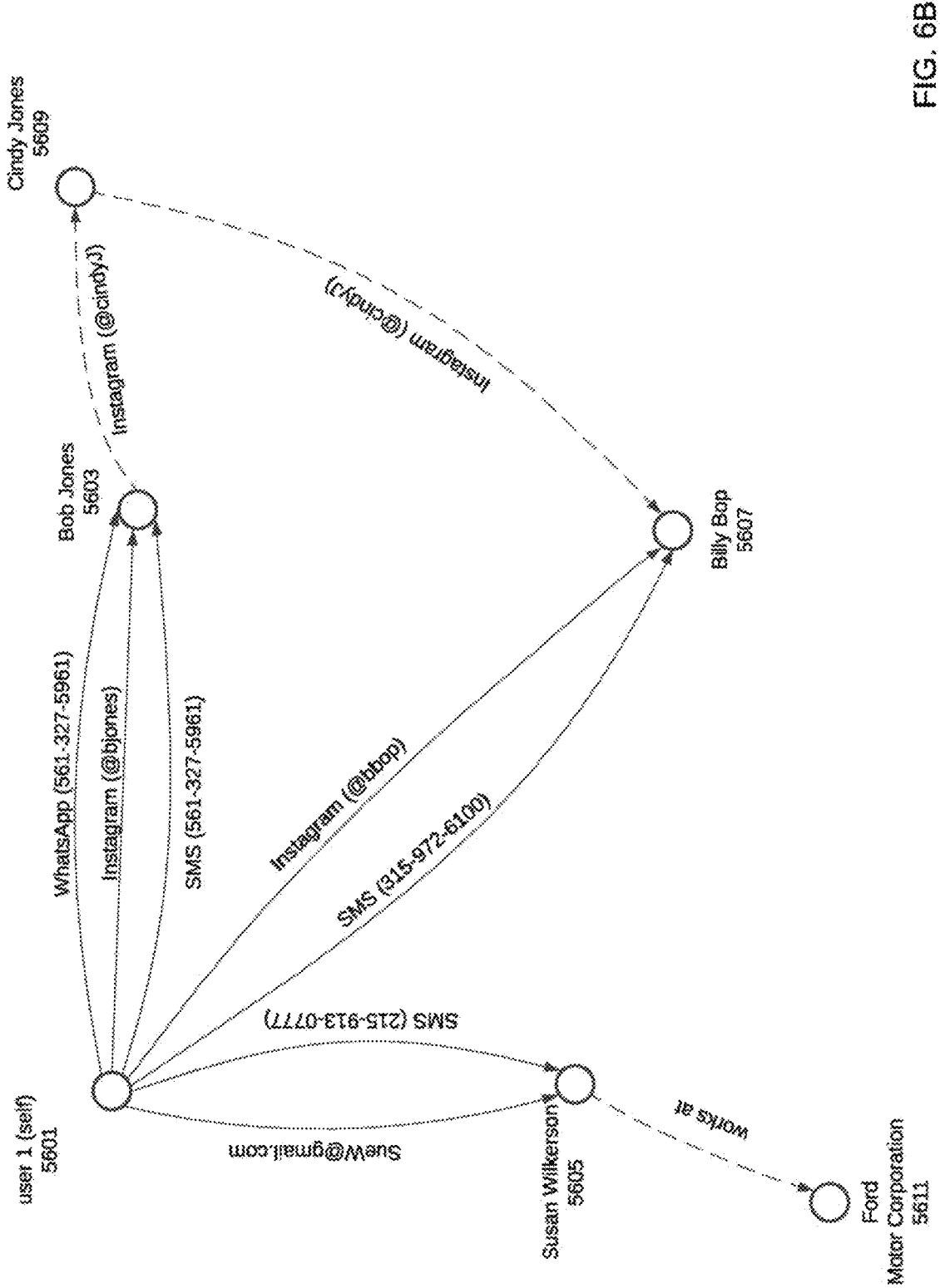
FIG. 6B shows an illustrative example of a graph-of-graph database that stores modes of communication as association between nodes representing users, in accordance with some embodiments of this disclosure.

FIG. 6B represents an alternative to ID 5620 which is the "graph of graphs" database in which the relationships between users, and potentially other information, is stored in a directed or undirected graph database. In some embodiments, a user is indicated as a node, which in FIG. 6B is user (self) 5601. Individuals the user is associated with, typically memorialized as contact data and frequently stored on a user device such as a smartphone, are stored as nodes. For example, user (self) has contacts Bob Jones 5603, Susan Wilkerson 5605, and Billy Bop 5607 which are represented as nodes in the graph of graphs, with their contact info stored as associations between the user and the nodes representing their contacts. The user's contact info for other individuals (e.g., Instagram handle, SMS or WhatsApp number) are stored as associations between user (self) 5601 and the nodes associated with the respective contacts. Although FIG. 6B illustrates a directed graph in which the directivity indicates the contact info for the parties associated with user (self) 5601 other embodiments based on undirected graphs are possible.

In some embodiments, data regarding how users are typically contacted is recorded in the graph of graphs as associations between the user and the nodes representing their contacts. For example, in addition to storing Bob Jones 5603 contact info as associations (e.g., WhatsApp (561-327-5691), Instagram (@bjones) and SMS (561-327-5961) the frequency in which Bob Jones 5603 is contacted by User 1 (Self) 5601 using each communication mechanism may also be stored (e.g., WhatsApp is used 72% of the time, Instagram 20% of the time and SMS 8% of the time). In addition to usage the response time of the individual on a particular platform can be stored (e.g. average SMS response time 12.7 min, average Instagram response time 2.3 min), such that a projection can be made identifying the platform on which the individual will respond most quickly. This feature can be used to greatly enhance the efficiency of a resulting situational network because it allows for optimization of the response time of the identified participants. The additional information can be derived through computer based observation of network communications including data mining using artificial intelligence techniques that provide for learning of patterns used by participants, which in the aforementioned example are individuals in communication with Bob Jones 5603 over various platforms.

In some embodiments, additional nodes—potentially representing parties not known to user (self) 5601—are also stored in the graph of graphs. For example, Bob Jones may know, be related to, or associated with (via a relationship such as work or via a communications or social media platform) an individual named Cindy Jones. As such, Cindy Jones may be represented as a node in the graph of graphs (Cindy Jones 5609). The relationship may also be memorialized in the graph of graphs, which in FIG. 6B is shown as the Instagram address @cindyj which would indicate that Bob Jones 5603 follows Cindy Jones 5609 on Instagram via @cindyj. This information can be derived from existing social networks and even if not consciously known to the user or stored in their contact info may be present in the graph of graphs associated with the user.

In some embodiments, the information stored in the graph of graphs may not be limited to contact info, but may contain associations such as where an individual works, events they attended, interests, likes, and other information that is typically stored in a social network. As illustrated in FIG. 6B, a "works at" association between Susan Wilkerson 5605 and Ford Motor Corporation 5611 can be stored in the graph of graphs.

The graph of graphs can be derived through multiple mechanisms and stored in one or more locations. In some embodiments, a user device such as a smartphone mines the contact information of the user to create a graph of graphs which is stored locally as well as being backed up in the cloud. In this embodiment the application providing the graph of graph creation may be provided as part of the smartphone. In an alternate embodiment, third party software is utilized, either as an application running on the user's device (e.g., smartphone) or on a remote server. The third party application can mine not only the user's contact info but external social networks (e.g., Facebook, Instagram, LinkedIn) to determine not only the first degree contacts and associated information (e.g., addresses, handles, work locations, events attended, likes) but second through $n^{th}$ degree contacts and associations between those contacts, represented as edges on the graph of graphs.

In some embodiments, an existing social network provider (e.g., Facebook, Instagram, LinkedIn) provides a "graph of graphs" service in which they aggregate information across their platforms or across a number of platforms including platforms external to the social networks they operate. Access to the graph of graphs is provided to users to allow them to execute projections on the graph of graphs to create cross-platform situational networks.

As will be appreciated by one of skill in the art, the graph of graphs database allows for the rapid and efficient creation of cross platform situational networks in which parties can be identified and invited to or joined to a situational network in spite of the fact that may not all be on the same platform. The ability to automatically connect parties from one platform (e.g., 911 services or SMS messaging) to social networks such as Facebook and Instagram as well as communications platforms such as WhatsApp allows individuals that need to communicate important information relevant to the situation to communicate that information to the appropriate parties without searching for their contact info and requesting connections. Additionally, situational networks originating on a social network such as Facebook, Instagram or LinkedIn can be readily extended to linear networks such as SMS messaging platforms or WhatsApp through use of the graph of graphs to project the relevant individuals (nodes) and automatically connect them.

The graph-of-graphs can be used as an intermediate database or in conjunction with an intermediate database. In some embodiments, the graph-of-graph serves as the intermediate database itself and is used to establish the basis for cross-network connections. In an alternate embodiment the graph-of-graphs is used as the basis for the intermediate database, with the available or most appropriate (e.g., based on response time) means of communication for a particular user being derived from the graph-of-graphs and used to populate the intermediate database.

As an example of how node and link operators can be used to precipitate recommended members for a situational network, a situation such as a power outage may be noted and an appropriate event node created in a social network. In some embodiments, the weighted combination of node projections and link projections ($a\varphi[N(G)]+b\psi[L(G)]$) can be used by identifying users within the geographic proximity of the power outage as well as users that have a specified relationship with those users within the geographic proximity of the outage. For example, service providers (e.g., suppliers of food, generators, medical care, and other critical services) which can supply users impacted by the power outage (determined by geographic proximity) may be identified via the link portion of the projection. Similarly, relatives of users impacted by the power outage may also be projected out of the social network (as represented by the social graph) via the projection operators.

Because users frequently rely on a combination of databases, e.g., a social network and linear or flat database that simply contains a list of contacts their contact information (which may be contact information including email addresses, telephone numbers and social media handles) it can be important to be able to create a multi-network situational network that allows users to be joined to the situational network across platforms, such as a social media platform (e.g., Facebook) and a linear network such as the SMS network or WhatsApp. As will be discussed, a number of techniques can be used to create a multi-network situational network.

Figure 7:
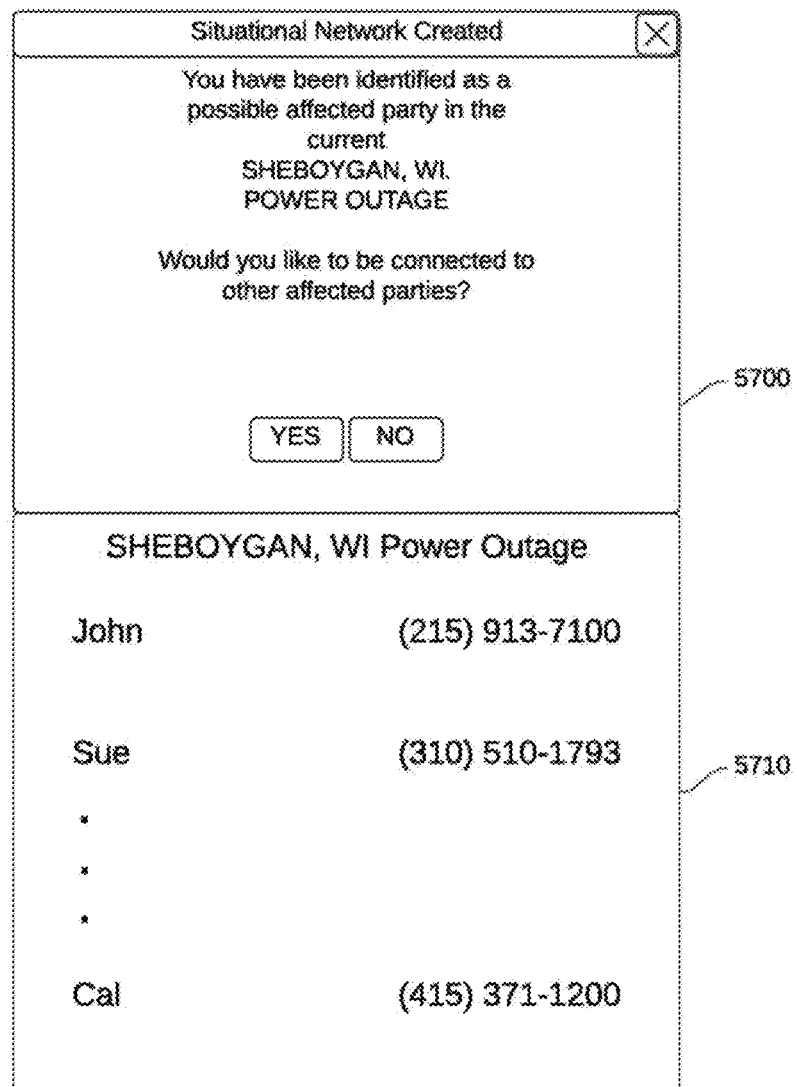
FIG. 7 shows an illustrative example of representative communications for situational networks formed on text or chat applications, in accordance with some embodiments of this disclosure.

FIG. 7 illustrates representative SMS/chat communications for parties placed into the situational network. In some embodiments the server hosting ID 5620 communicates with servers associated with the SMS/chat communications systems (either through a proprietary interface, open interface, or specified API) to create a group chat on the SMS/chat communications platform. In some embodiments ID 5620 resides directly on servers associated with the SMS/chat communications system, and the group chat is created directly on the SMS/chat communications system. Notification message 5700 indicates to a user that they have been placed into a group chat based on a determination (projection) and provides the user with the ability to opt out by responding "NO" or "N." In some embodiments users are provided with complete contact information for parties in the situational network as indicated by situational roster 5710. In an alternate embodiment the members of the situational network remain anonymous through blocking of their contact data in the group message/chat. As such, parties can participate in the situational network without revealing specifics such as their name and contact data (e.g., phone number, email, social network name).

In some embodiments, in the creation of a situational network, whether created across one platform or extending across platforms, requires the allocation of resources in the network(s). Resources can include computational resources such as processing power (e.g., CPU or GPU processing power), storage resources such as disk space or cloud storage, memory resources such as RAM allocation, network resources such as bandwidth and access to network segments, software resources such as licenses or API access, data resources such as databases or datasets, energy resources such as power allocation, and user-specific resources such as access to user accounts and profile customizations, security resources such as encryption/decryption keys, access to firewall and security settings, and access to cloud computing resources such as virtual machines and container instances.

Figure 11:
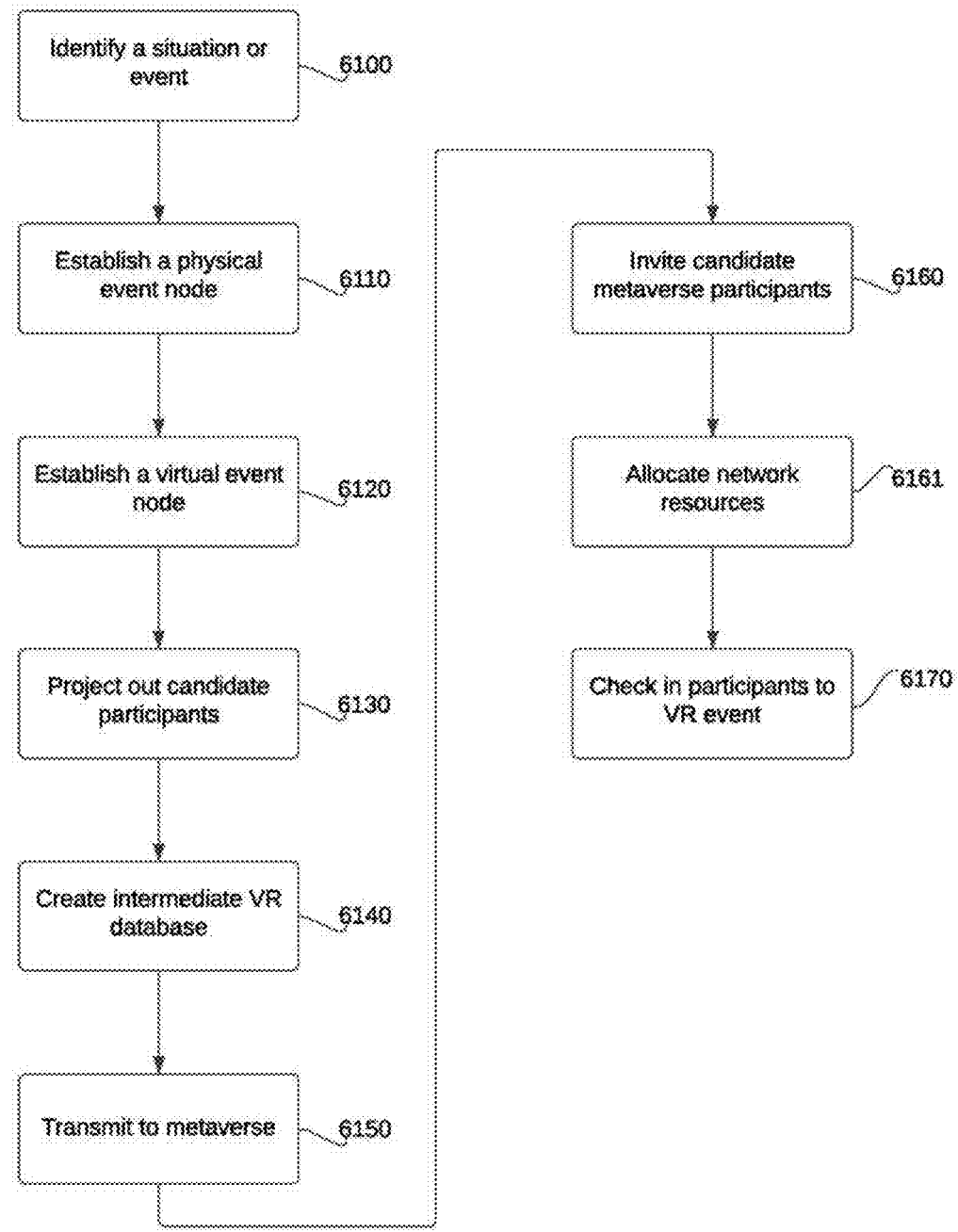
FIG. 11 is a flowchart of an illustrative process for a VR use case, in accordance with some embodiments of this disclosure.
Figure 15:
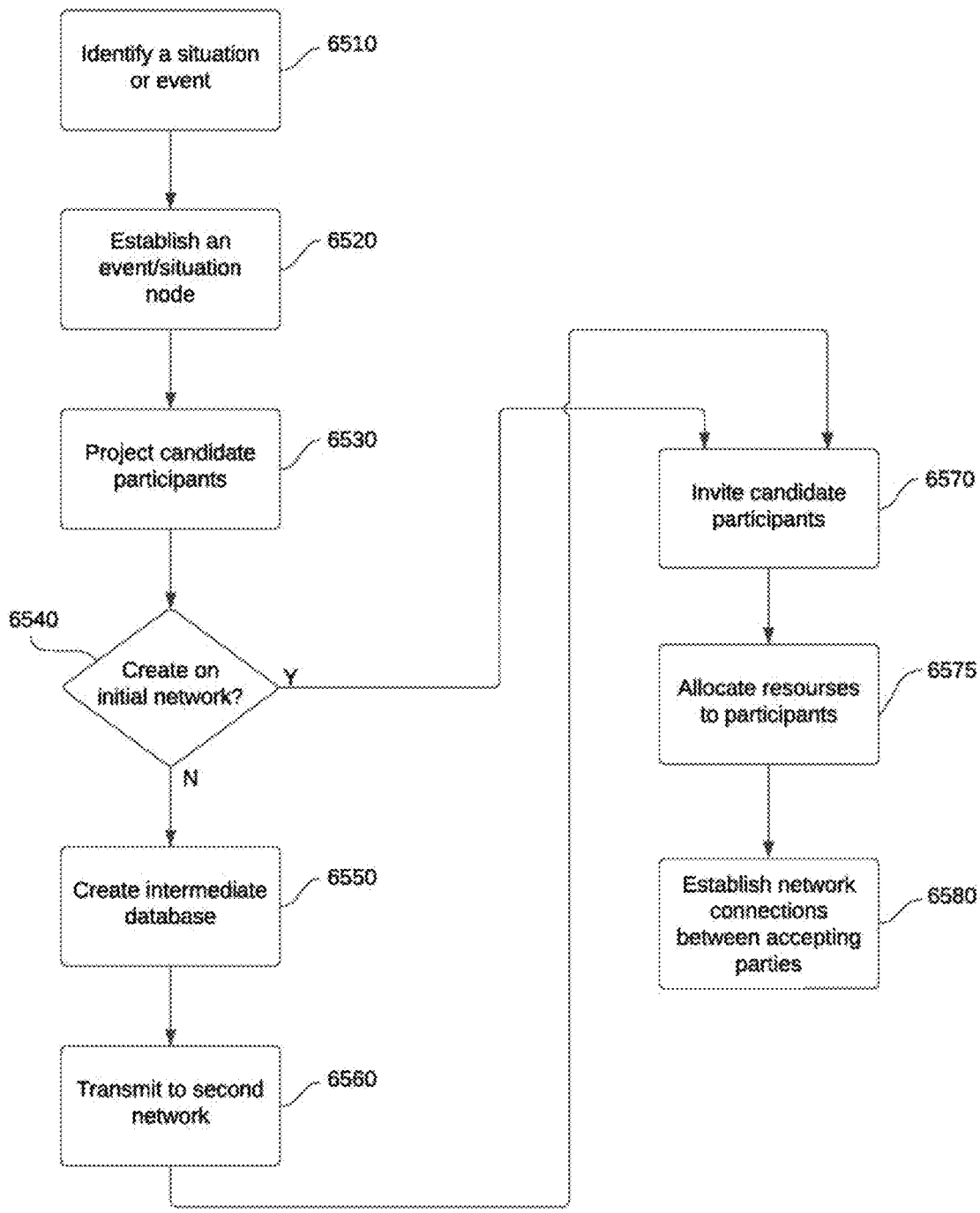
FIG. 15 illustrates a flowchart for the creation of a situational network, in accordance with some embodiments of this disclosure.

In some embodiments, as part of the formation of a situational network, and as outlined in the flowcharts of FIGS. 11 and 15, in addition to inviting or joining candidate participants to the situational network, resources need to be allocated. These resources can be Internet based, such as establishment of a TCP/IP channel or connection, or may involve allocation of bandwidth on a cellular, satellite, fiber optic or other network. Additionally, control of certain parameters such as bandwidth, video camera pan and zoom, volume levels, or other control parameters may be given to particular participants in the situational network. This allows for critical information to be appropriately managed and disseminated. In some embodiments, resources such as access to files is granted to situational network participants, while in other cases access can be restricted.

FIG. 8 illustrates the creation of multiple tiers or hierarchies of situational networks. This can be accomplished through the use of different projection operators when the projection is made, or by filtering, queries, or other database techniques as applied to the projected list of members. As will be appreciated by one of skill in the art, the server creating the projection can utilize different dimensions formed by the nodes and associations of the social network in the creation of the projection. For example, parties considered to be first responders (e.g., police, fire personnel, ambulance operators) can be represented as a particular dimension within the social network. This dimension, when coupled with geographic proximity, availability, response time, and other attributes can be used by the server in the creation of the projection. Considering the case of an active shooter at a school, a first responder situational network can be created by a server associated with or having access to the social network, resulting in a first responder ID 5800. This contains the contact information for the appropriate first responders. Similarly, a first tier of parties impacted by the active shooter can be created and can represent parties that are threatened such as teachers and students. This information is represented in ID 5810. Finally, active shooter related parties, including the parents of students in the school, can be identified and their contact info maintained in related parties ID 5820.

As will be appreciated by one of skill in the art, different communications networks can be used for the hierarchy of tiers within the situational network as illustrated in FIG. 8. For example, the first responders may use secure police/fire/EMS communications networks including FirstNet Authority and other closed networks to communicate with each other. The projection enables the rapid assembly of the first responder situational network via first responder ID 5800. Impacted parties including students and teachers likely to be in the school can be identified via the projection with their information being stored in the impacted parties ID 5810. These parties may be contacted immediately so that they can receive instructions, check in as safe, or so that they can provide important information regarding the situation. Finally, related parties identified via the projection are tabulated in active shooter related parties ID 5820. These individuals will desire information regarding the situation but do not need to be involved in the emergency management itself. By establishing tiers within the situation it becomes possible to have different priority situational networks, potentially operating on different platforms.

Although described in the context of linear networks such as SMS and chat applications such as WhatsApp, the methods and systems described herein can be used in conjunction with web based systems and email, as well as radio and satellite based systems including police and emergency bands, amateur radio bands, and satellite radio and telecommunications networks. Use of web based systems supports the use of graphical user interfaces and will support advanced check-in/roll call procedures, as well as providing for the ability to provide news portals and advanced communications capabilities.

FIG. 15 represents an illustrative flowchart for the creation of a situational network. In identify situation or event step 6510 a situation or event is identified. In some embodiments, processing circuitry identifies the situation or event. The event can range from a crisis such as a fire, active shooter, hurricane, earthquake; network security events including data breaches, compromised server, phishing, denial of service attack, malware or ransomware that has been detected or activated; urgent request for an organ or notification of the availability of an organ; beneficial events such as concerts, conferences, meetings, specialized forums, social gatherings, book clubs, marketplace events (e.g., trade shows, craft fairs, hamfests) or any other situation or event where one or more participants either attend or are impacted by the event. The situation or event may be identified by human observation and subsequently reported, or can be detected in an automated fashion from cameras coupled with image analysis, facial recognition or artificial intelligence mechanisms, monitoring of a social network for posts, or other human or automated detection mechanisms.

In some embodiments, once the situation or event has been detected, an event/situation node is created on a server (e.g., one or more servers within the social network or on a network external to the social network) to establish an event/situation node step 6520. In a next project out candidate participants step 6530 the candidate participants are located, via processing circuitry, using a weighted combination of node projections and link projections (a$\varphi$[N(G)]+b$\psi$[L(G)]). As will be appreciated by one of skill in the art, the projection operators are determined by the specifics of the situation or event.

In a create on initial network step 6540 a test is performed to determine if the situational network can be established on the social network from which the participants are being identified. The criteria for determining if the situational network should be established on the social network can include the degree of connectivity and responsivity as compared to other networks. As an example, participants using a social network such as Facebook may have a longer response time than participants on an SMS/chat platform. For critical applications such as a crisis (e.g., fire, active shooter) it may be necessary to create the situational network on a network other than the social network. In some embodiments, situations/events are categorized for an automated determination as to the need to create the situational network on a different platform. In other cases, a computer-based analysis is performed, via processing circuitry, taking into account the required communication characteristics for the situation/event to determine if the situational network should reside only on the social network or if it should be established on one or more alternate networks. At the completion of create on initial network test 6540 the process flows to a create intermediate database step 6550 if it is determined that the situational network should be created on another network or cross between a social network and another network. In some embodiments, a graph of graph mechanism such as that shown in FIG. 6A is used to determine the best mechanisms for contacting an individual or object and can serve as the intermediate database.

If the computational platform (e.g., server or servers) determines that the situational network can be created on the social network from which it was formed, the process proceeds to an invite candidate participants step 6570, discussed below.

In some embodiments, a transmit to second network step 6560 results in the transmission of the intermediate database (such as the one shown in FIG. 6A) to the second network, or the use of a graph-of-graphs database (such as that shown in FIG. 6B) to communicate inter-network information. Once transmitted, an invite candidate participants step 6570 invites the selected participants to the situational network, including those off of the platform (e.g., social network) that may have been used for the initial identification of participants.

In some embodiments, an allocate resources to participants step 6575 allocates appropriate resources to individuals as they are joined to the situational network. As previously described, these resources can include a variety of computational, network, or other resources that are limited in supply. For example, an individual joined to a situational network may be granted a specific amount of bandwidth to allow them to reliably communicate, or transmit/receive video. In the instance of live video being transmitted over a situational network, dedicated bandwidth could be allocated to situational network participants to insure video quality. Other mechanisms, such as traffic shaping to prioritize video traffic over less time sensitive traffic could be used to maintain video stream quality. Quality of Service (QoS) parameters can be set to give higher priority to video and audio packets. Network security settings, including firewall configuration and the use of Virtual Private Networks (VPNs) can be used to provide a robust and secure connection, which can also be used for video. Server resources, including the use of dedicated servers for certain types of communications (e.g., video) and load balancing to insure adequate resource availability. Backup communications paths and redundant servers can be established to ensure reliable communications. Similarly, network monitoring and resource utilization tracking can be used to monitor.

In some embodiments, in an establish network connections between accepting parties step 6580 the parties accepting the invitation are connected to the formed situational network. Once joined to the situational network, those parties can, utilizing the resources allocated to them and within the constraints of any permissions/restrictions granted, communicate with other members of the situational network and participate in the situational network generally, having access to the information and resources deemed necessary for the operation of that situational network.

Figure 4:
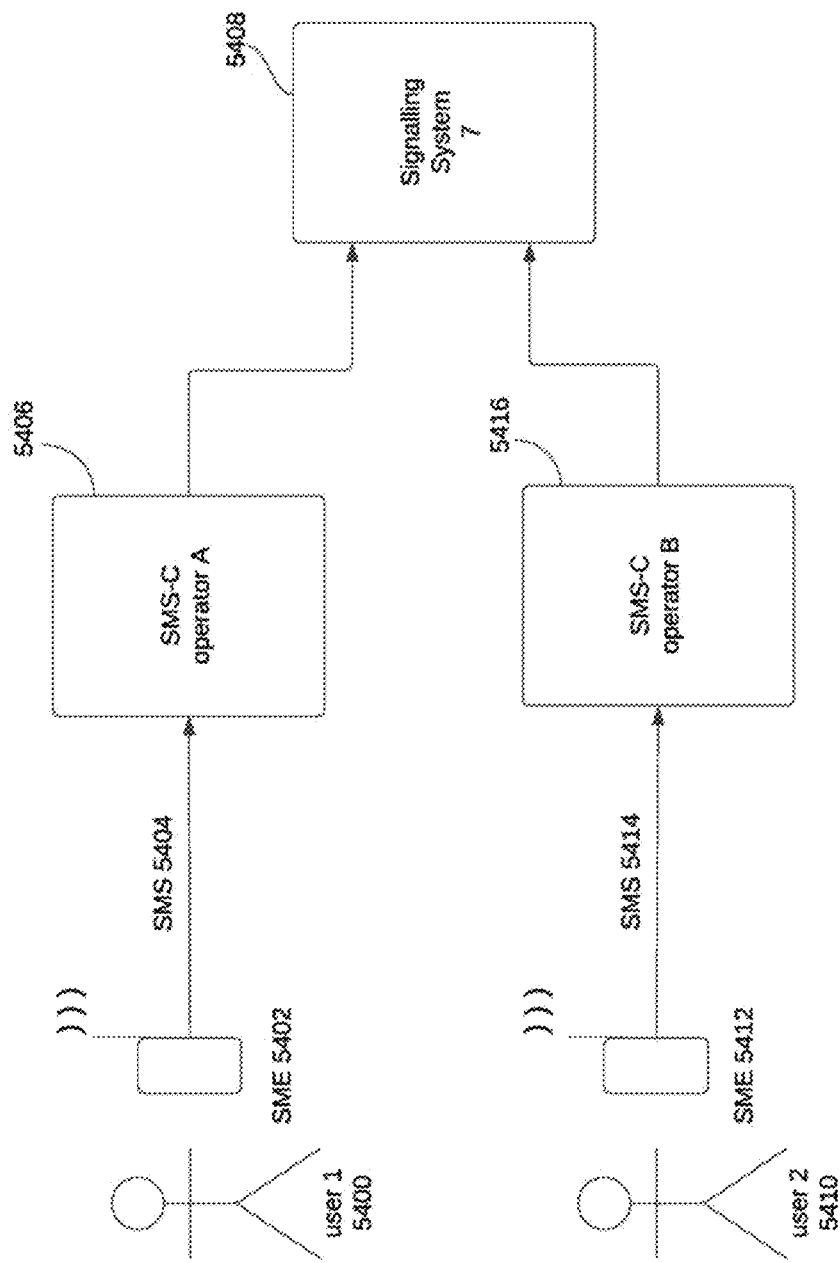
FIG. 4 shows an illustrative example of a representative Simple Messaging Service (SMS) network, in accordance with some embodiments of this disclosure.

In some embodiments, a representative Short Message Service (SMS) is shown in FIG. 4 in which a first user 5400 and second user 5410 operate phones 5402 and 5412 respectively. These phones act as Short Messaging Entities (SMEs), which transmit a first SMS message 5404 and a second SMS message 5414 which are received by operator A Short Message Service Center (SMS-C 5406) and operator B SMS-C 5416 respectively. The operator's SMS-C units utilize aspects of the Signaling System 7 (SS7) 5408 to interoperate and route SMS messages to the appropriate end receiving device (e.g., phone or computer).

As will be appreciated by one of skill in the art, physical entities in the telecommunications network, including Service Switching Points (SSPs), Signal Transfer Points (STPs) and Service Control Points (SCPs), work with the physical entities in the mobile phone network including but not limited to a Base Transceiver Station (BTS), Base Controller Station (BTS) and Mobile Switching Centre (MSC) to appropriately route the SMS messages. Databases within the SS7 system, including the Home Location Registry (HLR) and the Visitor Location Registry (VLR) to maintain the subscriber's service profiles as well as maintaining information on the current location of the subscriber. However, the databases do not maintain information regarding events or associations, and cannot directly support the creation of the situational network.

Figure 5:
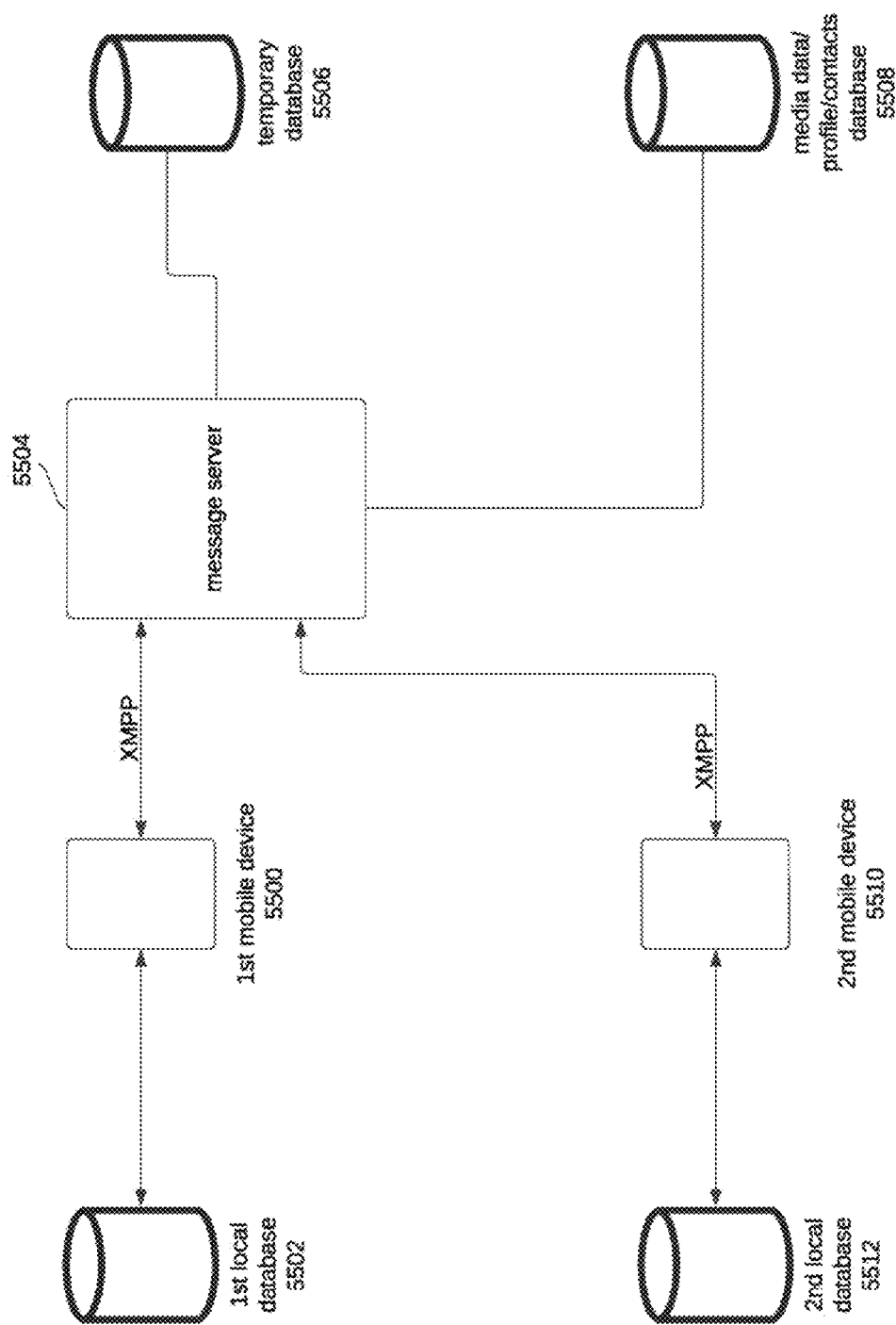
FIG. 5 shows an illustrative example of an architecture for a network such as WhatsApp, in accordance with some embodiments of this disclosure.

FIG. 5 illustrates the basic architecture of a chat system (e.g., WhatsApp) in which a 1st mobile device 5500 and second mobile device 5510 are connected to message server 5504. In some embodiments Extensible Messaging and Presence Protocol (XMPP) is used to send files and messages. In some embodiments a message is sent to message server 5504 which saves the message in temporary database 5506 where it is placed in a queue for delivery. The mobile devices 5500 and 5510 can utilize HTTP web sockets to send and retrieve multimedia data (e.g., images and videos) through a separate server (not shown) but may not always have the web socket open (e.g., when offline). Upon opening the chat application, thus reconnecting to the socket, messages stored in temporary database 5506 can be routed by message server 5504 to the appropriate user and the message can be deleted from the temporary database.

As shown in FIG. 5, a 1st local database 5502 is connected to 1st mobile device 5500 and a second local database 5512 is connected to 2nd mobile device 5510. These local databases are used to store contacts, messages, and associated files and form part of the chat system. A media data/profile/contacts database 5508 is also present to store relevant information for the system, but does not store associations or event nodes beyond what is necessary to maintain chat communications between users.

Figure 10:
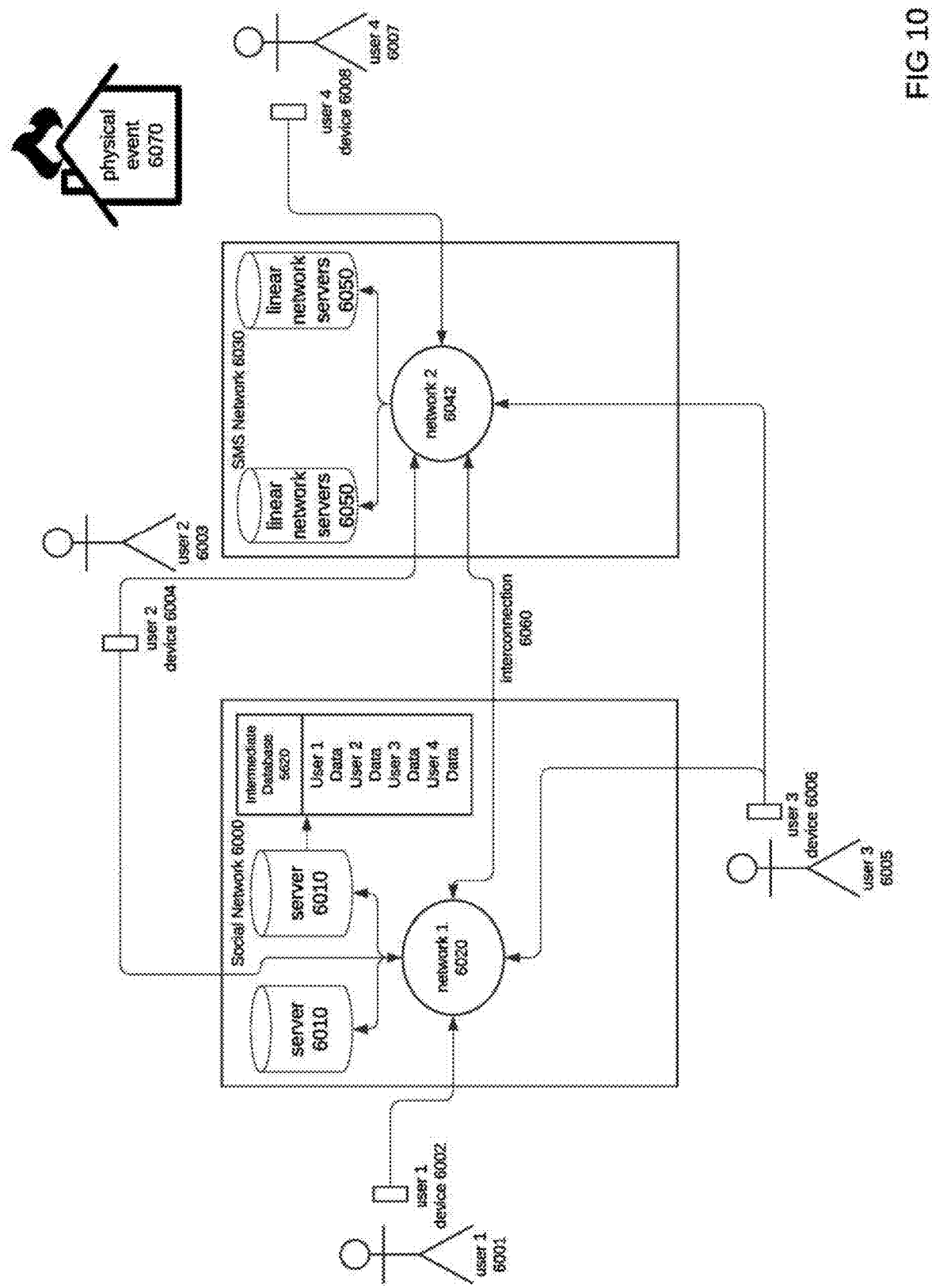
FIG. 10 shows an illustrative example of a representative implementation of a system creating cross-platform situational networks, in accordance with some embodiments of this disclosure.

Referring to FIG. 10 a representative example of an implementation architecture is shown. Social network 6000 is comprised of social network servers 6010 operating over network 1 6020. In some embodiments, network 1 6020 is the Internet. User 1 6001 operates user device 6002, user 2 6003 operates user 2 device 6004, and user 3 6005, operates user 3 device 6006.

Also in FIG. 10 a second network, in this case a SMS/chat network 6030, operates on a series of linear network servers 6040 connected to network 2 6040. Network 2 6042 can be the Internet or can be an alternate network such as the public telecommunications infrastructure. User 4 6007 operates user device 4 6008, and user 3 6005 operates user 3 device 6006.

In some embodiments, an event, such as a physical event (fire) 6070 occurs and is reported to or detected by social network 6000. Social network 6000 can determine that physical event (fire) 6070 is occurring via reporting by members of social network 6000, automated detection and verification of posts related to physical event (fire) 6070, connections to public safety networks, monitoring of police and fire communications, or other methods of detection and verification. Once the existence of physical event (fire) 6070 is reported and confirmed an event node corresponding to the event will be created in social network 6000. In some embodiments the server associated with social network 6000 will determine businesses or individuals associated with the event (e.g., because they are at the address of the fire) and associations between those parties and the event node will be recorded in one or more of the servers.

In some embodiments, once the event node is created, social network 6000 utilizes one or more of social network servers 6010 to create one or more projections of parties that should be part of the situational network as related to physical event (fire) 6070. As previously described, a number of projection operators can be utilized based on proximity to the event, status as a first responder, availability or response time, association with parties (e.g., businesses or individuals) who have associations with the event node that has been created with respect to physical event (fire) 6070.

In some embodiments, based on the projections, Intermediate Database (ID) 5620 is created by one of the social network servers 6010 and stored on one or more of those servers. In some embodiments one of the social network servers 6010 uses the information in ID 5620 to create one or more SMS/chat group messages addressed to the situational network participants identified in the projection. An interconnection 6060 between network 1 6020 and network 2 6040 is used by social network 1000 to either transmit the messages directly on SMS/chat network 1030, or to request one of linear network servers 6050 to generate the SMS/chat group message to the situational network participants. Alternatively, a graph of graphs such as that illustrated in FIG. 6B can be used to determine the best communications mechanisms for particular users and those users can be added to the situational network based on the identified preferred, most reliable, or fastest response time means of communication.

In some embodiments, the results of the projection and resulting ID 5620 are transmitted over interconnection 6060 along with a request to send a group message, which can then be created by one of linear network servers 6050.

In some embodiments, the situational network can be created within social network 6000 itself, by identifying the candidate participants through the projections and projection operators (operating on combinations of node and association criteria), transmitting invites to some or all of the participants, and connecting the parties that accept on social network 6000.

In some embodiments, once the projection is made and the candidate participants identified, one of social network servers 6010 may determine, while building intermediate database 5620, that there is insufficient information to identify a candidate participant on a second network, such as SMS/chat network 6030. An example would be when an individual has an account on social network 6000 but does not have a telephone number associated with that account. As such, ID 5620 cannot contain a phone number entry for the individual. In such a situation the candidate participant can be notified, via social network 6000, that they are being invited to a situational network (for a disclosed purpose) on an alternate platform and that should they want to participate they will be required to provide a telephone number (or network address/identifier for the alternate platform). Alternatively, the candidate participant can be provided with updates via social network 6000, even if not fully participating in the situational network established on the second network (e.g., SMS/chat network 6030).

Although FIG. 10 illustrates social network 6000 connecting to a single secondary network (SMS/chat network 6030) via interconnection 6060, multiple secondary networks can be addressed, such as fire/police/EMS communications networks and other specialized closed networks. In some embodiments multiple intermediate databases are generated by a server in social network 6000, and different tiers of situational networks established, as previously described. In some embodiments, a graph of graphs database is used to establish a cross-platform situational network, with the associations in the graph of graphs database containing information useful in identifying the best platform(s) to access and interconnect participants on.

The system need not be limited to a particular number of social or linear (e.g., SMS) networks but can extend across multiple platforms. In some embodiments, a situational network is initially formed on a social network such Facebook, but participants with accounts on alternate platforms including Instagram, WhatsApp as well as text (SMS) are identified using an intermediate database (such as the one shown in FIG. 6A) or graph of graphs as shown in FIG. 6B. Once identified, participants are joined to or invited to join the situational network. In some embodiments, the situational network is maintained by the social network from which participants have been identified and communications, including those off the social network, are maintained by the social network. In an alternate embodiment the situational network is operated by a server/system independent of the social network from which it was created. In some embodiments, an independent server/system is used to identify (via projection) the needed participants, join or invite them, and establish cross-platform communications.

Although discussed with respect to SMS networks above, advanced networks such as 5G can be used in the creation and operation of situational networks. The Service-Based-Architecture (SBA) of 5G in which modular network functions interact through a common framework can be utilized to support connections within the situational network. Features such as network slicing, in which the network can be divided into multiple virtual networks or "slices," with each slice optimized for a specific type of service or customer, can be utilized via the resource allocation step in the formation of the situational network. In some embodiments, messaging in slices allocated to situational network participants can be tailored to meet specific requirements, such as low latency or high bandwidth. This can be utilized in various aspects of situational networks including in tiered applications where one tier of the network (e.g., first responders) requires low latency or high bandwidth connections. Similarly, 5G features such as Enhanced Mobile Broadband (eMBB) and Massive Machine Type Communications (mMTC) can be utilized to guarantee performance characteristics for designated connections within the situational network.

Figure 9A:
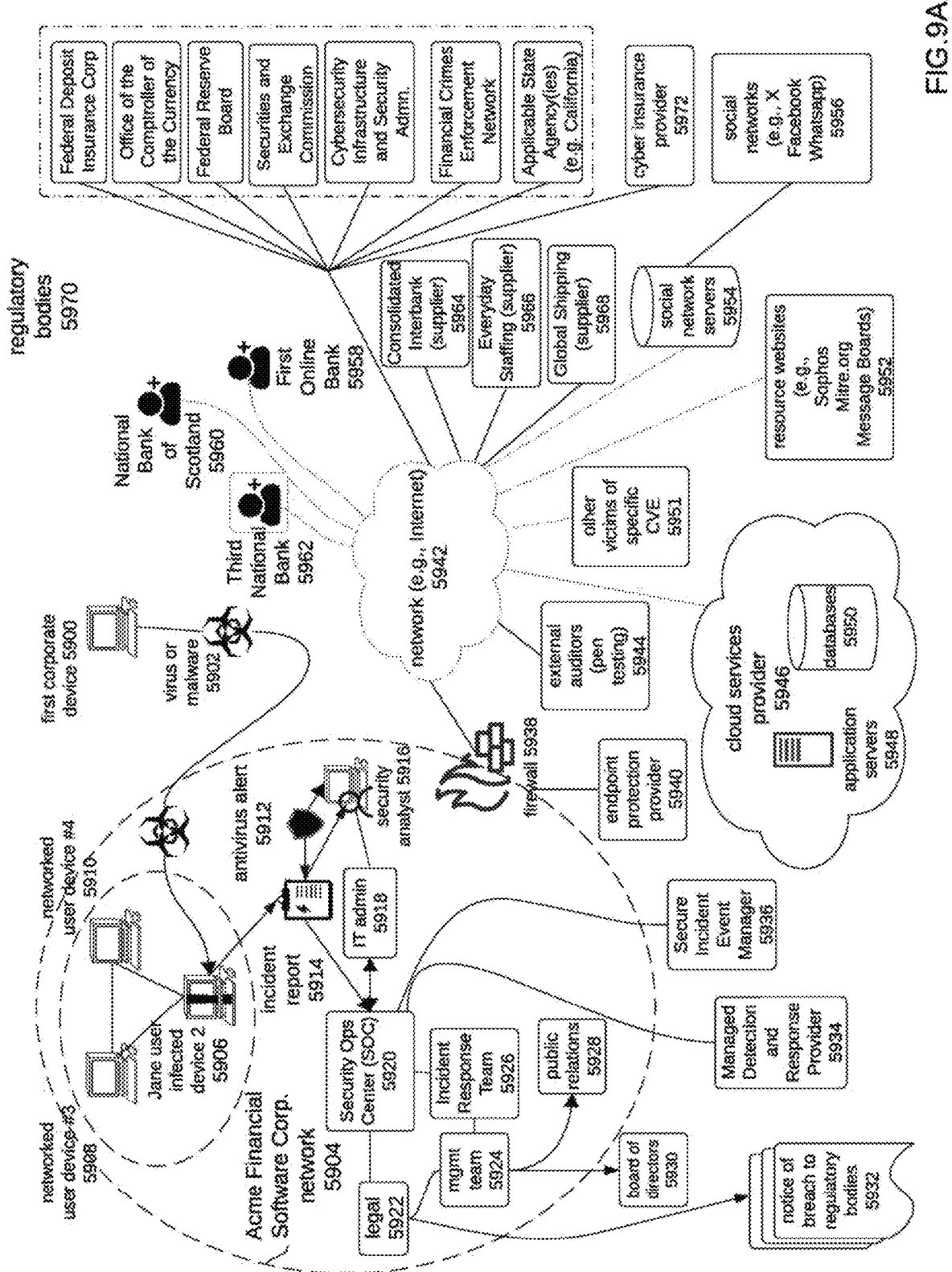
FIG. 9A shows an illustrative example of the actors and infrastructure in a multinetwork situational network pertaining to an cybersecurity use case, in accordance with some embodiments of this disclosure.

In some embodiments, a cybersecurity use-case can be used to further illustrate the creation and utilization of situational networks to protect assets and minimize the impact of security threats and breaches. Referring to FIG. 9A, a first corporate device 5900 is infected by a virus, the virus on the device being subsequently transferred to Jane user infected device 2, 5906 via the Internet. On that infected device 2, an indication of a threat may be displayed on the user's monitor.

In the contemplated use-case there are other users connected to the same network represented by user device 3, 5908, and user device 4, 5910. The existence of the virus generates an incident report 5914 when the antivirus alert 5912 is generated by the antivirus scan, routine scan, or in another embodiment through a virus detected by one of a variety of safeguarding software and processes known to one of skill in the art. The incident report arrives at the workstation of Security Analyst 5916, who also may review antivirus logs and determine the nature of the threat. Security analyst 5916 reports the incident to IT administrator 5918. If the incident meets the thresholds, reporting may continue upward to the Security Operations Center (SOC) 5920.

In some embodiments, a cybersecurity event node 5907 is created in response to the existence of the virus and its penetration of Acme Financial Software Corp network servers 5904. Cybersecurity event node 5907 can be created automatically, based on, for example, a threshold number of infected machines or triggered off of electronic reports or communications (e.g., emails) indicating the presence of the virus on corporate computer. In some embodiments, cybersecurity event node 5907 is created by a situation authority such as Security Operations Center 5920 or security analyst node 5916.

In some embodiments, depending on the criteria surrounding the event or threat a notice to legal 5922 may be generated. For a known or existing threat, the threat may also be reported to the Incident Response (IR) team 5926 as related to existing event 5925. In the case of a new event, legal may deem that management notice is required, in which case management team 5924 would receive a notice. In conjunction, legal 5922 and the SOC 5920 may call for the formation of a new incident response team 5926, which would be designed to handle the specific threat.

In some embodiments, depending on the nature of the threat or incident, notice may be required for the board of directors of the company based on corporate governance policy, and at the appropriate time management may also ask public relations 5928 to make appropriate disclosures to the public. The dotted circle on the left of FIG. 9A represents Acme financial software corporation and their attended network 5904. This network and corresponding actors may exist at a financial software provider whose customers are banks. They may provide software to facilitate duties such as account management, trading accounts for securities, and brokers accounts as a third party. In this embodiment, Acme manages its own network security. In some embodiments, Acme has engaged a third party, Managed Detection and Response Provider (MDRP) 5934. Similarly, a company like Acme may alternatively engage a Secure Incident Event Manager (SIEM) 5936 to take over the management of the event and perform the services of the security ops center. Many companies of this nature would also have an endpoint protection provider, 5940, which acts as the first and last stop between every network device and devices and resources outside the network, for example through the Internet. Each of these third parties, the end point protection provider 5940, the SIEM 5936 and the MDRP 5934, can generate their own reports and provide notices to trigger events, including calling for the creation of a situational network dependent on the nature and the size of the threat. External auditors 5944 are typically engaged to perform tests such as penetration testing taking place routinely in advance to anticipate and prevent threats.

In some embodiments, the Common Vulnerabilities and Exposures (CVE) database is used to determine other victims or potential victims of a specific CVE threat, such as a specific virus or malware signature. These other victims of specific CVE 5951 may have prior experience of a current threat that is valuable to a party like Acme as well to its network of resource providers, MDR, SIEM, endpoint protection provider, or other relevant entity. Referring again to FIG. 9A, cloud services provider 5946 hosts application servers 5948 and databases 5950 and can support services for entities such as those represented in this use case.

Also illustrated in FIG. 9A are exemplary clients for Acmes financial software: National Bank 5962, National Bank of Scotland 5960, and First Online Bank 5958, who are connected to ACME as well as their end user customers through network 5942, which In some embodiments, is the Internet. On the right of FIG. 9A, there are three example suppliers to Acme: consolidated Interbank 5964, which aids with transaction processing and credit card processing, Everyday Staffing 5966 who provides team members to Acme on an as needed basis, Global Shipping, who helps ship parcels and packages to customers and suppliers to Acme. One or more social network servers 5954 link the actors to the various social networks, such as X formerly known as Twitter, Facebook, WhatsApp, LinkedIn, and other social networks. The upper right of FIG. 9A illustrates a number of regulatory bodies 5970, including but not limited to the Federal Deposit Insurance Corp, the Office of the Comptroller of the Currency, and the Federal Reserve Board. Each of these agencies has a threshold for reporting and specific requirements for disclosure. Other regulatory agencies can be included as will be understood by one of skill in the art.

FIG. 9B illustrates the exemplary structure of situational networks created to support the cybersecurity use-case. As shown in the bottom of FIG. 9B, these are the cybersecurity event situational network 5978, the cybersecurity industry situational network 5986, the social network physical situational network 5990, and the regulatory body situational network 5996. These situational networks are formed from their respective social graphs and/or databases containing information pertaining to the relevant parties. For example, the left of FIG. 9A illustrates the cybersecurity event situational network 5978 created from Acme Software's specific social graph 5971 generated by Acme Software server 5904 through the use of projection 5976. This projection directly involves relevant parties such as management or affected clients. The second stack in FIG. 9A illustrates cybersecurity industry situational network 5986 centered around the cybersecurity industry. Due to the spontaneous nature of cybersecurity threats and the short response times required, the cybersecurity industry requires high interconnectivity and rapid response times. A situational network can be formed to allow for the sharing of industry-specific information in a private and secure forum. The social network servers 5954 work in conjunction with the social network social graph 5956 and projections 5988 to create social network situational network 5990 based on the social network projection 5988 as applied to one or more social networks 5956. On the right-most column, the regulatory physical situational network is formed in the same way, connecting disparate regulatory bodies on a combined situational network.

Figure 9C:
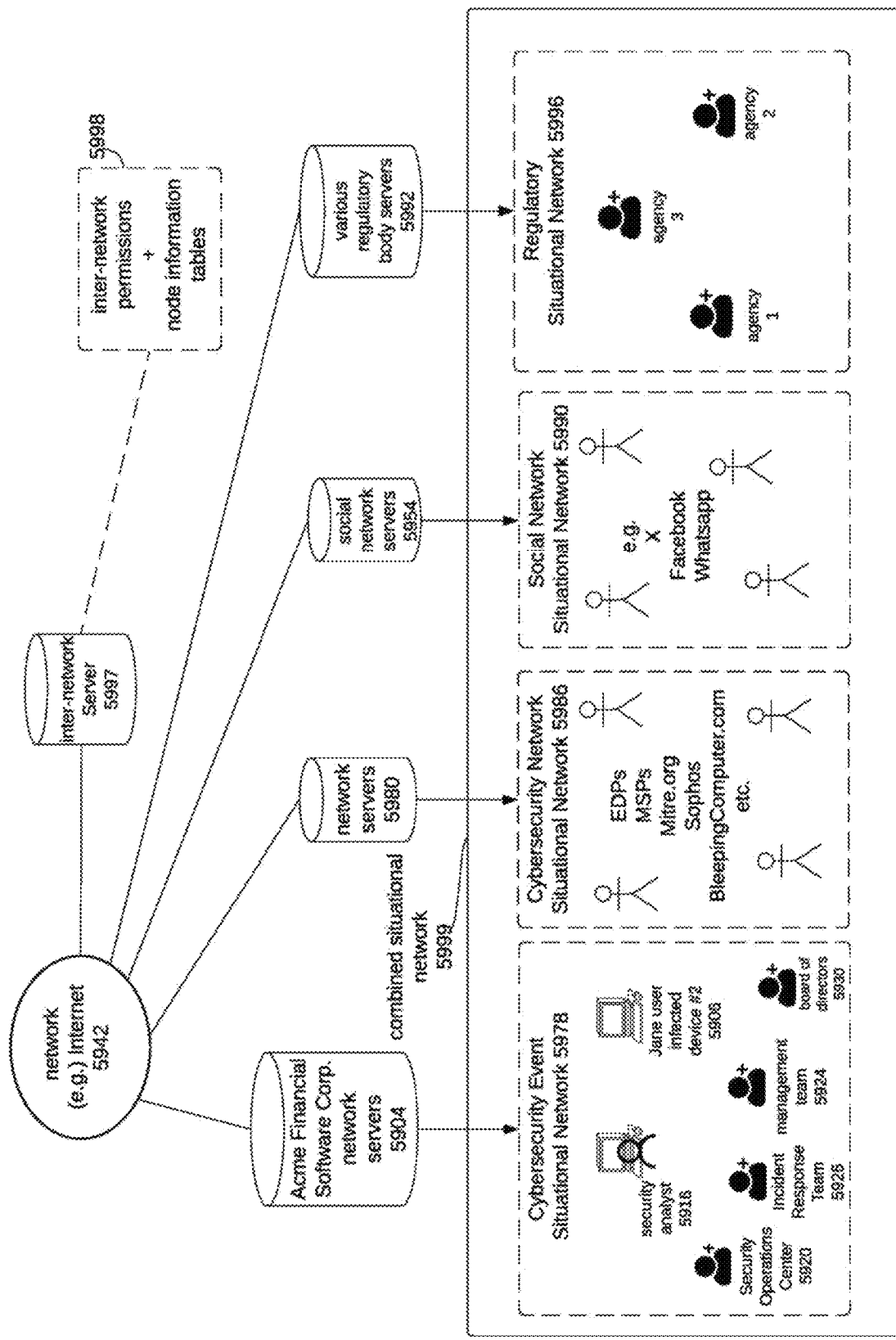
FIG. 9C shows an illustrative example of the formed situational networks and the combined situational network for an exemplary cybersecurity use case, in accordance with some embodiments of this disclosure.

FIG. 9C illustrates an exemplary architecture for the combined situational network incorporating the situational networks covered in FIG. 9B along with the network devices that connect them and the multiple servers that help facilitate a multinetwork situational network. In some embodiments, each party in the combined situational network has access to specific data dictated by their entry in the inter-network permissions and node information tables 5998 as shown in FIG. 9D, which illustrates an exemplary permissions table for a combined situational network. Each participant party is listed in the table with indication of the type of data they are allowed to receive. For instance, the company management is privy to all relevant cybersecurity information in order to coordinate response effectively. Conversely, the regulatory agencies are only able to access the required regulatory notices sent to them, and are disallowed from viewing intra-company communications, such as the IR plan. This allows all relevant parties to be connected on the same combined situational network, while still allowing for appropriate data privacy and information security.

In some embodiments, Acme Financial Corp. network servers 5904 are used to create cyber threat projection 5976, cybersecurity industry network projection 5984, social network projection 5988, and regulatory body network projection 5995. In this embodiment, Acme Financial Corp. is responsible for formation of cybersecurity event situational network 5978, cybersecurity industry situational network 5986, social network situational network 5990, and regulatory body situational network 5996. In some embodiments, cybersecurity event node 5907 actively causes the projections and resource allocations necessary to create the situational networks, either by directly running code to perform those operations or in conjunction with requests to cybersecurity industry network 5982, social networks 5956 and regulatory body network 5994. These requests can be made via APIs for the respective networks, in which parameters related to the projections, permissions, and resource allocations are passed to each network, and which result in the formation of the respective situational networks.

In some embodiments, the cybersecurity industry situational network 5986, the social network physical situational network 5990, and the regulatory body situational network 5996 are created by their respective servers, network server 5980, social network servers 5954, and various regulatory body servers 5992. In this embodiment the projection operators, permissions, and resource allocations are predetermined and stored on each of the respective servers, or transmitted from another node or server such as cybersecurity event node 5907 residing on Acme Financial Corp. network servers 5904.

In some embodiments, in the case of suspicious activity or the report of an actual breach, numerous parties illustrated in FIG. 9A would exchange data and time-sensitive information regarding the indication of a potential or resolution of an actual threat given who is deemed to be responsible, accountable, or needs to be consulted or informed. Given the dimensionality (variable number of parties, both internal to Acme and external, depending on the situation, their roles and permissions and requirements for access), only a representative few of the many monitors and their displays are provided below. As one example, with evidence of a loss of personal information in the financial services industry, seven or more agencies and as many as fifty U.S. states plus international bodies require regulatory notifications.

Figure 9E:
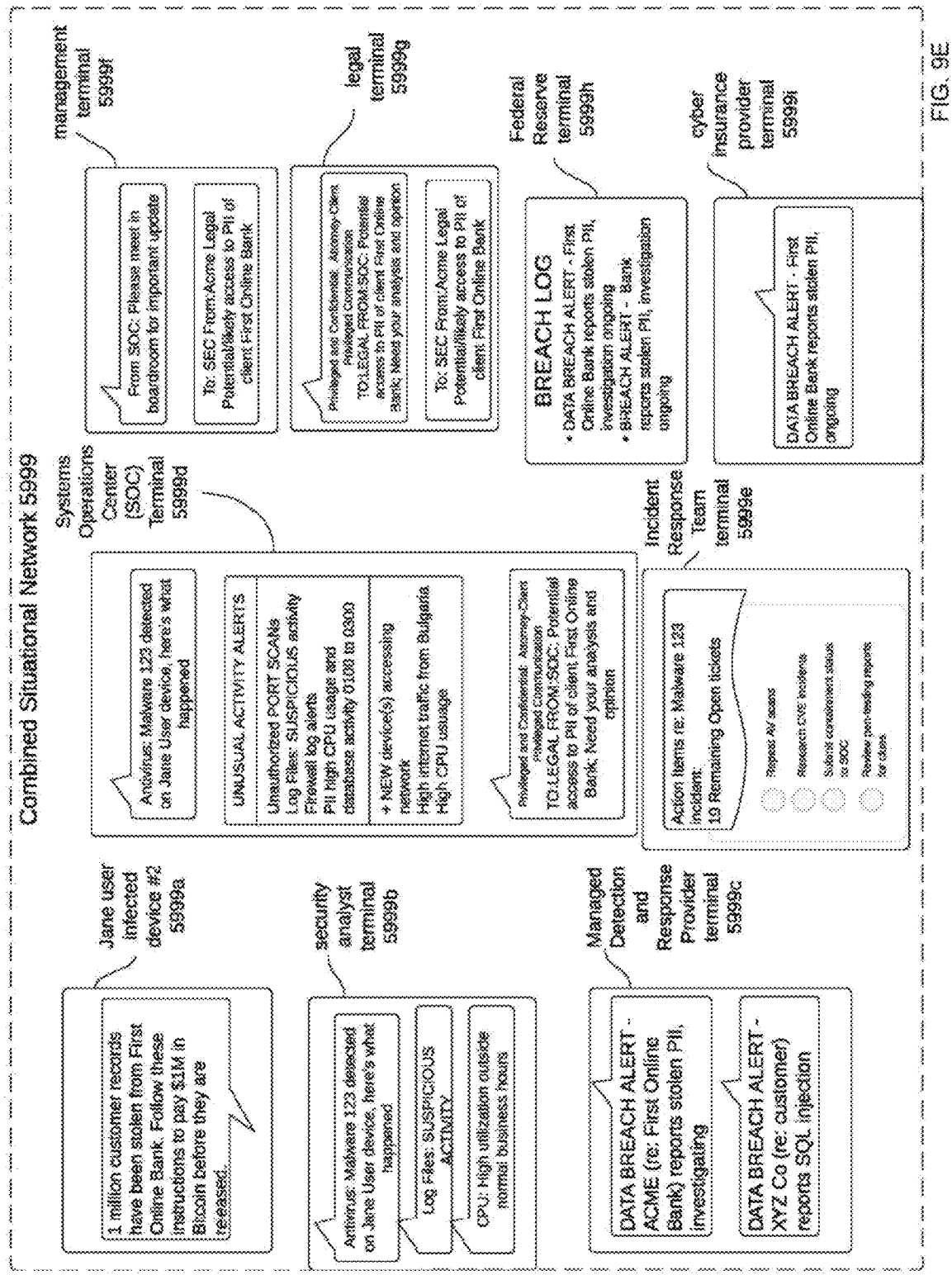
FIG. 9E shows an illustrative example of representative terminal displays for different actors in a combined situational network for an exemplary cybersecurity use case, in accordance with some embodiments of this disclosure.

Referring to FIG. 9E, 5999*a* shows a pop-up window generated by malware that appears on the computer screen of Jane user—infected device #2. The pop-up may appear when Jane User attempts to boot up or wake up her machine from sleep mode, or it may interrupt regular usage of her workstation. Typically, these screen popups are in bright colors and may be flashing, with threatening information about the nature of the breach, what the threat actor is demanding, and instructions for payment. The notice may take one of numerous other forms (a shutdown and reboot with blank screen except for text message for example) though pop-up windows are typical. On the other hand, Jane User may see no messages, but notice her computer running extremely slowly due to high CPU utilization, in a case where the threat notice and demands are presented to another party.

In some embodiments, the Security Analyst terminal 5999*b* illustrates a few types of information required by that party to assess the situation and can include a report or pop-up alert pertaining to a virus(es) detected by a routine scan, suspicious activity reports or charts showing log file sizes or CPU utilization (or many other resources) exceeding upper or lower control limits or outside established boundaries, and help desk tickets from users experiencing attack and resolutions thereof. These are just a few examples of numerous potential alerts and visual signals.

In some embodiments, the Managed Detection and Response (MDR) Provider Terminal 5999*c* illustrates a few types of information required by that entity to assess and address the situation and can include, in the example of a response manager's workstation monitor, notices of threats or breach alerts from their various customers along with relevant summary information and status updates and communications to key parties in the MDR firm to resolve the threat.

In some embodiments, the Systems Operations Center (SOC) Terminal 5999*d* illustrates a few of the types of information required by that organization. In a typical SOC (internal to Acme or an external services provider), there may be literally hundreds of monitors with messages, run charts of key resource statistics (e.g., CPU utilization, log file size, network and internet traffic etc.), status indicators, along with suspicious activity alerts, among many others displayed. For example, pop-up alerts from firewall logs, security monitoring or antivirus software indicating port scans, may be illustrated.

An exemplary process for creating the situational networks with respect to the cybersecurity use case involves the identification of relevant parties/nodes via projection operators (nodes and associations) and the allocation of network resources to provide appropriate communications channels as well as for allocating (giving access to) or deallocating (e.g., denying access to) particular network resources such as databases (e.g., databases containing Personal Identifiable Information, also known as PII). The process is described herein and with respect to the database illustrated in FIG. 23G, the projection operators illustrated in FIG. 23H, and the resources allocated as shown in FIG. 23I. In addition to the projection operators and resource allocations, permissions such as those shown in FIG. 9D can be incorporated into the formation of the various situational networks.

Referring to FIG. 23G, an exemplary triplestore database is shown for the formation of a situational network around a cybersecurity breach. This database holds relationships between users within the company (including equipment such as servers, websites and other nodes) as well as associations relevant to the cybersecurity use-case. For example, the database stores that User Jane's device has a virus, and also records that Jane's User ID accessed a database containing personally identifiable information (PII). These points in combination with the appropriate projections allow for identification of threatened targets as well as. As will be described, the database can also be used to aid in the projection of participants to the situational network. Although described here as a triplestore database, the data can be held in other types of graph databases. Relational databases that store both information about users/nodes and relationships or other ancillary information regarding the users/nodes can also be used to store information relevant to the cybersecurity use case.

As previously discussed, weighted combinations of node and link (association) operators, $(a\varphi[N(G)]+b\psi[L(G)])$ can be used to project the relevant participants from a database, which in this use case is the database illustrated in FIG. 23G. Exemplary projection operators are shown in FIG. 23H.

In some embodiments, as the cybersecurity event unfolds, cybersecurity event situational network 5978 can be established by applying operators such as those shown in FIG. 23G with respect to the cybersecurity event. The operators can be expressed in boolean terms with an exemplary expression for the projection being:

cybersecurity event [date] situational network projection S(G)=((user device AND has virus) OR (user device AND submitted trouble ticket)) OR (IT personnel AND C-suite).

This projection would incorporate the user Jane and any other users of the corporate network infrastructure where the system had detected the presence of the virus on devices associated with their account or where they had reported trouble tickets, and users indicated as IT personnel (referring to FIGS. 9A and 9B) including but not limited to security analyst 5916, security ops center 5920, incident response team 5926, secure incident event manager 5936 and managed detection and response provider 5934. The C-suite (e.g., CEO, CFO, CIO, COO, CTO) is also included in the exemplary projection shown above.

As illustrated in FIG. 23G, some projections are based on node information only (e.g., nodes representing "IT PERSONNEL," "CYBER INSURANCE PROVIDER," "FDIC" or "FINANCIAL CRIMES ENFORCEMENT NETWORK) can be projected from the database based on the node information only without regards to associations. This can be thought of as a projection with a zero weighting to the association component. To the extent that associations are needed in addition to the node information to identify the needed participants that projection information can be added to the table shown in FIG. 23G.

Referring to the resource allocation for the cybersecurity use case as illustrated in FIG. 23H, resources can be allocated to create cybersecurity event situational network 5978. In some embodiments, a node to represent the cybersecurity event is created. Once the node representing the cybersecurity event is created associations between the event and other users/devices can be created and stored. For example, parties can be shown as "infected" or "notified" via their association with the node.

Other resource allocations include the generation of email notifications to participants identified for incorporation into cybersecurity event situational network 5978. In some embodiments, the node representing the cybersecurity event is used as the "FROM" party in the emails, and a corresponding mailbox is created for the event. This has the advantage of establishing an event specific mailbox for reception of situational information related to the event that can be monitored by human or artificial intelligence means. Users receiving messages regarding the event can respond to the event specific mailbox. A communications channel specifically to deal with the cybersecurity event can be automatically created, and users identified in the projection automatically joined as part of cybersecurity event situational network 5978. The communications channel can be established using internal corporate software and tools, or via an interface to an enterprise communications tool such as but not limited to Slack, Discord, Microsoft Teams, Mattermost, Rocket.Chat, Ryver, Zoho Cliq, Glip, or Twist.

Representative commands for the allocation of these resources would be:
CREATE (cybersecurity event [date] node, emailbox)
NOTIFY (cybersecurity event [date] situational network projection S(G), cybersecurity event [date], email)
CREATE (cybersecurity event [date] situational network projection S(G), cybersecurity event [date], message channel)

In addition to allocating resources, restricting access to resources can be an aspect of the creation of the situational network. For example and in the context of the cybersecurity use case, users in the organization with the virus can be projected out and their access to databases containing PII removed via the following representative projection and resource allocation (deallocation):
cybersecurity event [date] remove access projection S(G) =IF ((user device AND has virus) THEN DENY (PII databases).

In some embodiments, within cybersecurity event situational network 5978 it may be desirable to establish a specific, secure (e.g., via encryption) and privileged (e.g., privileged and confidential) channel where security analyst 5916, legal 5922 (which would include the general counsel) and select members of the C-suite (e.g., CEO, COO and CIO) can discuss the cybersecurity event, possible solutions, and legal/financial ramifications for the company. Representative projections and resource allocation commands would be as follows:
cybersecurity event [date] privileged channel projection S(G)=(security analyst, general counsel, CIO)
CREATE (cybersecurity event [date] privileged channel projection S(G), cybersecurity event [date], secure message channel)

As will be appreciated by one of skill in the art, the exemplary projections illustrated in FIG. 23H in conjunction with the exemplary resource allocations illustrated in FIG. 23I can be used to establish communications and allocate/deallocate resources for each of the situational networks of FIG. 9B, including cybersecurity event situational network 5978, cybersecurity industry situational network 5986, social network situational network 5990, and regulatory body situational network 5996. The resources allocated can result in an automated email notification to the cybersecurity industry situational network 5986 (including an event specific email "reply to" address), generation of an automated post, establishment of a breach event node, and establishment of a message board or channel on social network situational network 5990, and email notification to projected agencies within regulatory body situational network 5996.

The method and system described for the creation of the various situational networks and allocation or deallocation of resources with respect to the cybersecurity event use case has numerous advantages including the automated and efficient use of computing and network resources in response to the virus or malware 5902 infecting devices on Acme Financial Software Corp. Network 5904 (FIG. 9A). Specifically, the database containing information such as that shown in FIG. 23G is constantly growing and changing as the situation evolves and other user devices are infected or updated with virus resistant software. These constant changes complicate the generation of relevant queries to the database due to both the volume of data and its time varying nature. Storage of projection operators such as those illustrated in FIG. 23H in conjunction with resource allocation operators such as those illustrated in FIG. 23I allows for a simple and in some instances standardized set of rules to be applied to the dynamic and data intensive environment related to the cybersecurity event to automatically project out the relevant parties, create communications channels between them, and allocate or deallocate resources as required. As opposed to requiring human intervention to determine who should be included in each specific communications channel, the system projects out the relevant players and automatically establishes the appropriate communications channel(s).

Another advantage of the present system and method is that the system can add/delete members from the appropriate situational network as the situation evolves. For example, users with devices that were infected by the virus, but whose computers have been cleansed or otherwise updated with virus-resistant software would no longer be noted as having infected devices (e.g., "JANE USER DEVICE," "HAS," "VIRUS" in FIG. 23G) and would be automatically dropped from projections looking for users with infected devices. This would result in their removal from communications channels dealing with the cybersecurity event. In some embodiments, this occurs by periodically running the projections and resource allocations to update the situational networks (e.g., batch processing on the hour, nightly, or at other predetermined intervals) while in another embodiment the projections and resource allocations are run based on external events such as the availability of a patch, a significant increase or decrease in the number of infected devices, or other metric as appropriate to the event. The present system and method can therefore automatically update the situational network despite a rapidly changing situation with potentially large datasets. This makes efficient use of the computing resources available, bandwidth dedicated to communications channels, and protects valuable resources (e.g., databases containing PII) while minimizing the impact to workflow. Furthermore, human bandwidth is respected, as individuals needing access to information regarding the situation are automatically connected to the appropriate channels regarding the event, while individuals either not impacted by the event or not needing to know the details regarding the event are spared from spurious communications that would distract them from fulfilling their required duties.

In some embodiments, the node created as a result of the event (e.g., through the resource allocation CREATE (cybersecurity event [date] node, emailbox)) assumes responsibility for the projections and resource allocations forming the various situational networks. The node can actively schedule projections and resource allocations, and cause the recording associations or links indicating infected or protected devices. In this embodiment the event node actively connects to other nodes and records the relationship. This has the advantage of centralizing activity with respect to the event. As the event is addressed and ultimately resolved, the node (and associations/links) related to the node, as well as other data related to the event, can be archived. Ultimately and once all aspects of the situation have been addressed (e.g., infected devices cleansed, data breaches addressed, and regulatory authorities informed) the situational network and associated channels and resource allocations/deallocations can be dismantled. This has the clear advantage of liberating the computing and network resources associated with the situation as well as respecting the limits of human bandwidth by removing the situation dependent communications from users' feeds.

Because the number of impacted users in the cybersecurity use case can reach very significant numbers (e.g., millions or even tens of millions of users) the aforementioned method and system can employ a number of techniques to efficiently establish the situational networks. In some embodiments, once the cybersecurity event is identified (e.g., one or more infected devices) the projections are initiated based on the infected users and users within a specified degree of separation, organizational parameter, or communication pattern (e.g., users connected within n degrees of separation, users within the same department organizationally, users having high amounts of communication between them). By using scaled projections it becomes possible to efficiently and automatically identify users that should be interconnected within the situational network. In some embodiments, an initial set of impacted users is projected and joined to the appropriate situational network while the system asynchronously iterates through the database to identify other users/devices that should be connected to one or more of the situational networks related to the event.

Artificial intelligence techniques can be employed in various aspects in the establishment of situational networks. In the context of the cybersecurity use case techniques such as data analysis, predictive analytics, email screening, real-time analysis and traffic analysis can be used to assist in declaring the existence of a cybersecurity event, triggering the establishment of an event node and the running of the projections and resource allocations for the establishment of the situational networks. In some embodiments, projections to find users that should be included in a particular situational network are based on User Behavior Analytics (UBA), baseline behavior models, signature and signature-less detection, automated analysis, vulnerability identification and prioritization. In this embodiment one or more of the aforementioned techniques are used to identify a subset of users, connect them to one or more situational network channels, and potentially to allocate or deallocate network resources to them. The stored projection operators take into account the use of one or more of these techniques and can be identified by labels such as "users_highrisk" which indicates that the system has identified users having a high risk of having an infected device, although their device is not known to be currently infected. Such users can be connected to a channel within the situational network addressing high risk users and offering solutions that may be entirely different from users with devices that are known to be infected. For example, by identifying the high risk users and connecting them to a specific channel within the situational network, they can be directed to a network resource including software/patch that they can install to protect their device. By identifying the subset of high risk users and creating a channel within the situational network it is possible to focus computing and communications resources on those individuals, as opposed to blasting out a message to all users which is both inefficient and which may lead to bottlenecks in the installation of the appropriate software/patch. In operation, a command to project out "users_highrisk" results in a call to a subroutine or method that uses one or more of the aforementioned techniques to identify those users and form the projection.

In summary, the cybersecurity use case illustrates the use of situational networks to automatically create communications channels and to allocate/deallocate resources in response to a cybersecurity event. As discussed, the appropriate parties are automatically interconnected to facilitate communications regarding various aspects of the event (containment, resolution, legal compliance) and to deal appropriately with the event. Identification of the appropriate parties can be efficiently made despite the massive amount of data involved and the fact that the situation is dynamic. Network resources, including computing and communications resources, are carefully utilized via the projections and establishment of specific communication channels.

The advent of virtual reality systems and devices supporting virtual reality (such as the Meta Quest and Oculus virtual reality/VR products) now allows participants to gather virtually and participate in an event. The event may be a physical event with a corresponding virtual event, or an entirely virtual event. Use of VR products in their various forms allows a participant to view live video from the event, generated video related to or supplemental to the event, avatars representing either individuals in the real event or virtual participants. These virtual events can be made to resemble physical events, or can have completely independent representations. In some embodiments, such as a real surgery which has a corresponding virtual event, virtual participants may be given access to components or devices at the real event, such as a robotic device for performing surgery. In such a situation, a virtual participant (such as a virtual surgeon with a specific needed expertise) may be invited to participate in the surgery, and will be provided with access to the robotic device to allow them to use their expertise and contribute to or even perform the surgery. In other situations, a virtual event can be created to correspond to a physical event, and participants can be invited to participate in either the virtual or physical event.

Because virtual reality offers the ability to invite large numbers of individuals to an event, it becomes necessary to appropriately determine who should be able to attend an event and under what conditions. Furthermore, because the event may have a corresponding physical event, and because the event may be an emergency or crisis situation, it becomes critical to join individuals to either the physical event communications channels or the virtual event so that they can assist or provide expertise. To the extent appropriate individuals can be identified and joined to one or more situational networks related to the event network resources can be efficiently utilized.

FIG. 11 illustrates a flowchart for the creation of a representative situational network in the metaverse, which in this example has a corresponding physical event. In an identify a situation or event step 6100 the situation or event is identified. In an establish a physical event node 6110 one or more servers establish the physical event node. In an establish a virtual event node step 6120 a virtual event is established by a server or other computing device. In a project out candidate participants step 6130 the candidates for the situational network are identified. In create intermediate VR database step 6140 a server creates the intermediate database containing the participants for the situational network in the metaverse. In a transmit to metaverse step 6150 the intermediate VR database is transmitted to the servers associated with the metaverse. In an invite candidate metaverse participants step 6160 the identified candidates are notified and invited to join. In an allocate network resources step 6161, resources such as bandwidth, encryption/decryption keys, access to secure channels, guaranteed Quality of Service (QoS) parameters or other network parameters are set, based on the permissions granted to the candidates, or based on initial pre-determined values. In a check in participants to VR event step 6170 the candidates accepting the invitation are admitted to the event, thus joining the situational network created in the metaverse.

Figure 16:
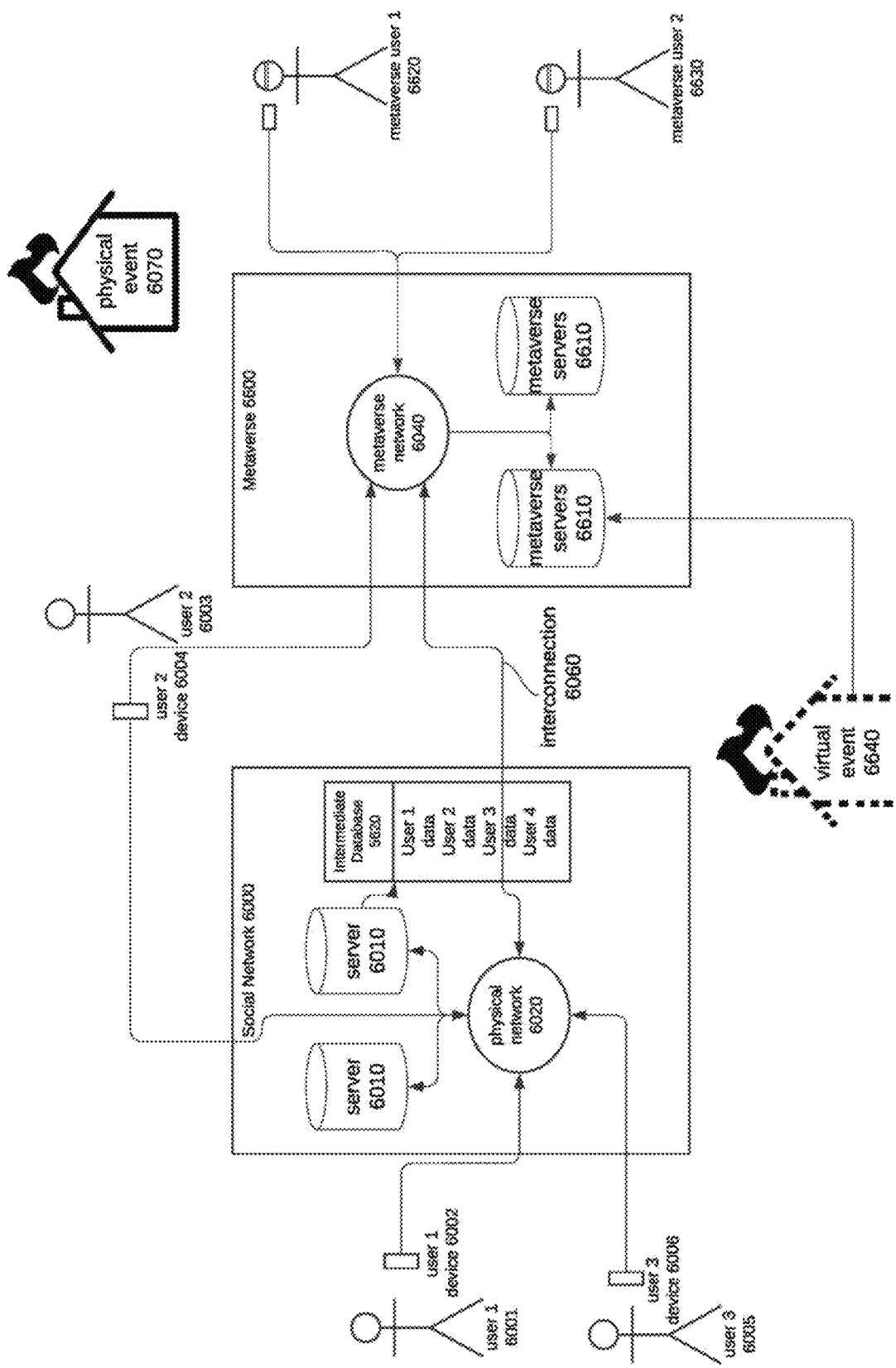
FIG. 16 illustrates a representative architecture for aspects of the present invention as applied in a Virtual Reality (VR) environment, in accordance with some embodiments of this disclosure.

FIG. 16 illustrates an exemplary architecture for the utilization of situational networks in virtual environments. Social network 6000 is comprised of social network servers 6010 operating over network 16020. In some embodiments, network 16020 is the Internet. User 16001 operates user device 6002, user 26003 operates user 2 device 6004, and user 36005, operates user 3 device 6006.

In some embodiments, a metaverse 6600 can be created on metaverse servers 6610 connected via network 26040, with metaverse user 16620 and metaverse user 26630 connecting to and participating in the metaverse through the use of VR devices (such as those previously described) which interconnect to network 26040. In some embodiments, social network 6000 and metaverse 6600 operate on the same platform using overlapping servers.

As an example of the creation of a metaverse event, a physical event 6070 (e.g., a fire) can occur and can result in the establishment of an event node in social network 6000. Participants may connect to the event node through physical network 6020, which can be considered to be the initial network over which information about physical event 6070 is exchanged. In some embodiments, a corresponding virtual event 6640 is created in metaverse 6600. The creation of the corresponding virtual event 6640 can, in some embodiments, be automated such that once physical event 6070 is verified and a node established corresponding to physical event 6070 created, corresponding virtual event 6640 is established. Verification can take a number of forms including but not limited to multiple reporting of physical event 6070 (e.g multiple posts), correlations of multiple reports verifying similar photographic or video evidence, image recognition performed on photo or video feeds, verified or trusted emergency reports (e.g., 911 calls) or other data indicating that physical event 6070 has actually or is actually occurring.

Although described in the context of an emergency event, in some embodiments, physical event 6070 can be a beneficial or entertainment event such as a party, concert, gathering, political event (e.g., rally or protest), meeting, surgery, inspection, class, or any other event that may be of interest to either participants or observers.

In operation, a set of situational network participants can be projected from social network 6000. The proposed participants are tabulated in intermediate database 5620 which is transmitted over interconnection 6060. Participants accepting the invite are interconnected to, or allowed admission to, virtual event 6640. In some embodiments, metaverse participants such as metaverse user 16620 and metaverse user 26630 are connected via virtual network 6040, which is interconnected to physical network 6020 via interconnection 6060. In an alternate embodiment, metaverse network 6040 and physical network 6020 are one and the same network. As will be discussed subsequently, permissions can be used to control the level of access and network resources available to different users, even if operating on the same network.

Figure 22A:
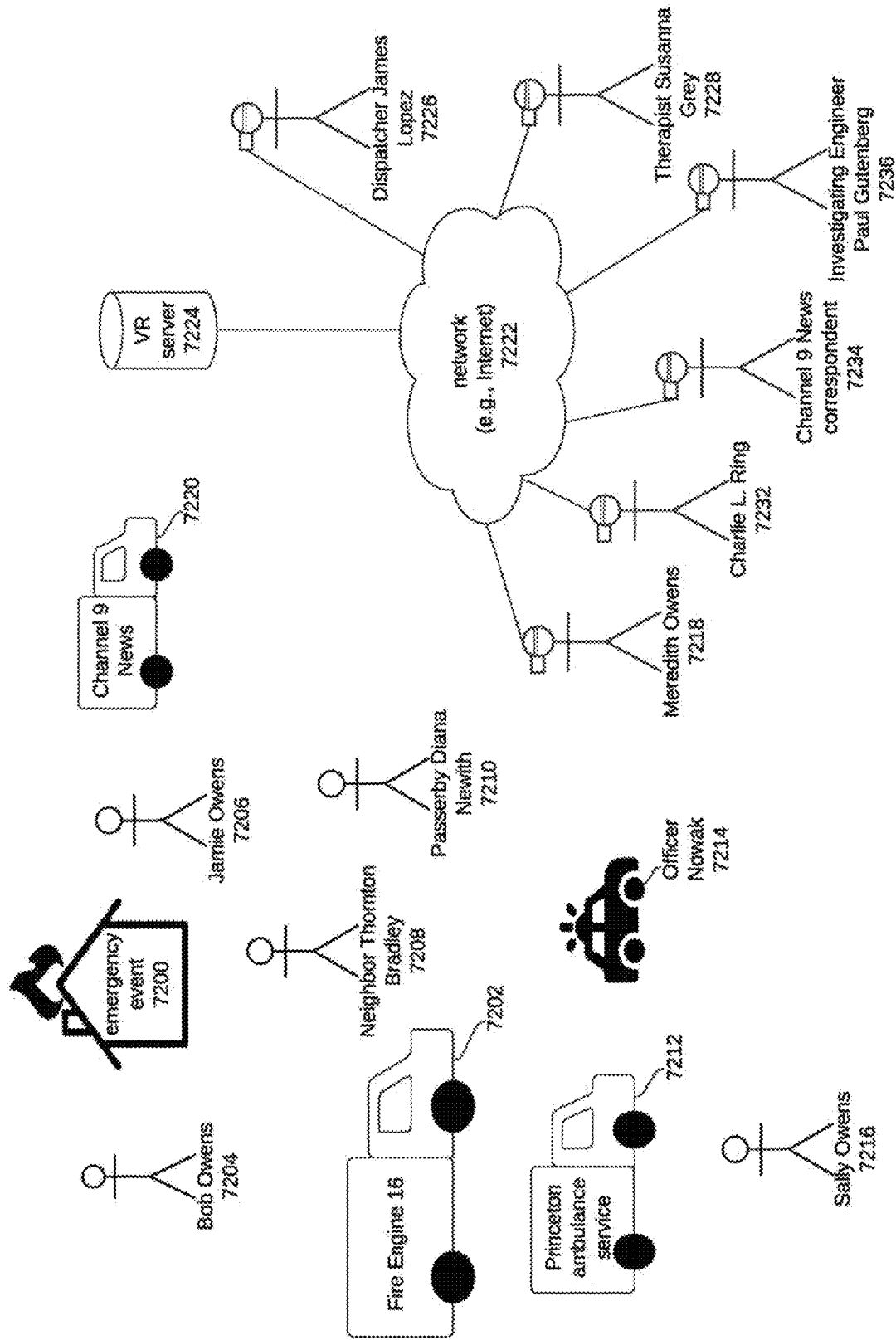
FIG. 22A shows an illustrative example of the actors and infrastructure in a multinetwork situational network pertaining to an exemplary virtual reality use case, in accordance with some embodiments of this disclosure.

Although the prior example illustrates creation of a virtual event node for a metaverse event, corresponding to a physical event, an alternate example regarding a 911 call with a corresponding virtual event node (also referred to as a "911/VR use case") has been developed to further illustrate the system and method. Referring to FIG. 22A, the figure illustrates the actors and participants in a situational network present in both physical space and virtual reality concurrently. The actors of FIG. 22A are centered around an emergency event 7200. In this exemplary use case, the emergency event 7200 is a house fire at the Owens family household located at 1200 Evergreen street. The listed residents at this address are Bob Owens 7204, his wife Sally Owens 7216 and their son Jamie Owens 7206. The fire event is observed by passersby Diana Newith 7210, and a neighbor Thornton Bradley 7208, who has called 911 and has transmitted a recorded video in response to observing the fire. Depending on the emergency, a variety of emergency responders may be dispatched, in FIG. 22A, these emergency responders are represented as fire engine 16 7202, Princeton hospital ambulance 7212, and police officer Tim Nowak 7214.

In some embodiments, a virtual reality situational network is created utilizing network 7222 to connect impacted or related parties that are not in the same physical location as emergency event 7200. In this use case, the connected parties consist of Bob's mother, Meredith Owens 7218, Charlie L. Ring 7232, one or more virtual observers (not illustrated), a channel 9 news correspondent 7234, investigating structural engineer Paul Gutenberg 7236, 911 dispatcher James Lopez 7226 and therapist Susanna Grey 7228. As would be understood by one of skill in the art, the virtual observers can be a number of different relevant parties, including but not limited to close friends, employers, family members, and news organizations, as well as personnel critical to or impactful to the situation, such as dispatcher James Lopez 7226.

FIG. 22B illustrates an exemplary context specific social graph that can be used for the creation of situational networks in the envisioned use case. The physical and virtual emergency events, as well as the involved actors (and in some instances equipment, such as the ambulance) are delineated as nodes, while the relationships between these nodes are shown as associations such as impacted 7257 for victims impacted by the fire. Additionally, associations such as connected 7258, dispatched 7259, informed 7259, and video feed 7263 may be stored indicating that parties are connected to both the physical and virtual events (e.g., connected 7258), have been dispatched to the physical event (e.g., dispatched 7259), have been informed of a key event (e.g., informed 7259) or are providing video feed from the physical event (e.g., video feed 7263).

In some embodiments, a graph database, such as that illustrated in FIG. 22B, has the advantage of being able to store large amounts of complex and interconnected data. Although numerous types of graph databases can be used to store and manage the data used to create one or more situational networks, exemplary databases include but are not limited to Noe4j, OrientDB and ArangoDB. Other types of databases generally considered to be graph databases, can also be used. For example, a triplestore database (generally considered to be a type of graph database) can be used to store data in a subject-predicate-object structure. The triple-store database offers the advantage of being able to store and readily query semantic web data, typically using the Resource Description Framework (RDF).

Although illustrated as a graph database in FIG. 22B, other types of databases can be used. These other database structures include relational databases (e.g., SQL type databases such as MySQL, PostgreSQL, Oracle), NoSQL databases (e.g., MongoDB, Redis, Cassandra), NewSQL databases (e.g., Google Spanner, CockroachDB), time series databases (e.g., InfluxDB, Timescale DB), object-oriented databases, search engines, and data warehouses may be used to store, access, and manage data from which the situational networks are derived.

In some embodiments, virtual event node 7250, which in some embodiments is automatically created in response to the establishment of the physical event node 7240, serves to represent the physical emergency event in virtual reality. This allows geographically disparate parties to receive information and updates relevant to the physical emergency event while part of a cohesive virtual reality situational network. FIG. 22B also demonstrates exemplary associations between actors that determine their invitation to the physical and virtual situational networks. Actors present at the physical event are directly associated to the physical event node, including the victims represented by Bob Owens node 7249, Jamie Owens node 7251 and Sally Owens node 7252, as well as first responders Fire Engine 16 node 7243, Princeton ambulance node 7245, Officer Nowak node 7247. As can be seen in FIG. 22B, some actors, such as Meredith Owens (represented by Meredith Owens node 7253 and Thornton Bradley (represented by Thornton Bradley node 7241) are associated both with the physical event node 7240 as well as the virtual event node 7250. This can indicate that those parties are proximate to, contributing to or reporting from, or impacted by the physical event (e.g., the fire) represented by physical event node 7240 as well as participating in the virtual reality social network hosted by virtual event node 7250. Additional actors can be brought in on the VR situational network and in FIG. 22B are represented as dispatcher Lopez node 7246, therapist Grey node 7248, Channel 9 News node 7246, investigating engineer node 7244 and Charlie L. Ring node 7242. As will be appreciated by one of skill in the art, the identity of actors in each situation will vary depending on the projected participants for each situational network. Each node represents an active actor in the network while they contribute to the situation. For example, the Channel 9 News node 7246 represents a news correspondent observing and reporting information regarding the event.

As previously discussed and as illustrated in the exemplary process shown in the flowchart in FIG. 11, one or more situational networks can be created based on the basic steps of projecting participants out of the database using, for example, node and association operators, checking for permissions, allocating resources, and joining the participants to one or more of the formed situational networks. In the VR use-case, when a physical emergency is reported, a corresponding virtual event node is created. From here, the situational network participants are chosen and assigned into one of three groups depending on their relevance and ability to impact the situation. These roles may not be fixed or stationary, but may rather adapt to the situation through mechanisms such as promotion, as will be discussed.

Figure 22C:
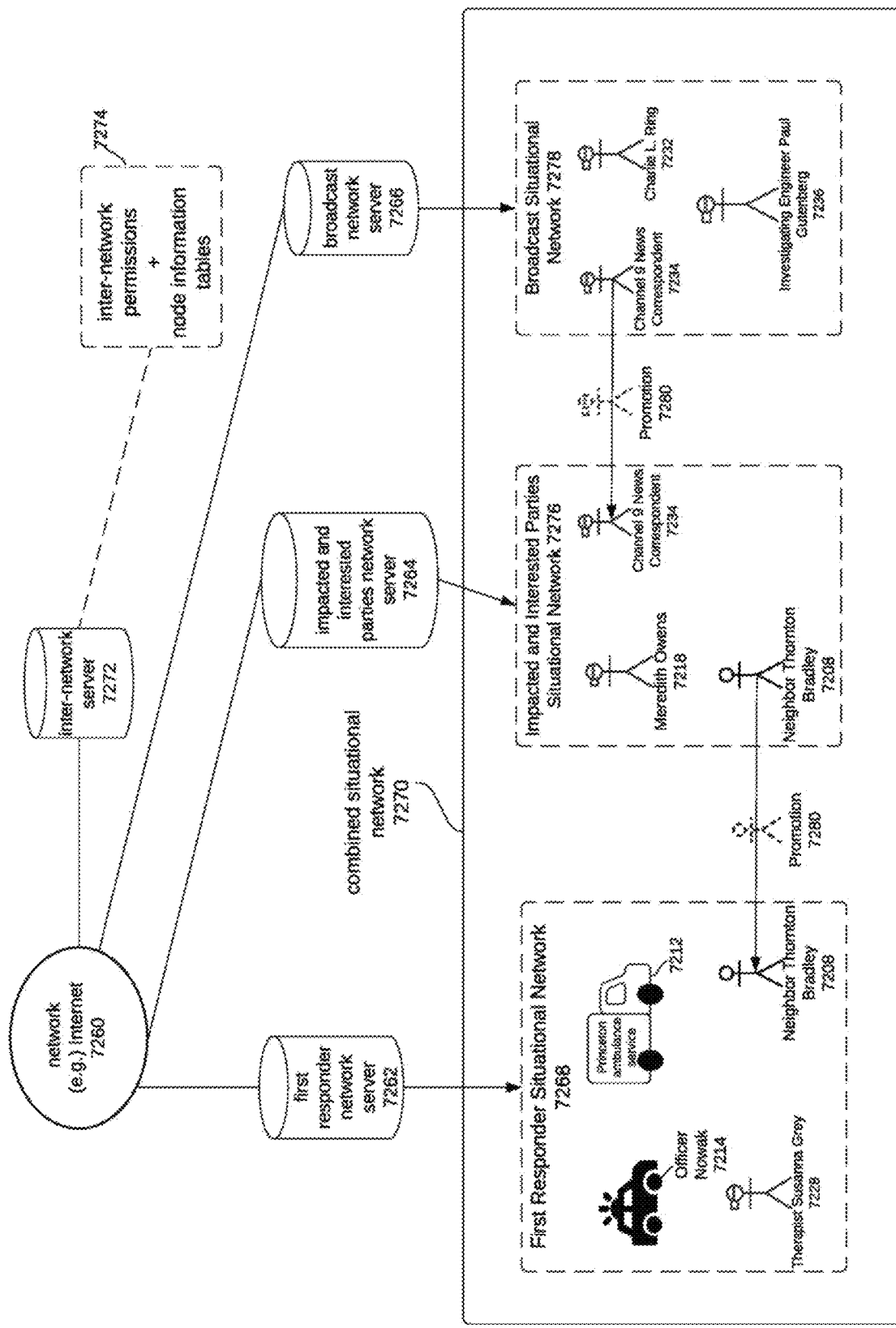
FIG. 22C shows an illustrative example of the formed situational networks and the combined situational network for an exemplary virtual reality use case, in accordance with some embodiments of this disclosure.

In some embodiments, a first situational network contains primarily first responders such as paramedics and firefighters, but can also include any party actively contributing information or assistance relevant to the event. Referring to FIG. 22C a first responder situational network 7268 can be formed for those parties needing access to the emergency network. As shown in FIG. 22C the first responder situational network 7268 can include officer Nowak 7214, the Princeton ambulance service vehicle 7212, neighbor Thornton Bradley 7208 (who is promoted into the first responder situational network 7268 based on the video feed he is providing) and therapist Susanna Grey 7228, who is joined virtually.

In the current use case Princeton ambulance 7212 and police officer Nowak 7214 were projected as relevant first responders, and invited to the first responder network 7268. Therapist Susanna Grey 7228 was not initially invited, but had an invitation extended when the information became available that a victim Jamie Owens, represented by Jamie Owens node 7251, had died during the event.

Similarly, an impacted and interested parties situational network 7276 can be formed and in this instance consists of Meredith Owens 7218, who participates virtually, Channel 9 news correspondent 7234, who participates virtually, and neighbor Thornton Bradley 7208, who participates physically and as will be discussed, is promoted to the first responder situational network 7268. A broadcast situational network 7278 is also created and provides information regarding the physical event. In the example shown in FIG. 22C, broadcast situational network is joined by Channel 9 News Correspondent 7234 (who is subsequently promoted to impacted and interested parties situational network 7276), Charlie L. Ring 7232, and investigating engineer Paul Guttenberg 7236. As will be discussed, network resources can be allocated such that the first responder situational network 7268 and its participants have priority on resources such as bandwidth, as well as guaranteed low latency and stable connections, whereas observers in the broadcast situational network 7278 may have limited two-way bandwidth although they may still receive high quality video via multicast or other video broadcast techniques.

In some embodiments, due to the interconnected nature of a combined situational network, the position of an actor in a particular situational network can change as new information is brought into the situation. For example, Bob Jones's neighbor Thornton Bradley 7208 was initially invited to the impacted parties situational network 7276 due to his physical proximity to the location. Upon learning of the fire, instead of joining the network in VR, Thornton chooses to go outside and stream video of the fire. Due to his addition of potentially useful new information to the system, an invitation to the first responder network is extended, referred to as a promotion 7280. In some embodiments, this promotion is automatically generated through inspection of one or more aspects of the video feed including location, viewpoint, quality of video feed, individuals identified in the video feed through facial recognition, or other parameters indicative of the usefulness of the video feed to management of the situation. Similarly, Channel 9 news correspondent 7234 has been monitoring the event from broadcast situational network 7278. In the event the situation rises in severity, such as with a rising death count, the news correspondent would automatically be promoted. This promotion calls for an increase in permissions and/or resources for the promoted user, allowing the news correspondent access to more detailed and up to date information as well as, for example, increased or guaranteed bandwidth. This approach allows for the dissemination of multiple sources of real-time information, while still allowing said sources to be invited and removed as necessary to preserve bandwidth and facilitate communication. As will be appreciated by one of skill in the art, demotions can occur, such as when a video feed is no longer relevant or a better (e.g., higher resolution or more appropriately positioned) video feed is available.

FIG. 22C also illustrates a combined situational network created from three distinct situational networks within the VR use-case. The combined VR situational network 7270 is formed through interconnection of first responder situational network 7268, impacted and interested parties situational network 7276, and broadcast situational network 7278. These situational networks are in turn supported by their respective servers first responder network server 7262, impacted and interested parties server 7264, and broadcast network server 7266. In an alternate embodiment larger or smaller numbers of servers can be used to host the situational networks. In some embodiments, a single server is used to host all the situational networks, while still maintaining the individual characteristics (and allowed participants) of each network.

As will be appreciated by one of skill in the art, all participants in the same physical situational network need not be shown the same information. Through utilizing inter-network permissions and node information tables 7274, permissions for each actor/device can be established. In some embodiments, first responders on the first responder situational network 7268 have unrestricted two way communication access, whereas physically distant observers on the broadcast situational network 7278 receive one way read-only information similar to what can be found on TV.

Referring to FIG. 22D, a representative permissions table is shown for some of the actors (individuals and/or equipment) shown in FIG. 22A as they are brought into the relevant situational networks. The information shown in FIG. 22D can be used to populate inter-network permissions and node information tables 7274 shown in FIG. 22C. As can be seen, promotions provide for greater access to information. Additionally, although an actor such as investigating engineer Paul Gutenberg 7236 may initially only be granted access to broadcast video and status, the permissions for that individual might change, as would be the case if it was determined that the fire had caused structural damage and that investigating engineer Paul Gutenberg 7236 needed the ability to make requests regarding the video feed in which case he could be promoted and given access to both responder info and video feed control to make determinations about the status and safety of the structure. Permissions such as those shown in FIG. 22D, as well as those of the type illustrated in FIG. 12D (including HIPPA permissions) can be incorporated into inter-network permissions and node information table 7274 or alternate tables accessed by servers and software forming the situational networks and responsible for controlling access to information by those individuals.

Figure 22E:
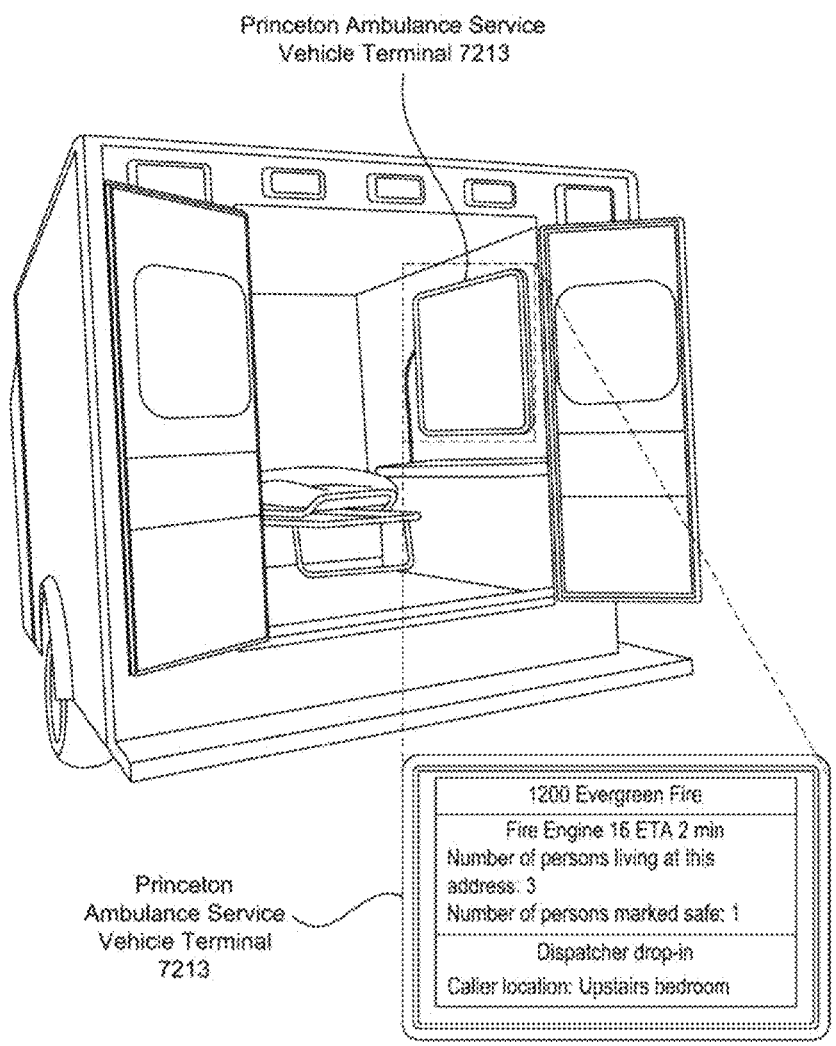
FIG. 22E shows an illustrative example of representative on-vehicle terminal displays for emergency responders in a situational network, in accordance with some embodiments of this disclosure.

Referring to FIG. 22E, in some embodiments relevant information is displayed on a terminal located inside the responder vehicle such as Princeton ambulance service vehicle terminal 7213. This terminal is connected to the appropriate situational network, which in this case is first responder situational network 7268, allowing information to be updated in real time by a situation authority such as a 911 dispatcher, other local authority, or real or virtual authority providing near real time information. Similarly, a physician may have a terminal such as physician terminal (not illustrated), that provides information regarding a patient that has been impacted by the situation. The physician terminal may be included as part of smartphone, tablet, or other mobile or fixed computing device with a display or providing audio prompts.

Figure 22F:
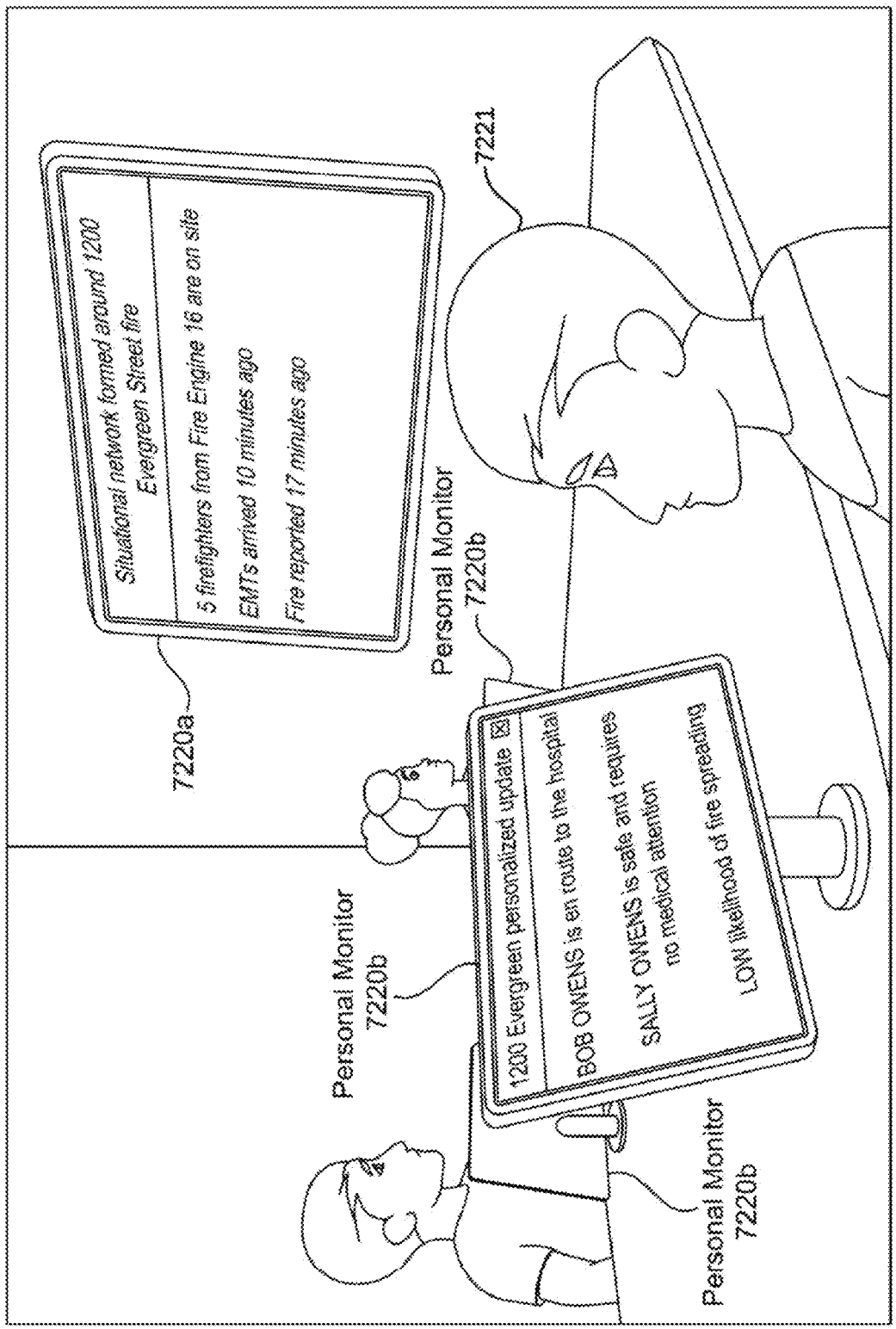
FIG. 22F shows an illustrative example of a representative "SitNet situation room" in a VR environment, in accordance with some embodiments of this disclosure.

As shown in FIG. 22F, a situation room (physical, virtual, or a combination of both) can be populated by the alerted parties identified in the situational network formed around a physical event, as well as observers. This situation room is where alerted parties such as family members or employers may receive information and situation updates. In some embodiments, these updates are provided by main monitor 7220*a* displaying general information, along with personal monitor 7220*b* that can privately display privileged information, such as information which would be available to the parents of a minor victim, but not the teachers. In addition, supplemental information can be made available continuously through monitor updates.

In some embodiments, actors may enter into or leave the situation room. In the present use case, Sally Owens 7216 was not at home during the fire and has subsequently joined the situation room illustrated in FIG. 22F. Also in the room is Meredith Owens 7218, Charlie L. Ring 7232, Channel 9 News Correspondent 7234, and the neighbor Thornton Bradley 7208. All actors present are represented by virtual reality avatars while in the VR situational network. While Meredith and Charlie are in the same situation room, due to their differing relation to the family they are not necessarily aware of each other's existence and receive different information. Sally Owens 7216, being the parent of minor Jamie Owens 7206, is privy to his confidential information, while Thornton Bradley, pre-promotion, living one house over, sees only relevant information about the probability of the fire spreading. Subsequent to promotion, and because he is contributing live video regarding the situation, Thornton Bradley (post-promotion) is granted access to the first responder information, as well as video control (responding to requests for changes in perspective, zoom, and other features related to video feed control) and the message board. Charlie L. Ring 7232 is an observer, and as such only receives updates regarding the state of the house fire one might see on the news or a community app such as Citizen. Due to the fact that he is not a member of the immediate family, he is disallowed from interacting with them during the crisis.

Figure 22G:
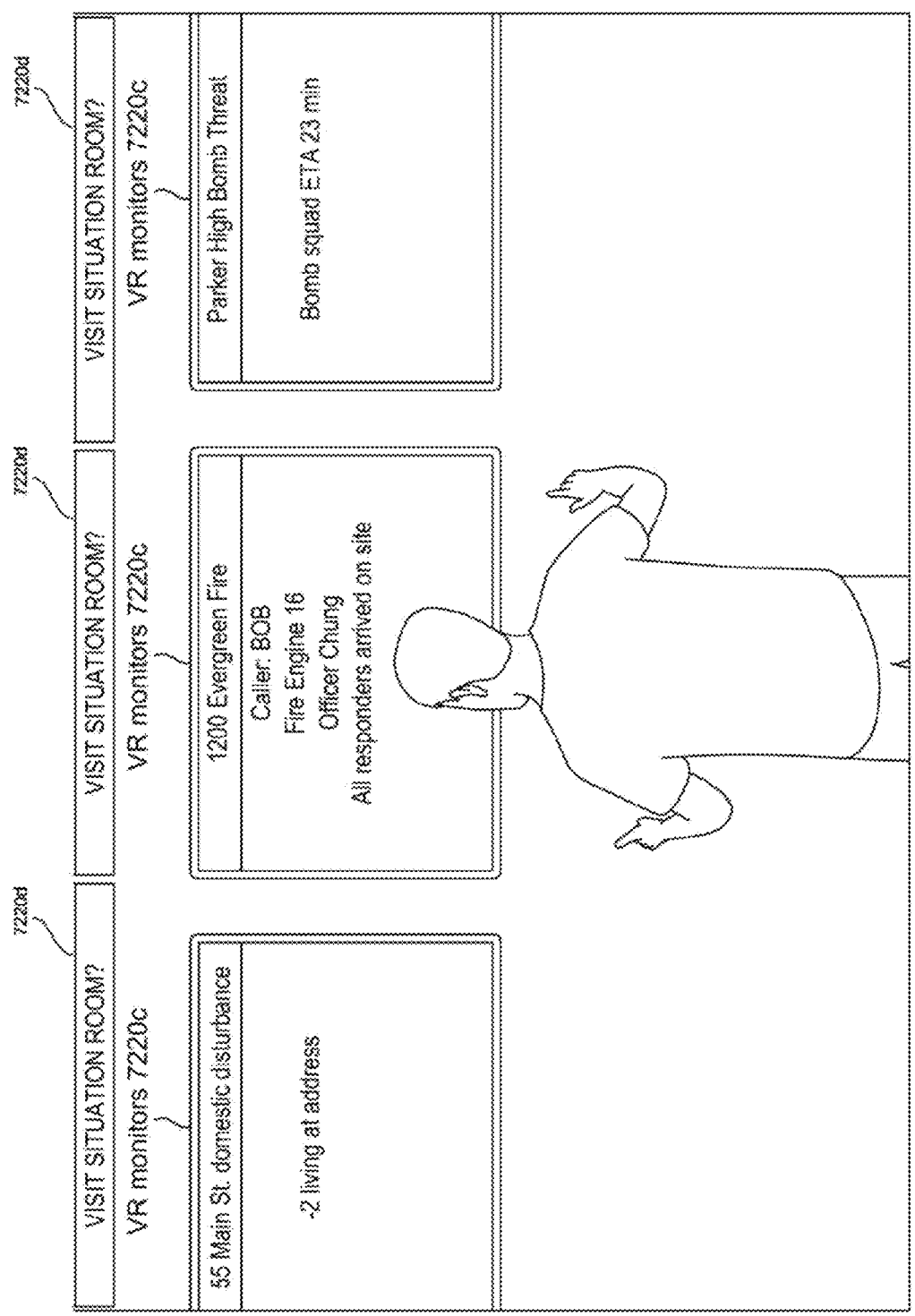
FIG. 22G shows an illustrative example of a representative "SitNet control room" in a VR environment, in accordance with some embodiments of this disclosure.
Figure 24A:
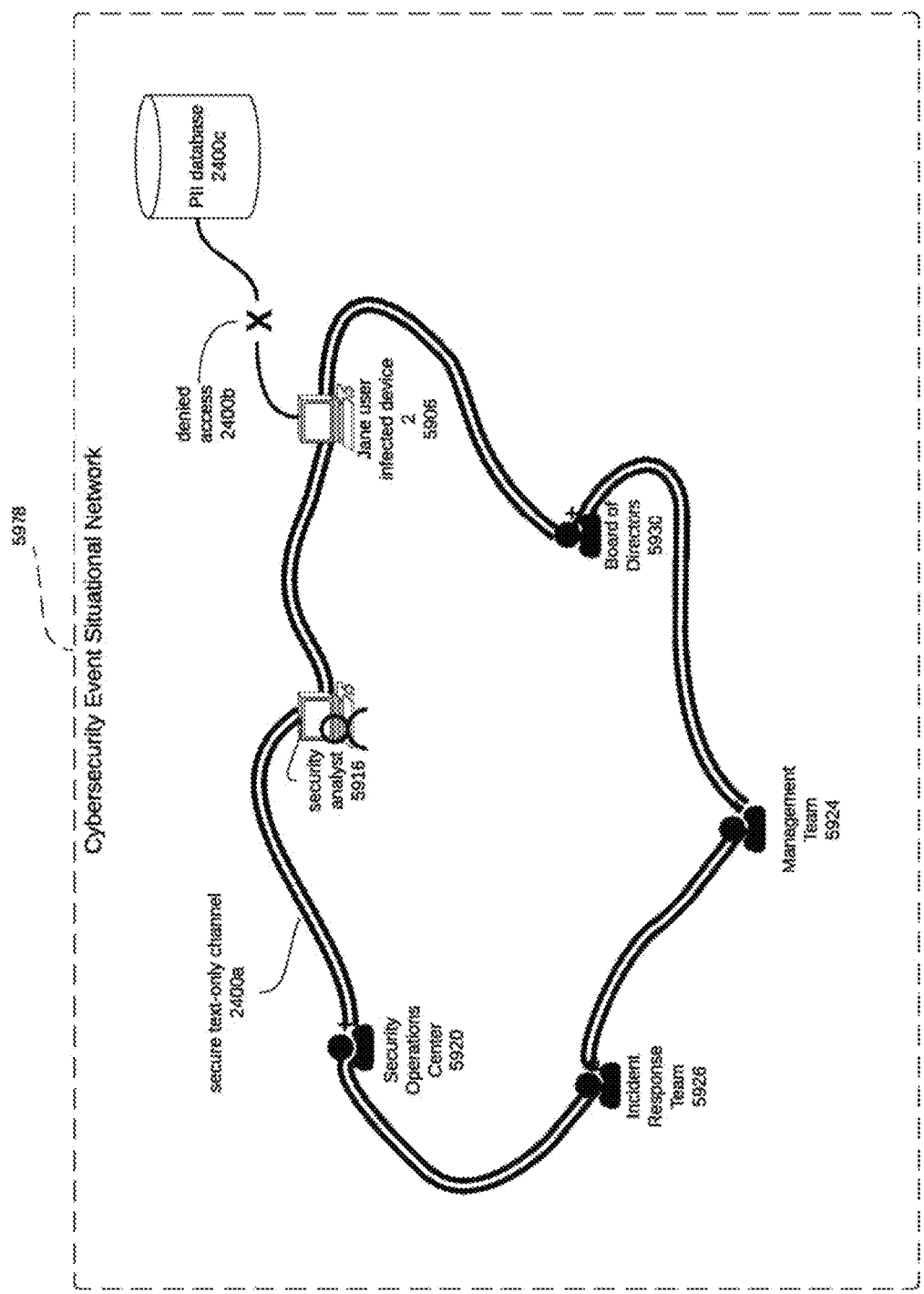
FIG. 24A shows an illustrative example of a representative implementation of a situational network for a representative cybersecurity use case with applied resource allocations, in accordance with some embodiments of this disclosure.

Referring to FIG. 22G, a fully-immersed VR environment related to the situational networks in this use case is shown. For emergency responders whose job does not require their physical presence, including but not limited to 911 dispatchers, social workers, and off-site physicians, such as a victim's specialist, the VR environment allows them to interact and contribute although they are off site. In some embodiments, multiple VR monitors 7220c exist in the virtual environment displaying various information likely including situation updates and involved party lists. The actor within the control room is able to 'drop in' to an individual situational network situation room in order to perform their duties in the emergency situation. In this use case, dispatcher James Lopez 7226 enters the VR environment to monitor the 1200 Evergreen Street fire, a bomb threat at Parker High School, and a domestic disturbance at 55 Main Street. When he receives word from fire engine 16 that the fire has been extinguished, he utilizes the 'drop in' feature via situation room entry request button 7220d to join the 1200 Evergreen situation room as illustrated in FIG. 22F. From here, Lopez can inform those present that the fire has been extinguished and can direct them on how to follow up. Crisis therapist Susanna Grey 7228 also utilizes a situational network control room to manage multiple urgent events concurrently. In this use case, Jamie Owens has died in the house fire and Susanna Grey has been notified. She can utilize the 'drop in' feature to enter the 1200 Evergreen Street situation room and begin counseling the family immediately.

FIGS. 23D, 23E and 23F illustrate an exemplary triplestore database, exemplary projection operators, and exemplary resource allocation for the 911/VR use case and illustrate how these components are used in the formation of the various situational networks as illustrated in FIG. 22C. FIG. 23D is an exemplary triplestore database. These stored relationships allow for identification of relevant individuals and or event, that information providing the basis for an invitation to the situational network (via projections), as well as differentiating between participants tied to physical event node and those on the virtual network. Individuals can be determined to be proximate (e.g., within a specified distance) of the event using geolocation techniques including GPS and other techniques including but not limited to self reporting, check-ins, and other methods in which a user device transmits location. In some embodiments, the database utilizes relationship information (e.g., family and degree of separation, or friendship and degree of separation) such as that stored in a social network to maintain cognizance of family and friend relationships. For example, the database can thus store information indicating BOB OWENS and JAMIE OWENS are at the location of the fire, while SALLY OWENS is not. Using these relationships, BOB and JAMIE are indicated as potentially injured parties at the physical event node, while SALLY is not, and is instead extended an invitation to first responder situational network 7268, participating through virtual reality. As can be appreciated by one of skill in the art, the relationships stored in this database can consist of interpersonal relationships as well as numerous other relevant associations such as resource availability, emergency responder location, and hospital capacity.

In some embodiments, the information stored in the triplestore database such as that illustrated in FIG. 23D need not be static but can evolve with the situation. For example, once Thornton Bradley reports the fire to the 911 call center, the database is updated and a record containing personal identifiable information (e.g., name and phone number) is stored along with the association that the individual has reported the incident. This can be used in the subsequent projection that brings Thornton Bradley into the first responder situational network 7268 based on his reporting of the incident and that he may have additional information for the first responder team that may be critical in saving lives. Similarly, although there may be many structural engineers that can assist, Paul Guttenberg may be identified through various mechanisms (e.g., prior experience, association with one or more of the first responders) and listed in the database.

FIG. 23E shows exemplary projection operators for the formation of a 911/VR situational network. The projection operators are represented as node operators which may have one or more paired association operator(s). A representative projection for the first responder situational network 7268 would be:

first responder [incident] situational network S(G)=(IF event ongoing THEN ((first responder AND proximate) OR (user AND has notified 911))) OR (IF victim identified THEN (user AND is immediate family to victim)).

In this example conditional logic is used to check that the event is still ongoing to project out all nearby first responders. Additionally, if the victim at the event has been identified (e.g., through discovered ID or by facial recognition) then immediately family members are included in the projection. The projection also includes user Thornton Bradley because he was the individual notifying 911 and as previously discussed may have additional information regarding the situation/event. Similarly, a representative projection for the impacted and interested parties situational network 7276 would be:

impacted and interested parties [incident] situational network S(G)=(IF victim identified THEN (user AND is friend or non-immediate family to victim)) OR (user AND has live video feed) OR (user is within 0.1 miles) OR (press AND has live video feed)

In some embodiments, this projection will bring in non-immediate family and friends (assuming the victim has been identified), users that are potentially in danger because they are close (e.g., within a radius of 0.1 miles to the event) or are a user or press with a live video feed that can be potentially useful. In the event of multiple video feeds the system may automatically (e.g., based on video quality or feed location/perspective) or via manual intervention choose which parties are included in the situational network A representative projection for the broadcast situational network 7278 would be:

broadcast [incident] situational network S(G)=(press AND has live video feed) OR (user AND has live video feed) OR (user AND has requested access to VR event node)

In some embodiments, this projection would bring in all live video feeds (press and user) as well as providing for the potential to join users requesting access to (attendance at) the virtual event. With respect to the allocation of resources FIG. 23F illustrates how resources can be allocated to the various situational networks. A representative set of commands for allocation of resources for the first responder situational network 7276 would be CREATE ((first responder, dispatch, hospital), secure radio channel AND corresponding secure Internet channel)

ALLOCATE (promoted user, video feed commands)

ALLOCATE (immediate family, general status message board)

In some embodiments, the first CREATE command establishes, for the named parties of first responder, dispatch, and the hospital which form part of the projection, a secure radio channel as well as a corresponding Internet feed of the radio channel which allows them to communicate regarding the situation. In some embodiments, encrypted police and fire radio channels are used to establish the radio channel, and there is a corresponding Internet channel/stream that authorized users can communicate on that directly connects to the radio channel. This has the advantage of allowing parties without radio equipment or out of range to communicate on the same channel. In some embodiments, one or more broadcast video feeds are provided on the secure Internet channel. In some embodiments, all members of the first responder [incident] situational network S(G) are included in secure radio channel and the corresponding secure Internet channel.

In some embodiments, also included in the resource allocations is a command illustrating that a promoted user may be granted access to video feed commands (e.g., requests) which can be generated by first responders. In the case of neighbor Thornton Bradley 7208, promoted to first responder situational network 7268 via promotion 7280, he may receive requests for altering the position or perspective of the video feed so that other members of the first responder team can assess the situation, monitor damage, or look for victims. Similarly, a command is illustrated that allows immediate family to see a general status message board, or which allows them to monitor another general status communications channel.

In some embodiments, for the impacted and interested parties situational network 7276 exemplary resource allocation commands can be of the form:

CREATE (impacted and interested parties [incident] situational network S(G), (general status message board AND access to streaming)

This allows all members of the impacted and interested parties situational network 7276 to both have access to a general status message board as well as access to all video streams being transmitted from the physical event.

In some embodiments, for the broadcast situational network resource allocation commands can be of the form:

CREATE (broadcast video node, create multicast)
ALLOCATE (requesting user, join multicast)
ALLOCATE (requesting user, non-confidential status board)

These exemplary commands take one or more broadcast video streams and create multicast transmissions, and allow users requesting access (e.g., via a website or VR portal) to gain access by joining the multicast. By using multicast bandwidth is conserved. Users requesting access are also presented a non-confidential status board or other messaging mechanism that conveys the general status of the situation.

In some embodiments, although permissions can be granted via the projection and resource allocation mechanisms, the permissions such as those illustrated in FIG. 22D can be used through separate access and enforcement, either prior to allocating resources, in conjunction with allocating resources, or subsequent to allocating resources. Although described here with respect to the 911/VR use case, permission tables can be used in other use cases.

The embodiments described in the context of the 911/VR use case have the advantages of rapidly and automatically establishing one or more situational networks such as first responder situational network 7268, impacted and interested parties situational network 7276, broadcast situational network 7278, and combined situational network 7270, as illustrated in FIG. 22C. By applying the projection operators to the appropriate database, the required individuals, objects, and equipment can be readily identified and brought into the situational network with the appropriate resources. Because the projection operators can be pre-determined and do not require knowledge of specific individuals (users) or objects/equipment, they can be automatically referred to and applied to find the sets of individuals, objects and equipment that need to be brought into the network. This is not only efficient from a computational point of view, it removes the need for human intervention to identify the individuals that should be initially placed into the network.

In some embodiments, the projection operators also provide the ability to distinguish between tiers of access corresponding to the different situational networks previously described and as identified in FIG. 22C. By using the projection operators to create the specified participants in each situational network, resources can be subsequently allocated and valuable resources such as bandwidth can be preferentially reserved for higher tiers such as first responder situational network 7268. This removes the need for human intervention to preserve valuable resources.

The previously described 911/VR use case also provides for a combined situational network 7270 which in some instances can be used to provide messages to all parties. Examples of such messages can include broadcasts from public officials regarding the event/situation, global updates to all parties, and other messages and communications which should be transmitted to all parties, including those participating virtually, regarding the event/situation.

Figure 12A:
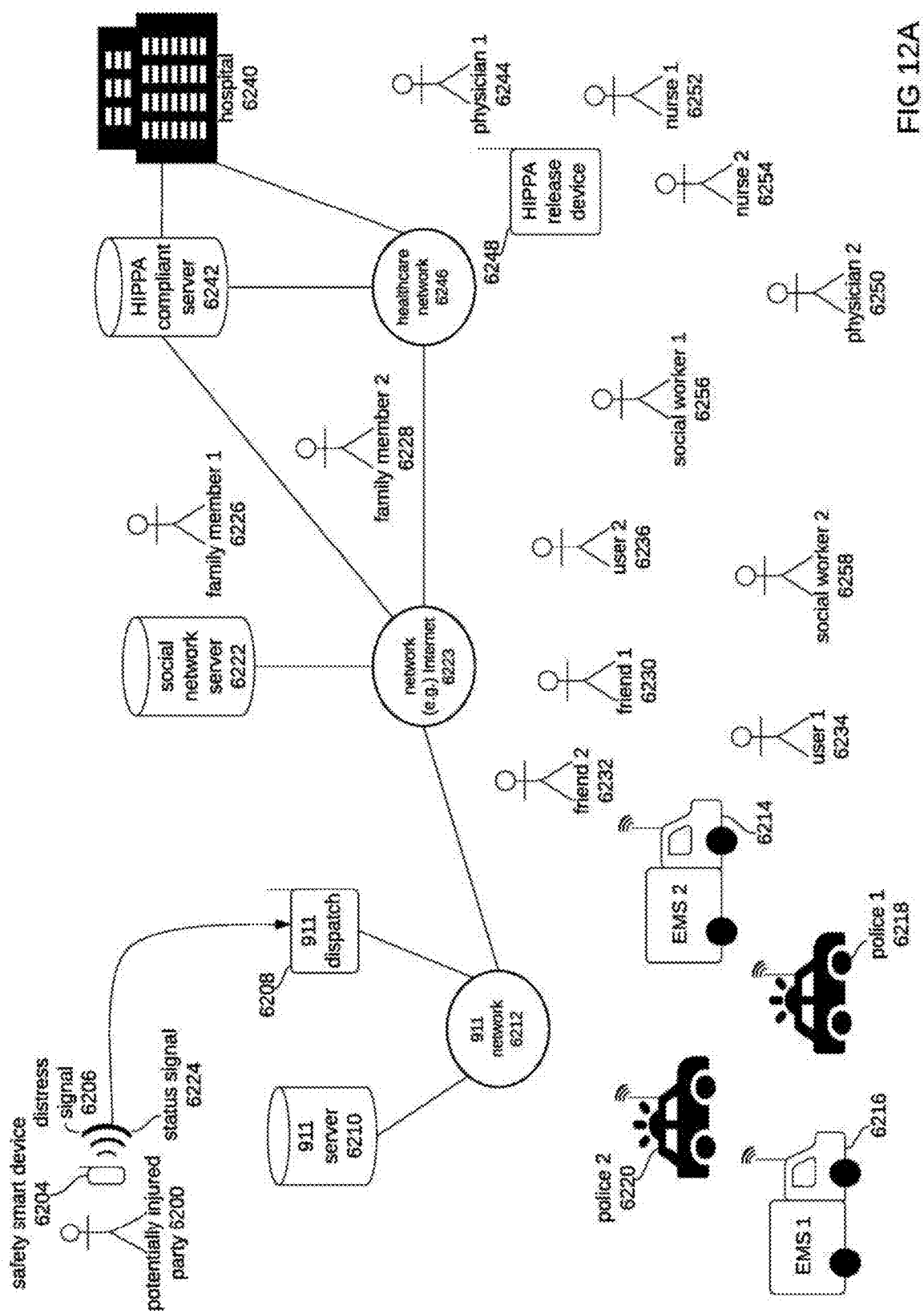
FIG. 12A shows an illustrative example of the actors and infrastructure in a multinetwork situational network pertaining to an exemplary 911 use case, in accordance with some embodiments of this disclosure.

Referring to FIG. 12A, the figure illustrates the actors and participants in a multi situational network environment resulting from a 911 call. In FIG. 12A, one observes a potentially injured party 6200 who has a safety smart device 6204. The safety smart device 6204 can be a smart phone, smart watch, or other similar device that not only supports communication but monitors individual safety and, in some instances, can detect abnormalities such as a fall or fluctuation of vital signs. The device may then, autonomously or through obtaining permission from the potentially injured party 6200, transmit a distress signal 6206 which may consist of a voice message or data indicating help is required. In some embodiments, safety smart device 6204 also transmits a status signal 6224 which can be received by one or more networks. In some embodiments, distress signal 6206 is received by a 911 dispatch 6208 which contains a human or computer-based receiver that receives distress signal 6206. 911 dispatch 6208 is connected to a variety of devices through 911 network 6212, including connections to 911 server 6210, and through 911 network 6212, connection to police 1 6218, police 2 6220, EMS 1 6216 and EMS 2 6214. In some embodiments, 911 network 6212 is a private radio-based network, while in other embodiments, it is based on a wired private network or utilizes the internet. 911 network 6212 is typically connected to an external network such as external network 6223 which can be the internet. As would be understood by one of skill in the art, 911 dispatch 6208 can direct, as will be discussed, police and EMS to assist the potentially injured party 6200.

Referring to the actors that are not part of the emergency network but may be interested in the status of potentially injured party 6200, including family member 1 6226, family member 2 6228, friend 1 6230, friend 2 6232, and user 26236. These individuals can form part of a social network which is recorded on social network server 6222, on which potentially injured party 6200 may also be a participant. In some embodiments, the aforementioned actors are all part of a social network hosted on social network server 6222 with each member having access to that social network via a computer or smart device such a smartphone or watch. Referring to the healthcare personnel indicated in FIG. 12A, a physician 1 6244, physician 2 6250, nurse 1 6252, nurse 2 6254, social worker 16256, and social worker 2 6258 are connected to healthcare network 6246 which is supported by a HIPPA compliant server 6242. Additionally, hospital 6240 is connected to the healthcare network 6246 and has access to HIPPA compliant server 6242 which allows it to maintain and access records related to individuals admitted to or being admitted to hospital 6240. It should be noted that HIPPA release device 6248 forms part of healthcare network 6246 and allows information to be released under the appropriate conditions as will be discussed.

FIG. 12B Illustrates the creation of physical situational networks corresponding to the 911 required situational network which is created in support of the 911 use case and the healthcare situational network. As shown in the bottom of FIG. 12B, these networks are the 911 physical situational network 6262B the social network physical situational network 6272B, and the healthcare physical situational network 6274B. These situational networks are formed from the respective social graphs and databases containing the information pertaining to the relevant parties, in the example of the 911 physical situational network 6262B, it is generated by 911 server 6210 from 911 social graph 6260B through the use of a 911 projection 6261B. In particular, the nodes of the 911 social graph 6260B can include potentially injured party node 6200, 911 dispatch node 6208B, police node 6220B, EMS 2 node 6214B, EMS 1 node 6216B and police 1 node 6218B. As will be understood by one of skill in the art, other nodes can be included in the 911 social graph 6260B and the relationships between those nodes are stored as associations 6263B. The projection operator that can be used to project out the relevant nodes is 911 projection 6261B, which in some embodiments finds the appropriate EMS and police staff to assist potentially injured party 6200 by use of operators including but not limited to, proximity of police and EMS nodes to the potentially injured party 6200, vital signs measured by the smart safety device 6205, equipment carried by police or EMS personnel, and other parameters such as a violence parameter that may indicate police presence is necessary prior to the arrival of EMS. Other projections and projection operators can be utilized with the goal of rapidly and efficiently identifying the most relevant parties to interconnect for further communication related to the status of potentially injured party 6200. Referring to social network server 6222 it is used in conjunction with social network 6270B with a social network projection 6271B projection out the appropriate parties for social network physical situational network 6272B. As will be discussed, these may include individuals that are in need of information related to potentially injured party 6200. Referring to the HIPPA compliant server 6242, it is used in conjunction with healthcare network 6246 and a healthcare network projection 6273B to create healthcare physical situational network 6274B.

Figure 12C:
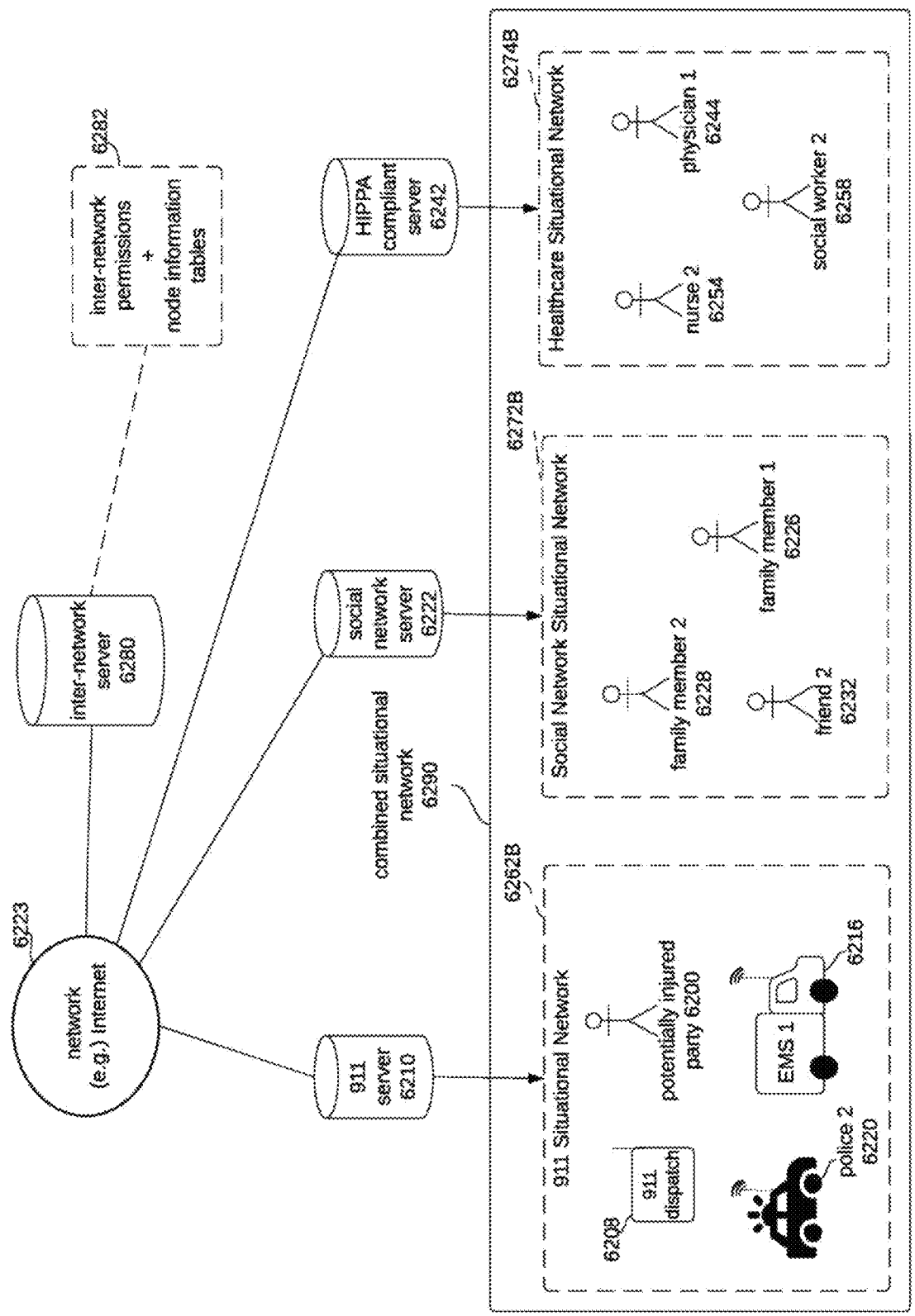
FIG. 12C shows an illustrative example of the formed situational networks and the combined situational network for an exemplary 911 use case, in accordance with some embodiments of this disclosure.

As illustrated in FIG. 12C a combined situational network 6290 results from having the various situational networks interconnected, including 911 physical situational network 6262B, social network physical situational network 6272B and healthcare physical situational network 6274B. As will be appreciated by one of skill in the art, the networks can be interconnected through a variety of mechanisms, including traditional TCP/IP as well as combined networks or translation capable networks which convert messaging on a private network such as a 911 network into messages that can be received on a traditional internet based network. The networks are supported by respective servers including 911 server 6210, social network server 6222, and HIPPA compliant server 6242. Referring to 911 physical situational network 6262B, based on the projection described in FIG. 12B, the relevant parties identified include 911 dispatch 6208, which once receiving the call or data from potentially injured party 6200, then interconnects police 2 6220 and EMS 1 6216 to respond to assist potentially injured party 6200 with the formation of the 911 physical situational network 6262B to facilitate communications between the identified relevant parties. Referring to social network physical situational network 6272B, the relevant parties identified through that projection include family member 1 6226, family member 2 6228 and friend 2 6232. With respect to healthcare physical situational network 6274B the relevant interconnected parties include physician 1 6244, nurse 2 6254, and social worker 2 6258. It should be noted that with respect to any of these situational networks and the healthcare physical situational network 6274B, the participants identified may change over time such that if physician 16244 goes off duty, another physician may be substituted in their place in the healthcare physical situational network 6274B. In some embodiments, a combined situational network can be created by facilitating intercommunications between 911 physical situational network 6262B, social network physical situational network 6272B and healthcare physical situational network 6274B. An internetwork server 6280 is used in some embodiments to access an internetwork permissions and node information table 6282 which contains information which allows or prohibits information to be disseminated.

As illustrated in FIG. 12D, each party is designated to receive certain information including but not limited to, 911 information, HIPPA related information such as health records or health status, access to a message board and status updates. As an example, 911 dispatch 6208 can gain access to all 911 information, HIPPA information, the message board and status updates. As can police 2 6220, EMS 1 6216, physician 1 6244 and nurse 2 6254, whereas social worker 2 6258, while having being designated as part of healthcare physical situational network 6274B, only receives status updates and is disallowed from receiving other types of information. Family members 1, 2 and friend 2 do not receive any 911 information, but based on HIPPA permissions, family member 1 can receive HIPPA information, access to the message board and status updates, while family member 2 and friend 2 only receive status updates.

Figure 12E:
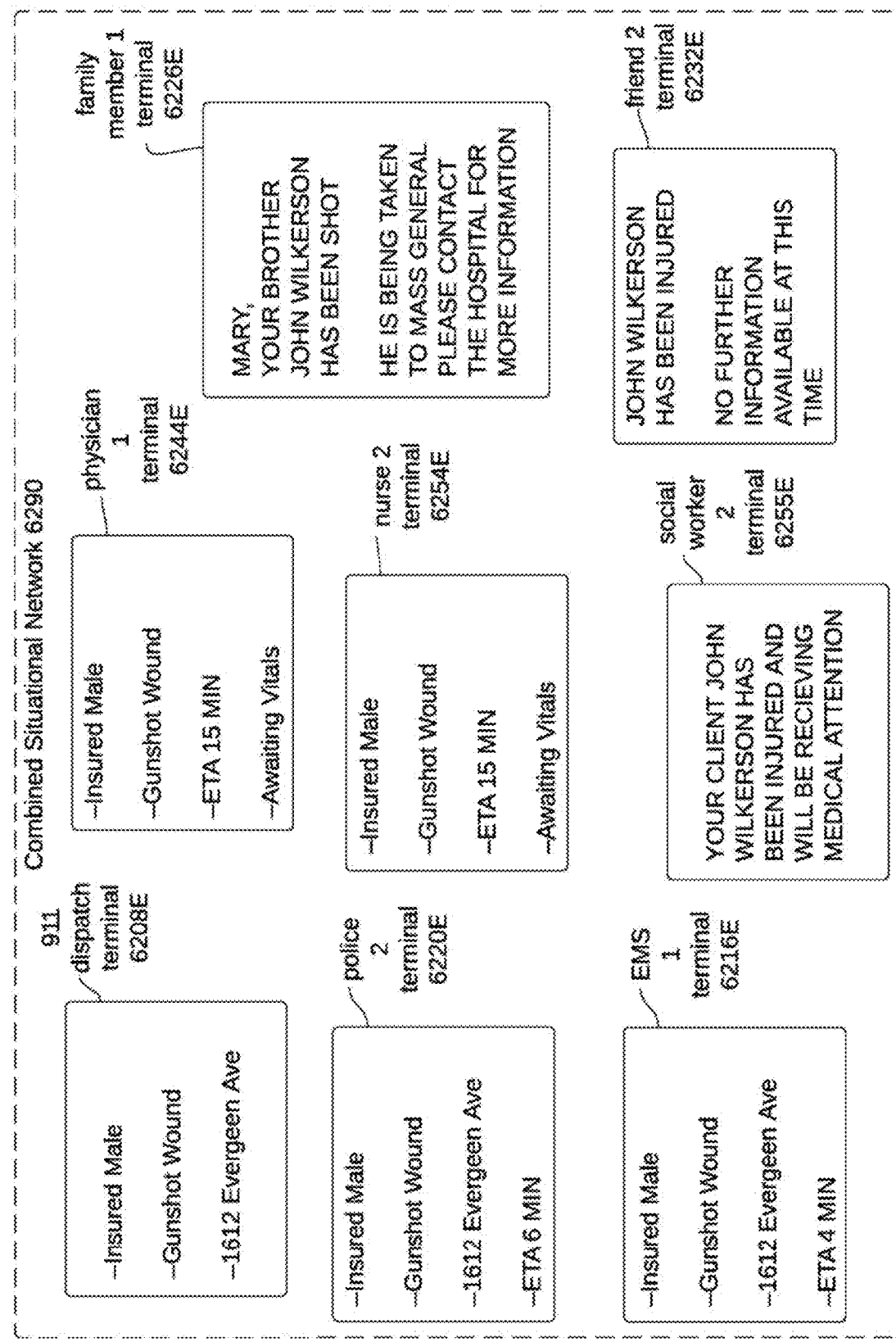
FIG. 12E shows an illustrative example of representative terminal displays for different actors in a combined situational network for an exemplary 911 use case, in accordance with some embodiments of this disclosure.

Referring to FIG. 12E, the terminal displays seen by relevant actors in the combined situational network 6290 are illustrated. As such, the 911 dispatch terminal 6208E will display messages generated by or relevant to the 911 dispatch party, the police 2 terminal will display information pertinent to that actor including critical information such as status, address, incident, and the ETA to the scene. Likewise, EMS 1 terminal 6216E displays similar information. The healthcare actors including physician 1 receive information on physician 1 terminal 6244E which indicates relevant information such as ETA and vital signs or status on information related to vital signs such as the "awaiting vitals" message. Nurse 2 terminal 6254E displays similar information, allowing that individual to prepare for the arrival of the potentially injured party 6200. Social worker 2 terminal 6255E displays only the information that actor has permission to see, which in this case is limited to a status notice. Referring to family members and friends, family member 1 terminal 6226E indicates information related to the status of the potentially injured party 6200 with instructions as to how they can obtain further information. Friend 2 terminal 6232E receives simple status information which can be updated subsequently. As will be understood by one of skill in the art, each terminal or display device may look different, and the functionality of the message board or status updates may vary, but the display of information is conveyed according to the internetwork permissions and node information tables 6282. Additionally, as will be understood by one of skill in the art, parties may enter information or may be requested to enter information to be included in the message board, whereas other parties may have limited access to the message board or be disallowed from entering information based on internetwork permissions and node information tables 6282.

In some embodiments, another application of the creation and use of a situational network is the monitoring of an individual's safety, and the autonomous creation of a situational network or multi-network situational network in an emergency situation. As will be appreciated by one of skill in the art, a situational network that can be rapidly created with identification of the appropriate emergency response personnel can be essential for saving an individual's life.

Figure 17:
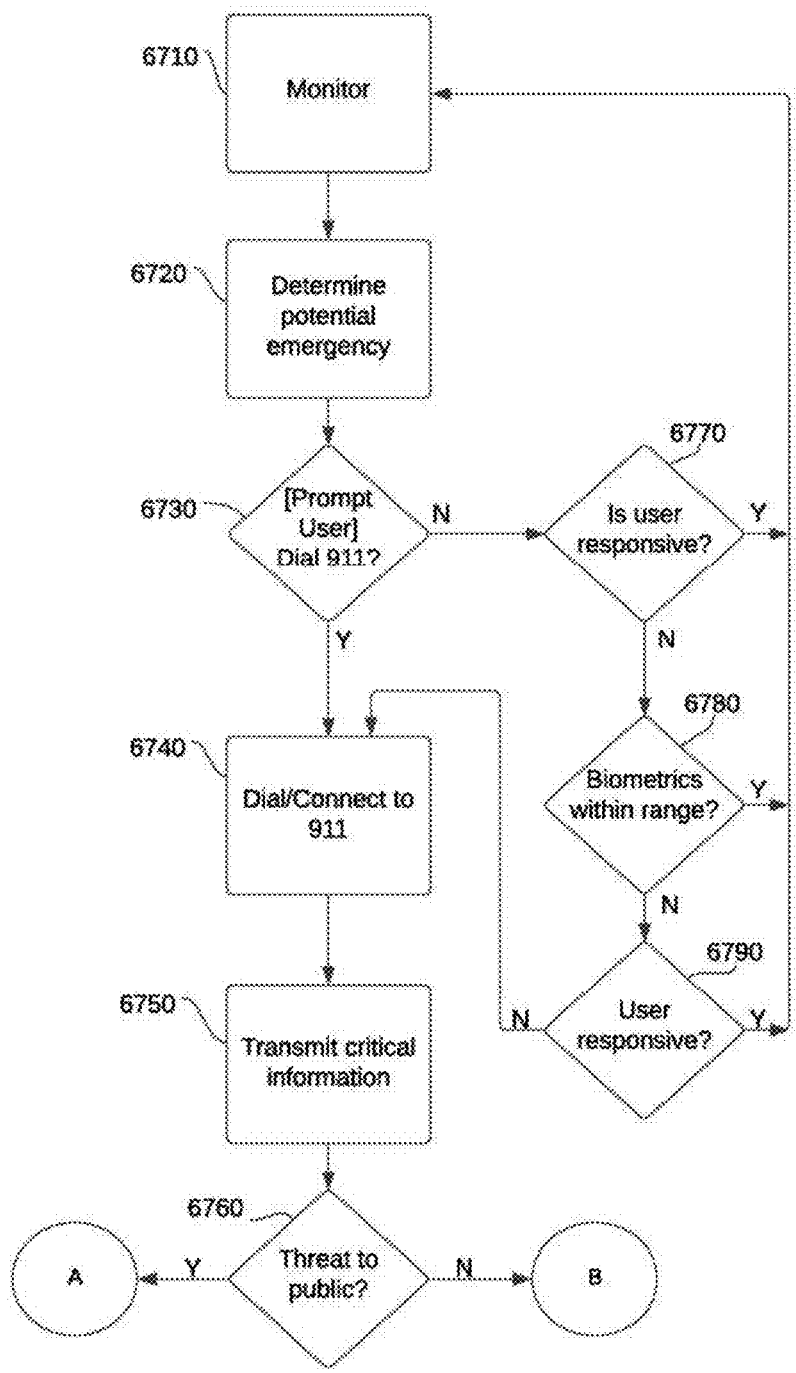
FIG. 17 shows an illustrative example of a method of utilizing smartphones and smart or fitness watches in creating a situational network to assist in a crisis or emergency, in accordance with some embodiments of this disclosure.

In some embodiments, a monitoring device carried by an individual is used as the inception of the situational network or multi-network situational network. Referring to FIG. 17, in a first monitoring step 6710, a device such as a smartphone, smartwatch, or other monitoring device monitors the situation, usually with respect to an individual. The monitoring of step 6710 can include monitoring health parameters of an individual, including biometrics such as: heart rate, respiration, monitoring accelerometers to detect falls, monitoring for noises such as gunshots, car crashes, or other potential events, monitoring for smoke, fire, or excessive temperatures. In step 6720, an emergency at the local level can be determined due to the fact that the monitor associated with an individual has indicated out of range or dangerous parameters. In subsequent test step 6730, user is prompted to dial 911 or through a more detailed screen display and menuing system, are prompted as to the nature of the emergency. In the event that the user responds indicating an emergency that requires emergency services such as those provided by dialing 911, a subsequent step 6740 is executed in which a connection is established either through dialing in a phone network or other electronic connection to a 911 operator or other emergency service. In a subsequent step 6750, critical information regarding the individual or local situation is transmitted and can include but is not limited to biometric information, accelerometer information which may indicate a crash fall or other event leading to a sudden change in position or rapid acceleration and subsequent deceleration, excessive temperatures, or other parameters related to the local emergency. In the subsequent step 6760 a threat to public test is performed in which it is determined that either the local emergency is a threat to a multitude of individuals in which case it is considered to be a public threat and will proceed to the flowchart option B, or it is not a public threat, leading to the flow chart option A. Returning to test 6730, in the event that the user either responds negatively to the prompt or does not respond to the prompt regarding need for emergency services, the system proceeds to test 6770 by confirming the user is responsive by sending additional prompts. If the user responds to these prompts and continues to indicate they do not need emergency services, the system returns to the monitor step 6710. In the event that the user is not responsive, the system performs another test to determine if the biometrics are in range, and if they are the system returns again to monitor step 6710. If not, the system does one more user responsive test 6790, if the user is non-responsive, the system automatically executes step 6740 to dial or connect to 911 services. If it is determined that the user is responsive in 6790, the system returns to the monitor step 6710.

Figure 18:
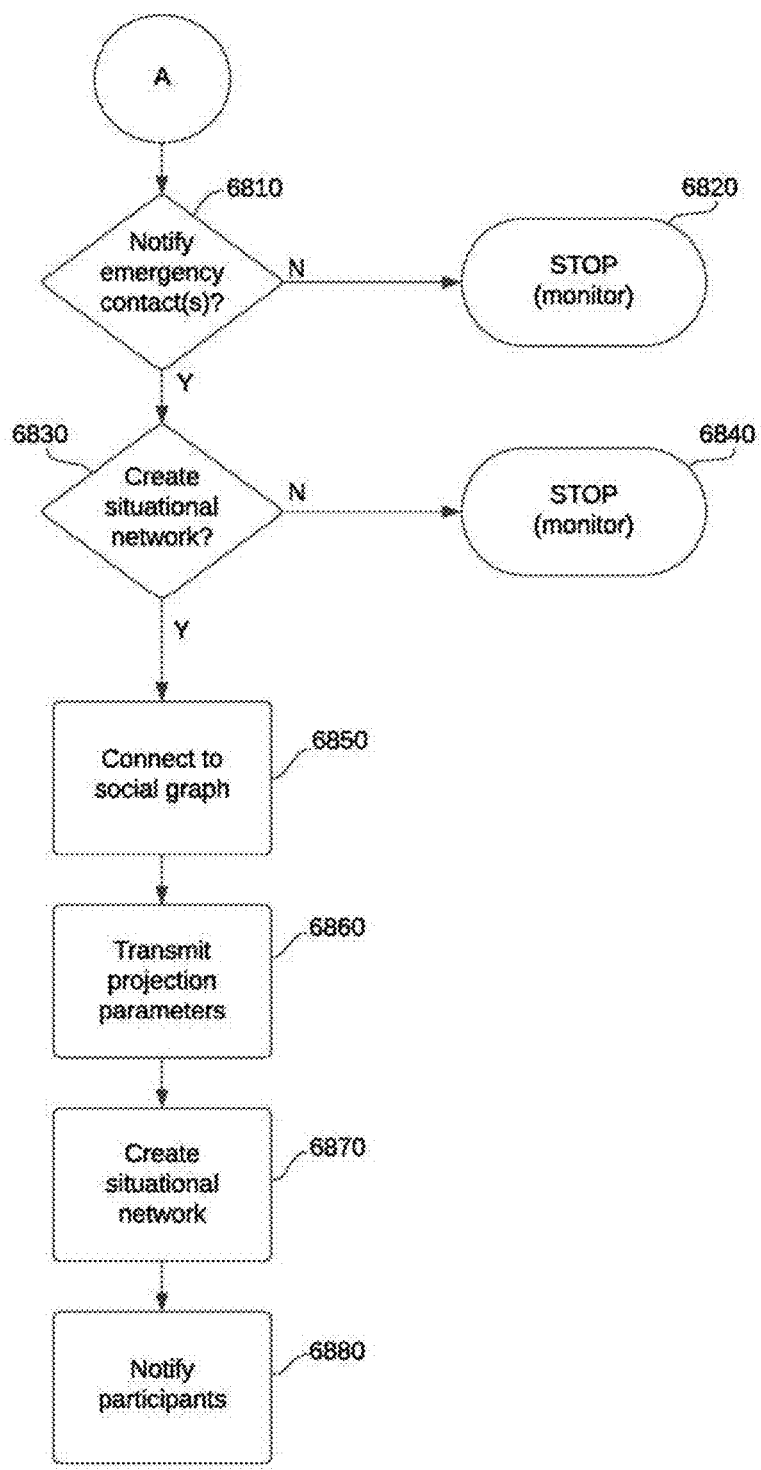
FIG. 18 is a flowchart of an illustrative process used to determine if an individual's emergency contacts should be alerted via situational network to an emergency situation, in accordance with some embodiments of this disclosure.

Referring to FIG. 18, a test 6810 is performed, via processing circuitry to determine if it is necessary to notify the emergency contacts of the affected individuals. If it is determined that emergency contacts are not to be informed, the system stops at step 6820 and returns to monitoring, via processing circuitry, as shown in FIG. 17 step 6710. If it is determined it is necessary to notify the emergency contacts, a second test is performed via processing circuitry to determine the necessity of creating a situational network, step 6830. This test is performed by examining the parameters which has resulted in the notification of 911 services, including biometric parameters associated with the individual(s), other environmental parameters, or parameters such as acceleration and temperature to determine if creating a situational network is necessary to notify individuals of either the status of the individual who has requested 911 services, or to notify those individuals for their own safety. In the event it is determined that a situational network creation is not required, a stop step 6840 is reached, and eventually the system returns to the monitor 6710 state. If it is determined in test 6830 that a situational network should be created, a connection is made to the social graph in step 6850 to initiate the creation of the situational network by processing circuitry. In the subsequent step 6860, the projection parameters are transmitted to the social network and can include the parameters required to identify individuals that should be part of the situational network. These parameters can include friendship, degree of separation analysis, geographic location, status of individuals, their past history in the social graph, events they have attended. In some embodiments, the projection parameters are developed based on the assessment of the risk of other individuals to the local emergency that has been determined. For example, if an individual dials 911 services indicating that they are physically ill and may have eaten something toxic, in the creation of the situational network the projection parameters may include: restaurants the individual has eaten at or checked into recently, and other individuals eating at that restaurant. As such, the projection parameters can be determined based on the parameters used to notify emergency services. In step 6870 the situational network is created, via processing circuitry by traversing the relationships and the nodes of the social graph, and in step 6880 the participants are notified and requested to connect and become part of the situational network.

Figure 19:
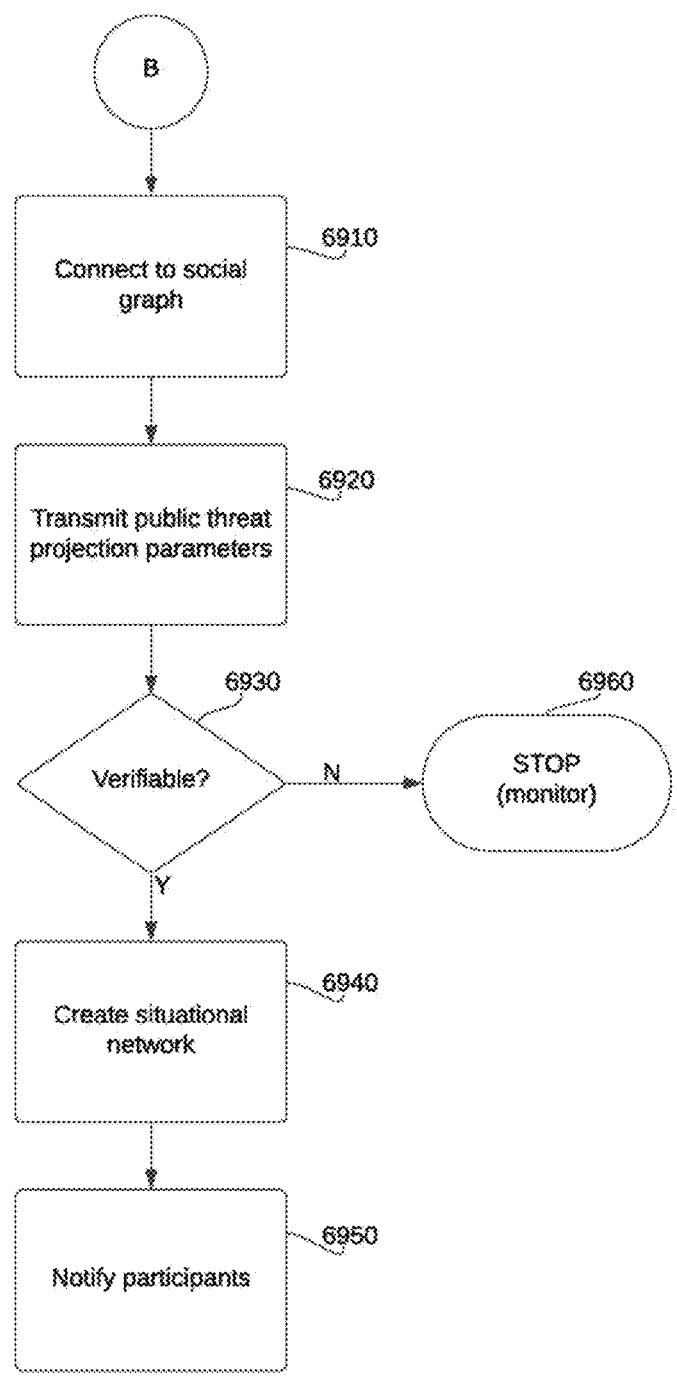
FIG. 19 is a flowchart of an illustrative process used to determine the localization and potential reach of an emergency event that initiates the formation of a situational network, in accordance with some embodiments of this disclosure.

Referring to FIG. 19, in the event that the threat is determined to be a threat to the public in test 6760, then the system proceeds to the flowchart labeled B in FIG. 17, and a connection to the social graph is created in step 6910. In step 6920 the system or device then transmits the public threat projection parameters via processing circuitry. These parameters can include the expected radius of the threat, the level of the threat, the number of individuals believed to be threatened by the event, the duration of the event whether ongoing or terminated crisis, the expected duration of the event, for example in a weather event, and other parameters that could be useful in creating the situational network. In step 6930, a test is performed either by the device via processing circuitry or more typically in the social graph to determine if the event is verifiable. In some embodiments, the test 6930 is performed by monitoring for other indications of a public crisis transmitted by other devices or individuals. In the event that it is determined that the crisis is verified, then the situational network is created in step 6940 and participants are notified and invited to the situational network in step 6950. In the event that the public threat is not verifiable, the system stops at step 6960 and eventually returns to the monitor step 6710.

Referring to FIG. 23A, a simplified triplestore database is shown for the formation of a situational network around a 911 call. These are the data points that are examined for each individual to determine if an invitation to the situational network should be extended. In some embodiments, data and associations are stored as semantic triples composed of a subject, predicate, and object. As will be appreciated by a skilled addressee, triples can be manipulated into more complex forms by pointing to another triple as the object. FIG. 23A lists examples of meaningful associations that allow for the identification of relevant individuals. For example, EMS 1 is currently at the event responding, however EMS 2 is available nearby, has specialized equipment, and could easily be invited to the network if that equipment is necessitated. Furthermore, while police 1 and 2 are both in the dispatch area, police 1 was dispatched preferentially due to their historical success with violent calls, such as this one.

FIG. 23B shows a table of exemplary pairs of node operators and association operators for an exemplary 911 situational network. These node operators represent the decision-making process regarding whether to extend an invitation to a specific actor to join the situational network, while the association operators represent the changing and adaptive parameters that necessitate those parties' addition to the situational network. As would be understood by one of skill in the art, these node and association operators can be generated from multiple sources of data. In some embodiments these are triplestore databases or stored social graphs. An exemplary projection of participants proceeds as follows: an emergency is identified and the decision to form a situational network is made. From here, the projection operators define what parties are needed to assist, which parties are impacted, and which parties should be alerted. For example, the association operator of victim vitals can be measured from a safety smart device as discussed in FIG. 12A, if vitals begin to deteriorate, the decision to invite paramedics to the emergency situational network is made in response to the changing association operator. In some embodiments, the situational network will have access to a database storing information such as paramedic skills and carried equipment, allowing for more complex projections. For example, if a safety smart device detects a dangerous fall through accelerometer data, specific paramedics with access to cervical spine collars could be invited to the network.

Referring to FIG. 23J, a simplified triplestore database is shown that captures data about individuals within a business enterprise. Each entry, or 'semantic triple', in the database consists of a subject, predicate, and object, forming a statement about a resource in the organization. For instance, a triple with the subject "MARKETING BOSS", predicate "COMPLETED", and object "LEADERSHIP TRAINING" indicates that the individual in the marketing boss role has completed leadership training. The triples can represent various types of information, including but not limited to personal preferences, work habits, certifications, and relationships between individuals. This structured format allows for easy querying of the data, enabling the identification of patterns and correlations that allow the projection of situational network participants. In FIG. 23J, a large variety of stored workplace data is used to project a team for a time-sensitive task. In one example, both "MARKETING BOSS" and "MARKETING 1" have entries indicating a preference for morning meetings. This likely indicates an alignment of productivity peaks and an efficient team. Conversely, "MARKETING 2" has a preference for afternoon meetings; thus, including this individual in a morning meeting may not be optimal for their productivity or team efficiency.

In some embodiments, beyond the explicit data, the database can infer new relationships through a set of pre-defined inference rules and an initial ontology that defines the meanings of predicate relationships. An ontology in this context is a formal representation of knowledge within this context, consisting of a set of concepts, classes/categories, and relationships between them. In FIG. 23J, an exemplary ontology defining the predicates is given: "Predicate "PREFERS" is defined to indicate a strong tendency or habit of an individual. Predicate "CLOSED DEAL WITH" indicates a successful professional interaction. Predicate "ATE LUNCH WITH" indicates a personal rapport between individuals." An inference rule could be created for team assembly such as "If two or more individuals PREFER the same time for an activity, and there is evidence of successful professional interaction OR personal rapport between coworkers, infer that they are suitable to be on the same team." Other inference rules exist for other team scenarios, one such example is "If an individual has COMPLETED specific TRAINING, they are invited in a leader role"

Referring to FIG. 23J, this looks like: "Given that both MARKETING BOSS and MARKETING 1 prefer morning meetings and have shared a meal together (indicating rapport), we can infer they are likely to work well together during morning meetings. Additionally, SALES 1 has closed a deal with MARKETING 1, suggesting that they have a successful working relationship. Even though the preference for meeting times for SALES 1 is not stated, the previous success calls for their invitation to the team. In this scenario, MARKETING 2 is not chosen due to their time preference for afternoon meetings, indicating incompatible productivity hours. Additionally, IT 1 is not chosen for the team despite possessing relevant skills. This is because the database can acknowledge IT is not necessary for the assigned task through intrinsic inference rules. Using these rules, the database projects the necessary participants, sends invites, and creates the final team of MARKETING 1, MARKETING BOSS, and SALES 1.

FIG. 23K shows an exemplary list of projection operators for role identification and team building. The node operators store specific team roles and qualities that are desirable in a team. The association operators show how to identify the individual within the business who best fits the role listed in the node operator. This format allows the use of simple semantic language for querying and calling for a situational network for team formation. If a team is needed, a list of required roles is provided to the database. Through analysis of each role's paired association operator(s), a projection can be formed to invite the relevant individuals to the situational network. For example, a team has been formed that contains a leader, subject matter expert, and a fast learning new hire. It is decided that the final team member should be someone who can act in a regulator role, minimizing conflicts. The database is searched for users who regularly use company-provided meditation tools and/or have completed emotional intelligence training. If multiple matches are found, a weighing process is used to cumulatively evaluate the best match. Due to the fact that these traits are highly associated with the skills required of a regulator, In some embodiments, location information can be utilized in the formation of a situational or multi-network situational network to identify the location of users, equipment, vehicles, or other persons or objects that may need to be joined to the situational network. Their location can be stored as information associated with the node or as an association to the node representing the individual or object. A number of techniques can be used to determine the location of the person or object.

Use of Global Positioning Satellite (GPS) information can be used to determine location. For example, a GPS device in a smartphone, vehicle or other object can be used to determine the location or position of that person/object.

In some embodiments, in addition to standard GPS information, a number of enhanced GPS techniques can be used. Enhancing the location capabilities of GPS can be based on advanced techniques that can significantly improve accuracy, reliability, and performance. Exemplary methods include:

Differential GPS (DGPS): This technique uses a network of fixed, ground-based reference stations to broadcast the difference between the positions indicated by the GPS satellites and the known fixed positions. This helps to correct GPS signal errors caused by atmospheric interference, improving accuracy.

Real-Time Kinematic (RTK) GPS: RTK is a type of DGPS that uses carrier phase enhancement to provide real-time corrections, achieving centimeter-level precision. This is particularly useful in surveying, agriculture, and other precision-demanding applications.

Assisted GPS (A-GPS): Used mainly in mobile phones and other portable devices, A-GPS improves startup performance (time-to-first-fix). It uses an internet connection to provide data about satellite positions, which speeds up the time it takes for GPS receivers to find a fix.

GNSS Augmentation: This involves using additional satellite navigation systems such as the Russian GLONASS, the European Union's Galileo, or China's BeiDou. By accessing more satellites, receivers can improve accuracy and reliability, especially in challenging environments like urban canyons.

Multi-frequency GPS: Using GPS receivers that can access multiple frequencies can help to mitigate the effects of ionospheric delays, further improving accuracy.

Advanced Signal Processing: Implementing sophisticated algorithms for signal processing can enhance the detection and mitigation of errors, improving GPS accuracy in challenging conditions such as under dense foliage or in urban areas with tall buildings.

Integrating Inertial Navigation Systems (INS): Combining GPS data with that from inertial navigation systems, which use accelerometers and gyroscopes to calculate position and orientation, can provide more accurate and continuous location information, especially when GPS signals are weak or unavailable.

Geostationary Satellite-Based Augmentation Systems (SBAS): These systems, like WAAS in the USA, EGNOS in Europe, and GAGAN in India, provide corrections and integrity information to improve GPS accuracy.

Use of AI and Machine Learning: Implementing AI and machine learning algorithms can help predict and correct errors, as well as optimize the processing of GPS signals for enhanced accuracy and efficiency.

Network RTK (NRTK): This is an extension of RTK that uses a network of reference stations to create a more robust and accurate correction model.

These techniques, often used in combination, can significantly enhance the performance of GPS systems in a variety of applications, and allow for more precise location of a person or object and for projection operators that specify location. In some use cases, such as 911/emergency services use cases, enhanced GPS can be used to locate an individual to within a meter or less. This can be critical in an emergency situation such as a fire, earthquake, or terrorist event.

In 5G networks, location determination can be performed using Multiple Input Multiple Output (MIMO) technology. MIMO is a method of multiplying the capacity of a radio link using multiple transmission and receiving antennas to exploit multipath propagation. The following techniques can be used to assist in location determination in 5G networks Angle of Arrival (AoA): MIMO systems can estimate the Angle of Arrival of a signal. By using multiple antennas, the system can determine the direction from which a signal is coming. By comparing the AoA information from different base stations, the location of the device can be triangulated.

Time Difference of Arrival (TDoA): This technique relies on the time difference at which a signal from a mobile device reaches various base stations. Since the speed of radio waves is known, calculating the difference in arrival times helps in estimating the distance of the device from each base station. Combining this data from multiple base stations can accurately determine the device's location.

Beamforming: MIMO enables more advanced beamforming, where the focus of the signal beam can be adjusted to target a specific area or device. Beamforming improves signal strength and quality, which can enhance the accuracy of location determination.

High Frequency Bands of 5G: 5G networks use higher frequency bands (like mmWave), which offer more precise location capabilities due to their shorter wavelengths. These frequencies allow for more accurate AoA and TDoA measurements.

Signal Fingerprinting: This method involves creating a database of signal characteristics at various locations. By comparing the observed signal characteristics from a device with the database, the system can infer the device's location.

Enhanced Data Rates and Capacity: The improved data rates and capacity in 5G, facilitated by MIMO, allow for the transmission of more complex and detailed location information, further enhancing location accuracy In some embodiments, in the event of a local emergency, 911 caller places a call to emergency services using a cellular and IP-enabled mobile device. This call is routed through a Mobile Positioning Center (MPC) wherein a variety of techniques are used to discern caller location. These techniques vary depending on the sophistication of technology at each PSAP and MPC, but most commonly include a combination of A-GPS, TDoA and AoA. The MPC then relays updated location information of the calling device to the Public Safety Access Point (PSAP). For landlines calling from telephone numbers, an ANI (Automatic Number Identification) is sent to the PSAP along with the call. The dispatcher can then use this identifier to request the stored address of the landline from the Automatic Location Information (ALI) database. For 911 calls made from mobile devices, a p-ANI (Pseudo Automatic Number Identification) is passed along to the PSAP as an identifier for the calling device. In next-generation 911 (NG911) embodiments, emergency calls can be made through softphones or other internet enabled devices via Voice over Internet Protocol (VoIP). In these cases, a location is determined by the VoIP provider through Wi-Fi positioning. If this information is unavailable a static set address can be accessed through the ALI database.

Figure 20:
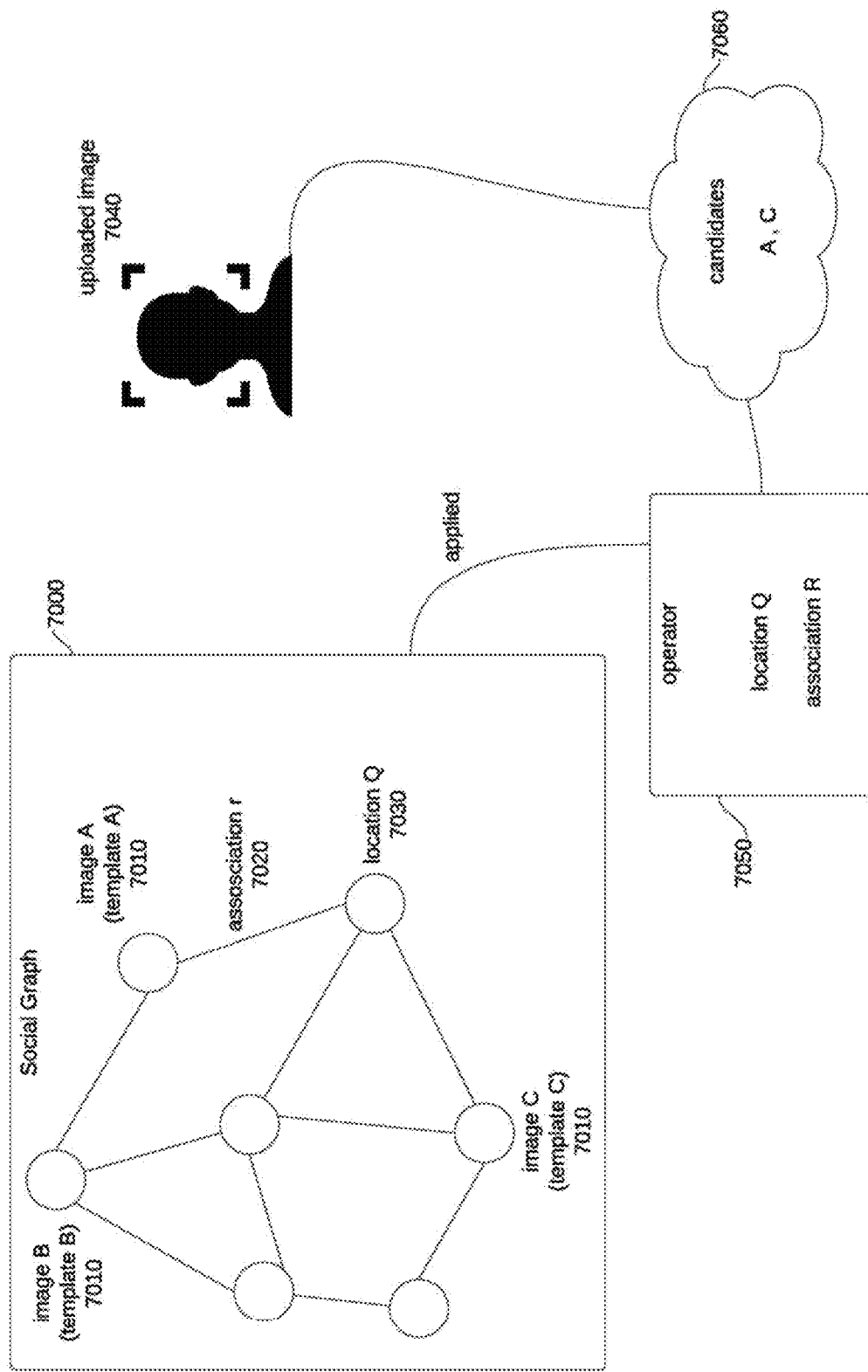
FIG. 20 shows an illustrative example of the projection of matching candidates within a social graph using facial recognition templates, in accordance with some embodiments of this disclosure.

The combination of identifying information and location data aid in the creation of a social graph. The 911 dispatcher operating out of a PSAP can use this social graph to call for the creation of a situational network. This situational network can connect the directly impacted parties and parties that should be notified of the emergency such as family, friends, and employers. If necessary, authorities such as police or other organizations can initiate a hierarchical situational network, as shown in FIG. 8, providing a direct line of communication to those affected by the emergency FIG. 20 represents an example where a social graph/social network database has stored information including images or templates (facial recognition templates) stored along with associations. As can be appreciated by one of skill in the art, the social graph/network can include users, user images, locations, events, and other items stored as nodes and associations (likes, attendance) stored as associations.

In some embodiments, in operation an image can be uploaded and a facial template generated from the image. Rather than searching the large number of images and templates that can be stored in the system (potentially totaling billions or even tens of billions of images) and operator specifying associations can be developed based, for example, on a location (e.g., where the uploaded image was taken) or an association (e.g., who liked that location) to generate a set of candidate images. The uploaded image, or a template generated from the uploaded image, can be tested against the candidates.

Figure 21:
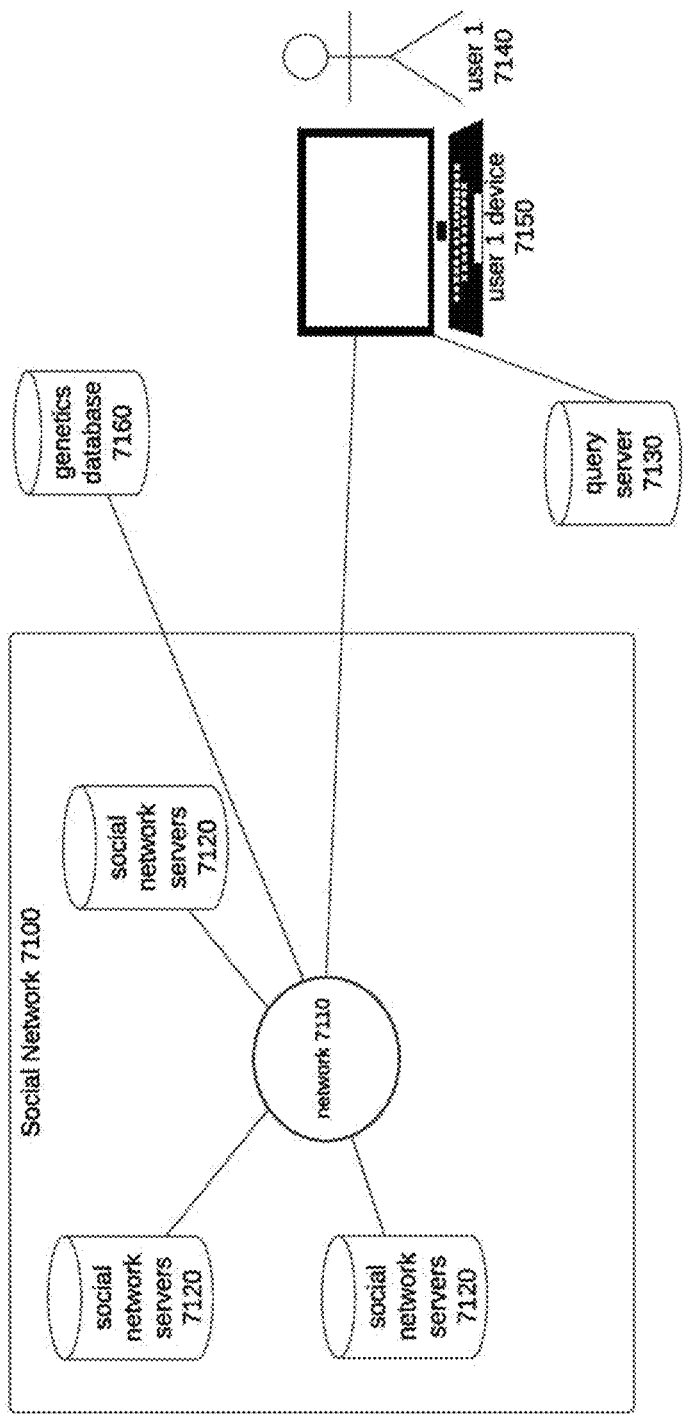
FIG. 21 shows an illustrative example of a representative architecture of the system for creation of a situational network using genetic information, in accordance with some embodiments of this disclosure.

FIG. 21 represents an exemplary architecture in which a social network/graph operates using a series of social network servers connected across a network (e.g., the Internet). A user utilizes a terminal or other device in conjunction with a query server to both upload and image and to generate a query. As discussed, the query can contain both node and link operators that specify the search and generate candidate sets of matches.

In some embodiments, and as illustrated in FIG. 20, a genetic database can be included in the search (either as part of the social network or as an independent database). Genetic information, either derived from the image, or gather by the user, is included in the query and projection operator which is transmitted from the query server to the social network and genetics database. In some embodiments the types of genetic data used include combinations of Y-DNA, autosomal DNA, and mitochondrial DNA as well as identified Single Nucleotide Polymorphisms (SNPs).

Artificial intelligence (AI) can be highly effective in mining social networks to discover nodes and associations relevant to specific situations and subsequently create situational networks. A number of AI techniques can be applied, including but not limited to the following:

Data collection and mining: AI algorithms can collect vast amounts of data from social networks. This data includes user profiles, posts, comments, likes, shares, and network connections. This information, along with the statistics associated with the information (e.g., number and types of likes, frequency of use of connections) can be used as parameters in the projections to identify relevant nodes/parties that should be joined to the situational network.

Natural Language Processing (NLP): AI tools can use NLP to understand and interpret the text in posts and comments. NLP helps in sentiment analysis, topic detection, and identifying key phrases that are relevant to the situation being analyzed. This information, along with the associated statistics (e.g., a party consistently uses a particular phrase or consistently shows positivity or negativity) can be used in a projection to identify relevant nodes/parties that should be joined to a situational network. For example, parties showing consistent positive sentiment towards an event, product, other individual can be added to a situational network involving a similar event, product or individual. This can be particularly useful in advertising applications, where the situational network is formed to identify individuals for targeted advertising purposes. Pattern recognition and machine learning: AI tools can be used to perform pattern recognition to identify trends and commonalities in the data. Machine learning models can learn from this data to identify what types of nodes (individuals, groups, or topics) are most relevant to the situation. In some embodiments, the trends and commonalities are used as projection operators to project relevant nodes/users from the social graph or graph of graphs.

Network analysis: AI performs network analysis to understand how different nodes are connected. This includes analyzing who is connected to whom and how information flows through the network. It helps in identifying influential nodes and the strength of associations between different nodes. As applied to network security, identification of nodes and their interconnections can be used to project out relevant nodes and isolated threats or project parties from attacks.

Predictive analytics: AI can predict future trends and behaviors by analyzing past and current data. This is useful in anticipating how a situation might evolve based on the current network dynamics. In the context of situational networking the predictions can be used as operators in the projections to identify relevant nodes—likely to behave in a certain way based on past actions—and join them to a relevant situational network.

Figure 13:
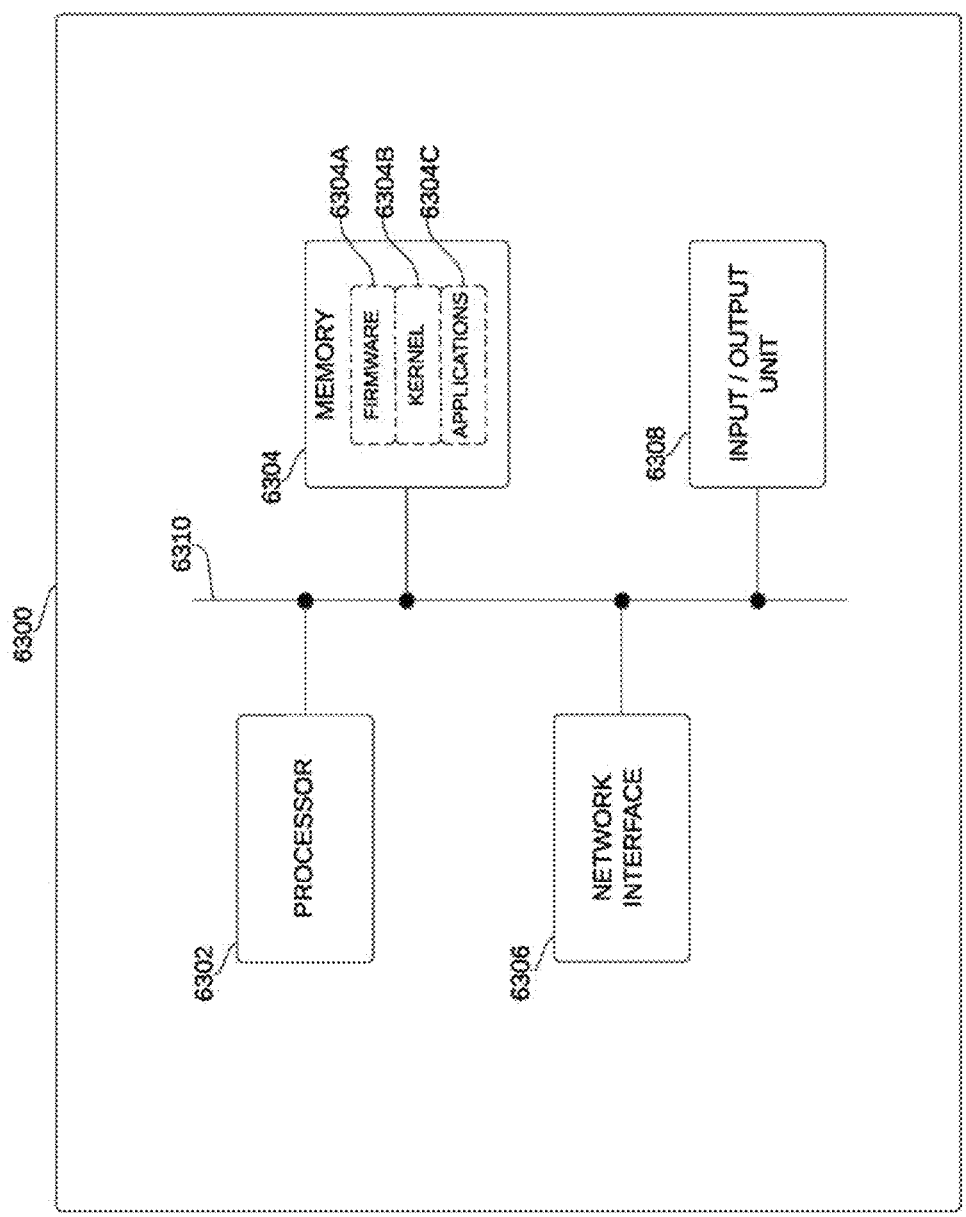
FIG. 13 shows an illustrative example of an exemplary computing device, in accordance with some embodiments of this disclosure.

Anomaly Detection: AI is adept at spotting anomalies or outliers in data patterns. This is useful in identifying unusual behavior or emerging threats within a social network. Anomalies can be used to include or exclude nodes from a situational network. Projection operators can incorporate criteria that includes anomalous parameters FIG. 13 is a simplified block diagram exemplifying a computing device 6300, illustrating some of the components that could be included in a computing device arranged to operate in accordance with the embodiments herein. Computing device 6300 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In some embodiments, computing device 6300 includes processor 6302 (e.g., processing circuitry), memory 6304 (e.g., non-transitory memory), network interface 6306 (display circuitry), and input/output unit 6308 (e.g., input/output circuitry), all of which may be coupled by system bus 6310 or a similar mechanism. In some embodiments, computing device 6300 may include other components and/or peripheral devices (e.g., detachable storage, printers, and so on).

Non-transitory memory may store instructions that when executed by control circuitry, I/O circuitry, any other suitable circuitry, or combination thereof, executes function of a situation application as described above. The instructions for performing any of the embodiments discusses herein of the situation application may be encoded on non-transitory computer-readable media. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM) on a DRAM-integrated circuit, read-only memory, etc.

In some embodiments, processor 6302, e.g., processing circuitry, may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 6302 may be one or more single-core processors. In other cases, processor 6302 may be one or more multi-core processors with multiple independent processing units. Processor 6302 may also include register memory for temporarily storing instructions being executed and related data, as well as cache memory for temporarily storing recently-used instructions and data.

In some embodiments, memory 6304 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 6304 represents both main memory units, as well as long-term storage. Other types of memory may include biological memory.

In some embodiments, memory 6304 may store program instructions and/or data on which program instructions may operate. By way of example, memory 6304 may store these program instructions on a non-transitory, computer-readable medium, such that the instructions are executable by processor 6302 to carry out any of the methods, processes, or operations disclosed in this specification or the accompanying drawings.

As shown in FIG. 13, memory 6304 may include firmware 6304A, kernel 6304B, and/or applications 6304C. Firmware 6304A may be program code used to boot or otherwise initiate some or all of computing device 6300. Kernel 6304B may be an operating system, including modules for memory management, scheduling, and management of processes, input/output, and communication. Kernel 6304B may also include device drivers that allow the operating system to communicate with the hardware modules (e.g., memory units, networking interfaces, ports, and buses) of computing device 6300. Applications 6304C may be one or more user-space software programs, such as web browsers or email clients, as well as any software libraries used by these programs. Memory 6304 may also store data used by these and other programs and applications.

In some embodiments, network interface 6306 may take the form of one or more wireline interfaces, such as Ethernet (e.g., Fast Ethernet, Gigabit Ethernet, and so on). Network interface 6306 may also support communication over one or more non-Ethernet media, such as coaxial cables or power lines, or over wide-area media, such as Synchronous Optical Networking (SONET) or digital subscriber line (DSL) technologies. Network interface 6306 may additionally take the form of one or more wireless interfaces, such as IEEE 802.11 (Wi-Fi), BLUETOOTH®, global positioning system (GPS), or a wide-area wireless interface. However, other forms of physical layer interfaces and other types of standard or proprietary communication protocols may be used over network interface 6306. Furthermore, network interface 6306 may comprise multiple physical interfaces. For instance, some embodiments of computing device 6300 may include Ethernet, BLUETOOTH®, and Wi-Fi interfaces.

In some embodiments, input/output unit 6308 may facilitate user and peripheral device interaction with computing device 6300. Input/output unit 6308 may include one or more types of input devices, such as a keyboard, a mouse, a touch screen, and so on. Similarly, input/output unit 6308 may include one or more types of output devices, such as a screen, monitor, printer, and/or one or more light emitting diodes (LEDs). Additionally or alternatively, computing device 6300 may communicate with other devices using a universal serial bus (USB) or high-definition multimedia interface (HDMI) port interface, for example.

In some embodiments, one or more computing devices like computing device 6300 may be deployed to support an aPaaS architecture. The exact physical location, connectivity, and conjuration of these computing devices may be unknown and/or unimportant to client devices. Accordingly, the computing devices may be referred to as "cloud-based" devices that may be housed at various remote data center locations.

Figure 14:
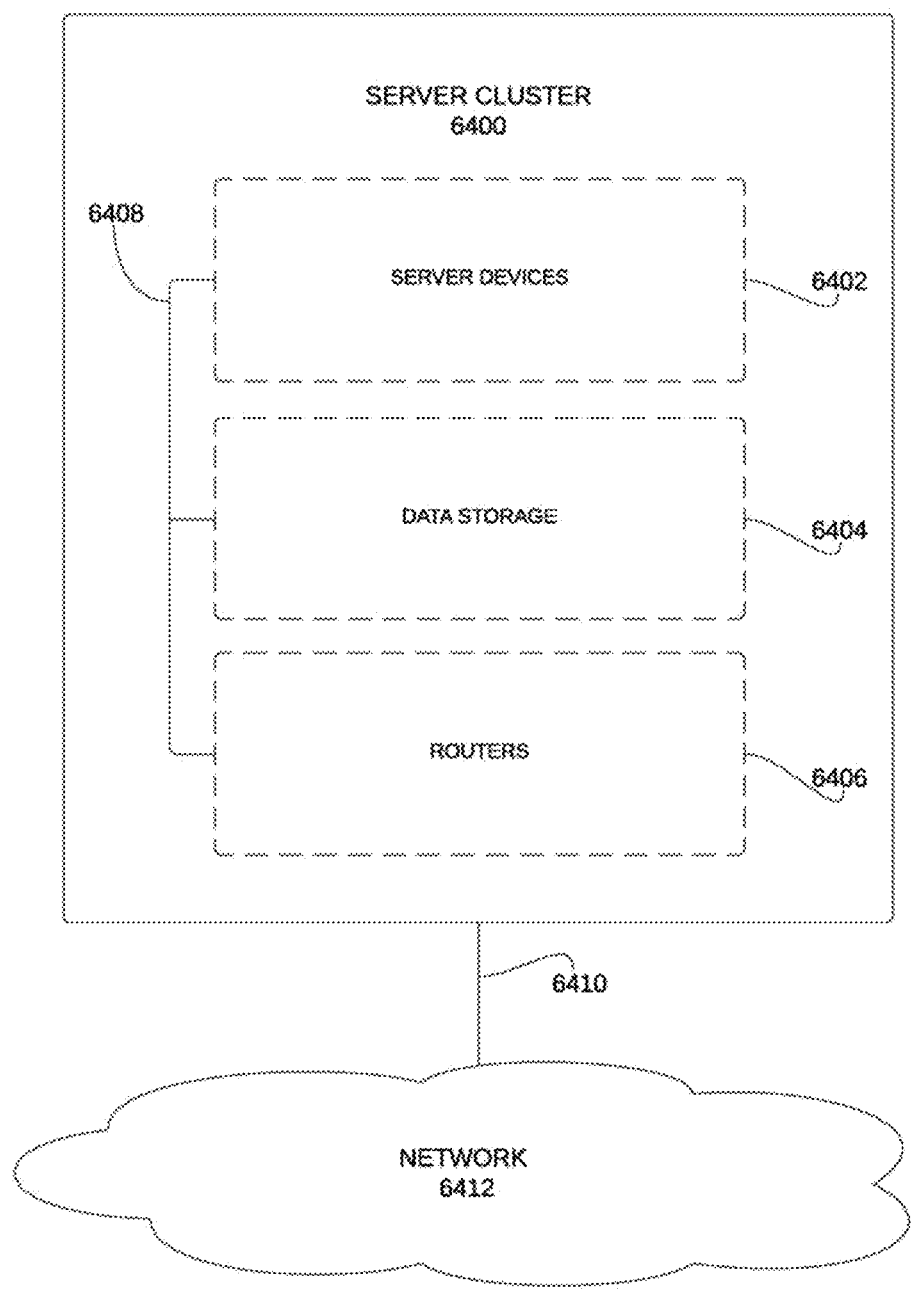
FIG. 14 is an exemplary computing system, in accordance with some embodiments of this disclosure.

FIG. 14 depicts a cloud-based server cluster 6400 in accordance with example embodiments. In FIG. 14, operations of a computing device (e.g., computing device 6300) may be distributed between server devices 6402, data storage 6404, and routers 6406, all of which may be connected by local cluster network 6408. The number of server devices 6402, data storages 6404, and routers 6406 in server cluster 6400 may depend on the computing task(s) and/or applications assigned to server cluster 6400.

For example, server devices 6402 can be configured to perform various computing tasks of computing device 6300. Thus, computing tasks can be distributed among one or more of server devices 6402. To the extent that these computing tasks can be performed in parallel, such a distribution of tasks may reduce the total time to complete these tasks and return a result. For purposes of simplicity, both server cluster 6400 and individual server devices 6402 may be referred to as a "server device." This nomenclature should be understood to imply that one or more distinct server devices, data storage devices, and cluster routers may be involved in server device operations.

In some embodiments, data storage 6404 may be data storage arrays that include drive array controllers configured to manage read and write access to groups of hard disk drives and/or solid state drives. The drive array controllers, alone or in conjunction with server devices 6402, may also be configured to manage backup or redundant copies of the data stored in data storage 6404 to protect against drive failures or other types of failures that prevent one or more of server devices 6402 from accessing units of data storage 6404. Other types of memory aside from drives may be used.

In some embodiments, routers 6406 may include networking equipment configured to provide internal and external communications for server cluster 6400. For example, routers 6406 may include one or more packet-switching and/or routing devices (including switches and/or gateways) configured to provide (i) network communications between server devices 6402 and data storage 6404 via local cluster network 6408, and/or (ii) network communications between server cluster 6400 and other devices via communication link 6410 to network 6412.

Additionally, the configuration of routers 6406 can be based at least in part on the data communication requirements of server devices 6402 and data storage 6404, the latency and throughput of the local cluster network 6408, the latency, throughput, and cost of communication link 6410, and/or other factors that may contribute to the cost, speed, fault-tolerance, resiliency, efficiency, and/or other design goals of the system architecture.

As an example, data storage 6404 may include any form of database, such as a structured query language (SQL) database. Various types of data structures may store the information in such a database, including but not limited to tables, arrays, lists, trees, and tuples. Furthermore, any databases in data storage 6404 may be monolithic or distributed across multiple physical devices.

In some embodiments, server devices 6402 may be configured to transmit data to and receive data from data storage 6404. This transmission and retrieval may take the form of SQL queries or other types of database queries, and the output of such queries, respectively. Additional text, images, video, and/or audio may be included as well. Furthermore, server devices 6402 may organize the received data into web page or web application representations. Such a representation may take the form of a markup language, such as the hypertext markup language (HTML), the extensible markup language (XML), or some other standardized or proprietary format. Moreover, server devices 6402 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

The disclosure further provides the following embodiments:

1. A computer based method for creating a situational network comprising:
   a. projecting, from a database of electronic records, a plurality of candidate participants for a situational network, wherein the projection is based on one or more combinations of nodes and associations between the nodes;
   b. transmitting, to at least some of the candidate participants, an invitation to participate in the situational network;
   c. receiving two or more acceptances to participate in the situational network from a set of active participants; and
   d. establishing a network connection between the active participants to create the situational network.

2. A computer based method for creating a situational network comprising:
   a. projecting, from a database of electronic records associated with a first network, a plurality of candidate participants for a situational network, wherein the projection is based on one or more combinations of nodes and associations between the nodes;
   b. creating an intermediate database including the candidate participants and at least one contact field for the candidate participants;
   c. transmitting, from a first server associated with the first network, the intermediate database to a second server associated with a second network;
   d. transmitting, to at least some of the candidate participants, an invitation to participate in the situational network on the second network;
   e. receiving two or more acceptances to participate in the situational network from a set of active participants; and
   f. Establishing, on the second network, a network connection between the active participants to create the situational network.

3. A computer based method for creating a situational network in a metaverse comprising:
   a. establishing, on a set of first servers, a node representing a physical situation;
   b. establishing, on a set of second servers, a node representing a virtual situation in the metaverse corresponding to the physical situation
   c. projecting, from a database of electronic records, a plurality of candidate participants for a situational network related to the physical situation, wherein the projection is based on one or more combinations of nodes and associations between the nodes;
   d. transmitting, to at least some of the candidate participants, an invitation to participate in the situational network in the metaverse;
   e. receiving two or more acceptances to participate in the situational network in the metaverse from a set of active participants; and
   f. establishing a network connection between the active participants and the node representing the virtual situation in the metaverse.

What is claimed is:

1. A method comprising:
identifying a geographical area affected by a situation;
identifying a plurality of devices associated with a plurality of users in the identified geographical area;
establishing a situational network for the situation;
joining the plurality of devices to a situational network node of the situational network for the situation, wherein the situational network node is configured to provide textual data related to the situation to the plurality of devices;
establishing a virtual reality (VR) network for the situation;
identifying a priority subset of the plurality of devices by analyzing: (a) profile data of the plurality of users associated with the plurality of devices, and (b) data relevant to the situation; and
joining the priority subset of the plurality of devices to a VR node of the VR network for the situation, wherein the VR node is configured to provide at least one of (a) video data related to the situation or (b) VR data related to the situation that are not provided by the situational network node.

2. The method of claim 1, further comprising:
periodically adding additional devices to the priority subset of the plurality of devices or removing additional devices to the priority subset of the plurality of devices based on detecting changes to parameters of the situation.

3. The method of claim 1, further comprising:
allocating resources to the priority subset of the plurality of devices that are not available to at least one device of the plurality of devices, wherein the resources comprise at least one of computational resources, storage resources, memory resources, bandwidth of a cellular network, bandwidth of a satellite network, bandwidth of a fiber optic network, energy resources, security resources, or cloud computing resources.

4. The method of claim 3, wherein the allocating the resources to the priority subset of the plurality of devices comprises allocating additional resources to the priority subset of the plurality of devices as each device of the priority subset of the plurality of devices is joined to the VR node.

5. The method of claim 3, wherein the allocating the resources to the priority subset of the plurality of devices comprises selecting resources to be allocated based on an analysis of a cybersecurity event.

6. The method of claim 5, wherein the allocating the resources to the priority subset of the plurality of devices comprises allocating the resources based on a significant increase or decrease of a number of infected devices identified by the analysis of the cybersecurity event.

7. The method of claim 5, further comprising:
restricting access to the resources from devices of the plurality of devices that have been determined to have a virus by the analysis of the cybersecurity event.

8. The method of claim 3, further comprising periodically allocating or deallocating additional resources to the priority subset of the plurality of devices based on detecting changes to parameters of the situation.

9. The method of claim 3, wherein the allocating the resources to the priority subset of the plurality of devices comprises allocating the resources via network slicing, wherein at least one slice of the situational network is allocated to the VR network.

10. A system comprising:
processing circuitry configured to:
identify a geographical area affected by a situation;
identify a plurality of devices associated with a plurality of users in the identified geographical area;
establish a situational network for the situation;
join the plurality of devices to a situational network node of the situational network for the situation, wherein the situational network node is configured to provide textual data related to the situation to the plurality of devices;
input/output circuitry configured to:
transmit the textual data to the plurality of devices joined to the situational network node via the situational network node;
wherein the processing circuitry is further configured to:
establish a virtual reality (VR) network for the situation;
identify a priority subset of the plurality of devices by analyzing: (a) profile data of the plurality of users associated with the plurality of devices, and (b) data relevant to the situation;
join the priority subset of the plurality of devices to a VR node of the VR network for the situation, wherein the VR node is configured to provide at least one of (a) video data related to the situation or (b) VR data related to the situation that are not provided by the situational network node; and
wherein the input/output circuitry is further configured to:
transmit the video data and the VR data to the priority subset of the plurality of devices joined to the VR node via the VR node.

11. The system of claim 10, wherein the processing circuitry is further configured to:
periodically add additional devices to the priority subset of the plurality of devices or removing additional devices to the priority subset of the plurality of devices based on detecting changes to parameters of the situation.

12. The system of claim 10, wherein the processing circuitry is further configured to:
allocate resources to the priority subset of the plurality of devices that are not available to at least one device of the plurality of devices, wherein the resources comprise at least one of computational resources, storage resources, memory resources, bandwidth of a cellular network, bandwidth of a satellite network, bandwidth of a fiber optic network, energy resources, security resources, or cloud computing resources.

13. The system of claim 12, wherein the processing circuitry is further configured to allocate the resources to the priority subset of the plurality of devices by allocating additional resources to the priority subset of the plurality of devices as each device of the priority subset of the plurality of devices is joined to the VR node.

14. The system of claim 12, wherein the processing circuitry is further configured to allocate the resources to the priority subset of the plurality of devices by selecting resources to be allocated based on an analysis of a cybersecurity event.

15. The system of claim 14, wherein the processing circuitry is further configured to allocate the resources to the priority subset of the plurality of devices by allocating the resources based on a significant increase or decrease of a number of infected devices identified by the analysis of the cybersecurity event.

16. The system of claim 14, wherein the processing circuitry is further configured to:
restrict access to the resources from devices of the plurality of devices that have been determined to have a virus by the analysis of the cybersecurity event.

17. The system of claim 12, wherein the processing circuitry is further configured to periodically allocate or deallocate additional resources to the priority subset of the plurality of devices based on detecting changes to parameters of the situation.

18. The system of claim 12, wherein the processing circuitry is further configured to allocate the resources to the priority subset of the plurality of devices by allocating the resources via network slicing, wherein at least one slice of the situational network is allocated to the VR network.

19. A non-transitory computer readable medium comprising:
instructions that when executed by processing circuitry cause the processing circuitry to:
identify a geographical area affected by a situation;
identify a plurality of devices associated with a plurality of users in the identified geographical area;
establish a situational network for the situation;
join the plurality of devices to a situational network node of the situational network for the situation, wherein the situational network node is configured to provide textual data related to the situation to the plurality of devices;
establish a virtual reality (VR) network for the situation;
identify a priority subset of the plurality of devices by analyzing: (a) profile data of the plurality of users associated with the plurality of devices, and (b) data relevant to the situation; and join the priority subset of the plurality of devices to a VR node of the VR network for the situation, wherein the VR node is configured to provide at least one of (a) video data related to the situation or (b) VR data related to the situation that are not provided by the situational network node.

20. The non-transitory computer readable medium of claim 19, further comprising instructions that when executed by the processing circuitry cause the processing circuitry to:
periodically add additional devices to the priority subset of the plurality of devices or removing additional devices to the priority subset of the plurality of devices based on detecting changes to parameters of the situation.

* * * * *